US005721628A

United States Patent [19]
Takaragi et al.

[11] Patent Number: 5,721,628
[45] Date of Patent: Feb. 24, 1998

[54] COLOR IMAGE PROCESSING APPARATUS

[75] Inventors: Yoichi Takaragi; Masahiro Funada, both of Yokohama, Japan

[73] Assignee: Canon Kabushiki Kaisha, Tokyo, Japan

[21] Appl. No.: 341,979

[22] Filed: Nov. 16, 1994

Related U.S. Application Data

[63] Continuation of Ser. No. 835,026, Feb. 18, 1992, abandoned, which is a continuation of Ser. No. 416,587, Oct. 3, 1989, abandoned.

[30] Foreign Application Priority Data

| Oct. 4, 1988 | [JP] | Japan | 63-251463 |
| Dec. 26, 1988 | [JP] | Japan | 63-329866 |
| Dec. 28, 1988 | [JP] | Japan | 63-332638 |
| Jul. 21, 1989 | [JP] | Japan | 1-189196 |

[51] Int. Cl.$^6$ .......................................... H04N 1/46
[52] U.S. Cl. ............................... 358/518; 358/520
[58] Field of Search ..................... 358/500, 515–521; H04N 1/46

[56] References Cited

U.S. PATENT DOCUMENTS

| 4,469,433 | 9/1984 | Kurata et al. | 358/75 |
| 4,541,116 | 9/1985 | Lougheed | 382/49 |
| 4,544,264 | 10/1985 | Bassetti et al. | 355/14 R |
| 4,558,357 | 12/1985 | Nakagawa et al. | |
| 4,636,844 | 1/1987 | Sasaki | 358/75 |
| 4,656,505 | 4/1987 | Yamada et al. | 358/75 |
| 4,679,072 | 7/1987 | Takayama | 358/520 |
| 4,682,216 | 7/1987 | Sasaki et al. | 358/75 |
| 4,739,397 | 4/1988 | Hayashi | 358/80 |
| 4,750,048 | 6/1988 | Satoh et al. | |
| 4,812,899 | 3/1989 | Kueppers | 358/75 |
| 4,829,371 | 5/1989 | Hiramatsu et al. | 358/80 |
| 4,879,595 | 11/1989 | Niki et al. | 358/80 |
| 4,908,712 | 3/1990 | Uchiyama et al. | 358/80 |
| 4,953,012 | 8/1990 | Abe | 358/75 |
| 4,958,219 | 9/1990 | Kadowaki | 358/75 |
| 4,975,768 | 12/1990 | Takaraga | 358/75 |
| 4,980,760 | 12/1990 | Hiratsuka et al. | 358/80 |
| 4,985,760 | 1/1991 | Maeshima et al. | 358/75 |
| 4,989,079 | 1/1991 | Ho | 358/75 |
| 5,031,034 | 7/1991 | Shimuzu et al. | 358/80 |

FOREIGN PATENT DOCUMENTS

| 0173413 | 3/1986 | European Pat. Off. |
| 0216536 | 4/1987 | European Pat. Off. |
| 0227848 | 7/1987 | European Pat. Off. |
| 2520175 | 7/1983 | France . |
| 2172169 | 9/1986 | United Kingdom . |
| 8806767 | 9/1988 | WIPO . |

OTHER PUBLICATIONS

G.N. Gaebelein, "Automatic Detection of Scanner Color Mode," IBM Technical Disclosure Bulletin, vol. 26, No. 2, Jul. 1983, p. 583.

Mitch Beedie, "Image IC Detects Edges in Real Time," Electronic Design, 34 (1986) May, No. 11, New Jersey.

*Primary Examiner*—Michael H. Lee
*Attorney, Agent, or Firm*—Fitzpatrick, Cella, Harper & Scinto

[57] ABSTRACT

A color image processing apparatus which judges a saturation of an input color image, and performs image processing in accordance with the saturation judgement result, includes an image input means in which a plurality of line sensors for generating color component signals on the basis of different spectral characteristics are parallelly arranged, and means for judging an achromatic area of the color component signals input by the image input means in accordance with a predetermined method. This arrangement performs saturation judgement when a printing operation using only black is performed for a black character or when it is judged whether an original document is a monochrome or color original document.

27 Claims, 45 Drawing Sheets

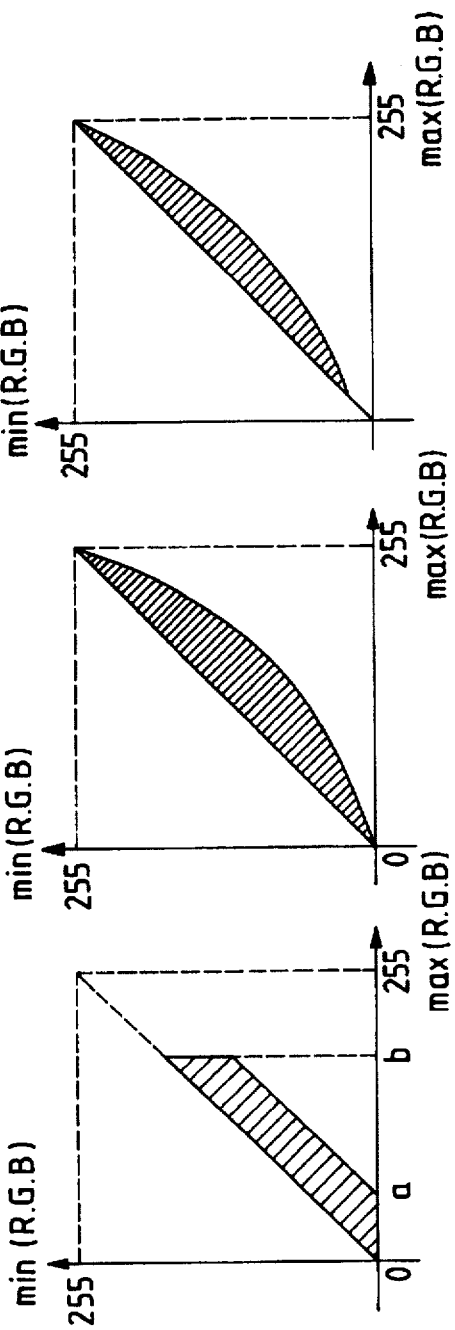
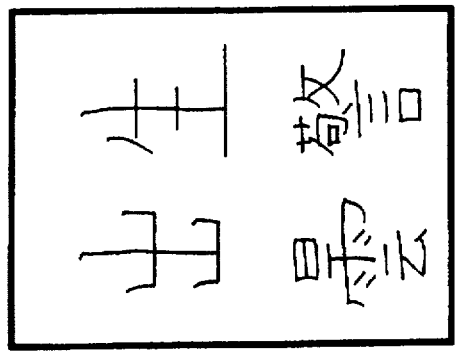
FIG. 12  FIG. 13-1  FIG. 13-2  FIG. 13-3

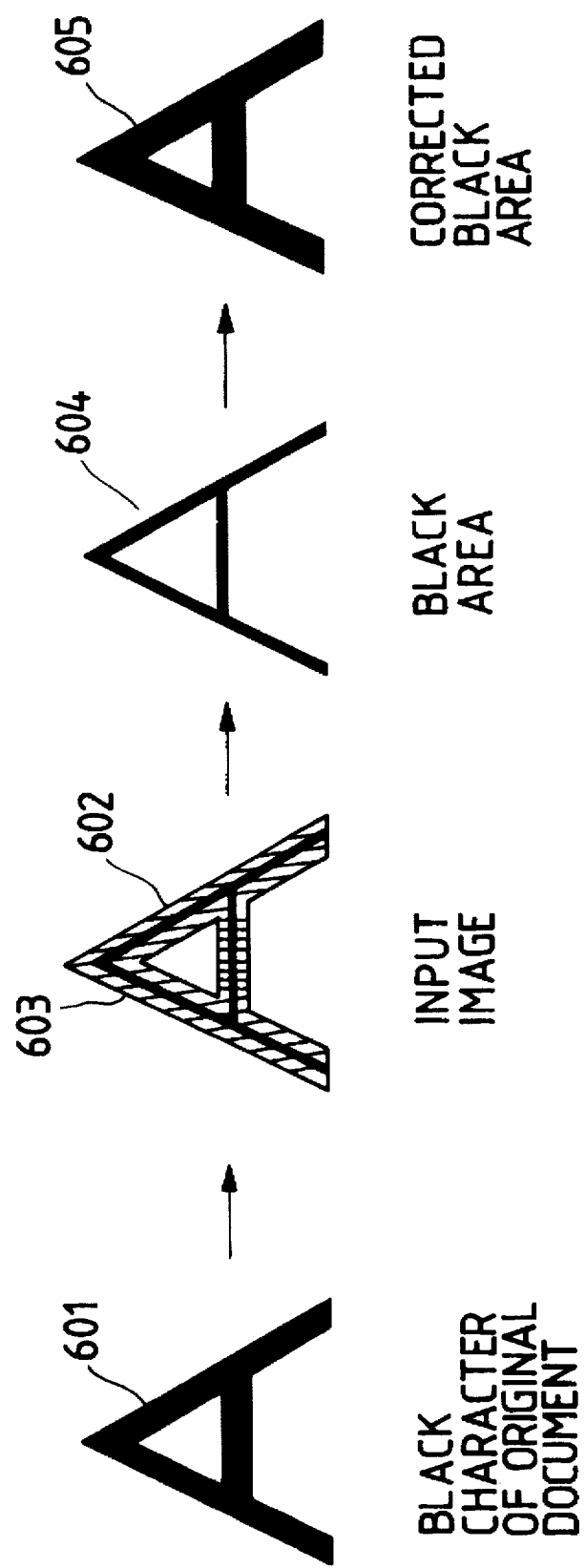

FIG. 15
|   |   |   |
|---|---|---|
| a | b | c |
| d | e | f |
| g | h | i |
CORRECTION EXAMPLE 1
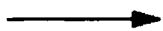
CORRECTION EXAMPLE 2
SIGNAL VALUE BEFORE CORRECTION
SIGNAL VALUE AFTER CORRECTION

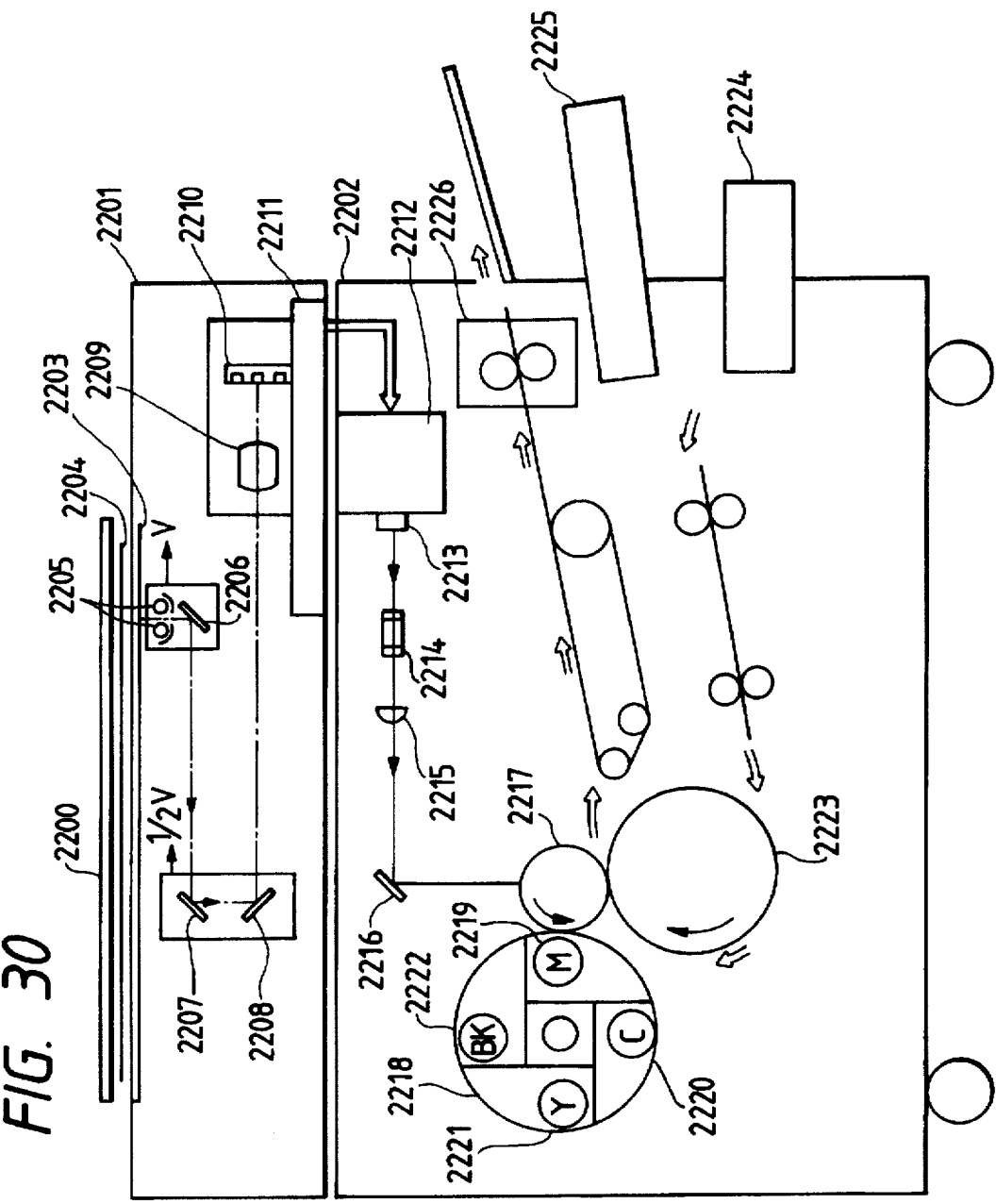

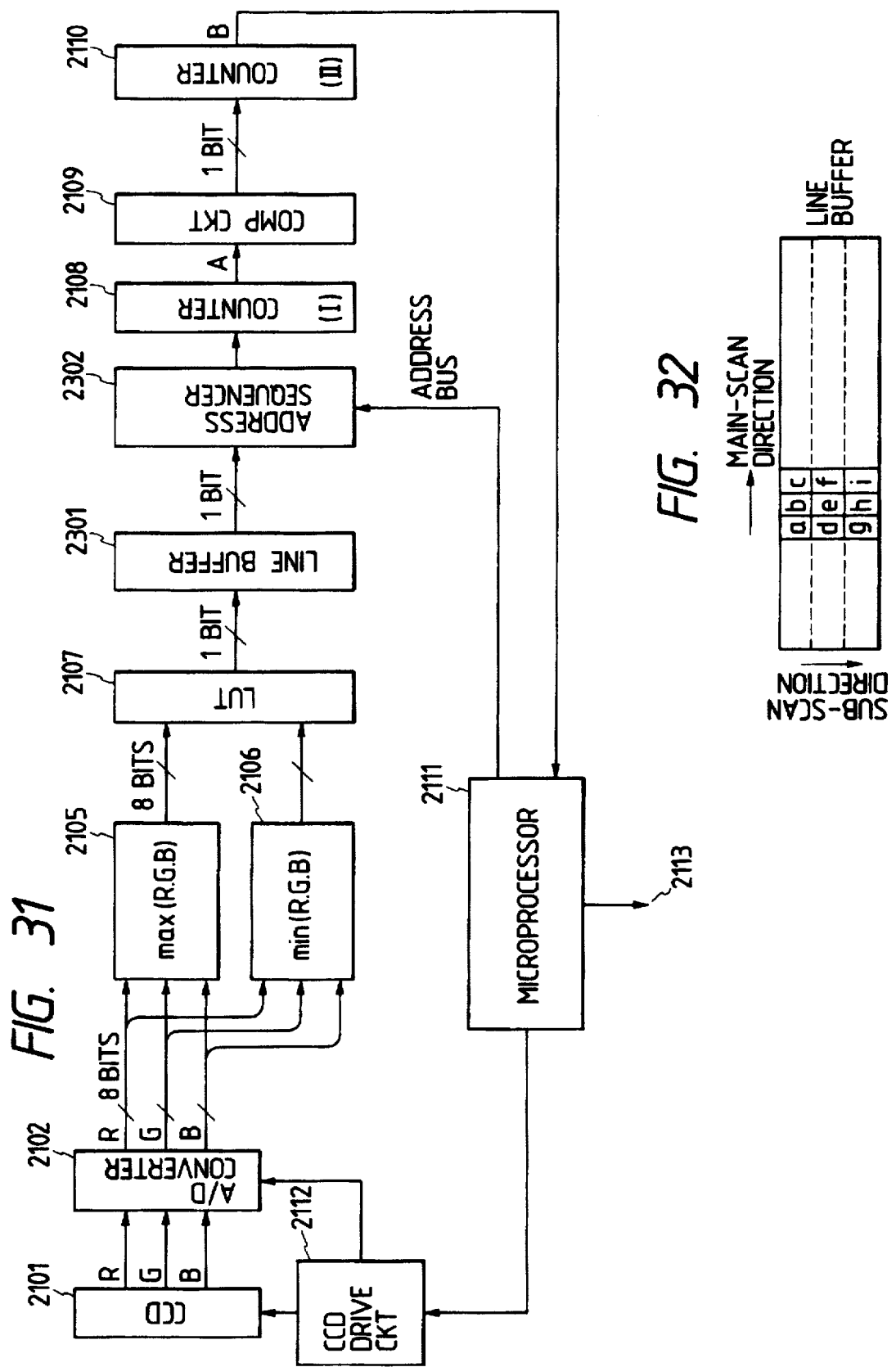

| CONDITION | S00 | S01 | S02 |
|---|---|---|---|
| (R>G AND R≧B) OR R=G=B | 1 | 0 | 0 |
| G>B AND G≧R | 0 | 1 | 0 |
| B>R AND B≧G | 0 | 0 | 1 |

| CONDITION | S10 | S11 | S12 |
|---|---|---|---|
| (R≦G AND R<B) OR R=G=B | 1 | 0 | 0 |
| G≦B AND G<R | 0 | 1 | 0 |
| B≦R AND B<G | 0 | 0 | 1 |

| S0 | S1 | S2 | Y |
|---|---|---|---|
| 1 | 0 | 0 | A |
| 0 | 1 | 0 | B |
| 0 | 0 | 1 | C |

|   | BLK1 | UMK2 | COL1 |
|---|------|------|------|
| A | 1    | 0    | 0    |
| B | 0    | 1    | 0    |
| C | 0    | 0    | 1    |
| D | 0    | 0    | 0    |

COLOR IMAGE PROCESSING APPARATUS

This application is a continuation of application Ser. No. 07/835,026 filed Feb. 18, 1992, now abandoned, which was a continuation of application Ser. No. 07/416,587, filed Oct. 3, 1989, now abandoned.

BACKGROUND OF THE INVENTION

1. Field of the Invention

The present invention relates to a color image processing, especially, processing of a color image having a black character.

2. Related Art

In a conventional color printing apparatus, when a level value of an achromatic color is determined upon comparison of levels of a plurality of primary color signals, black is not expressed by overlapping Y (yellow), M (magenta), and C (cyan) but only black is colored on a reproducing surface, thereby preventing degradation of image quality caused by offsets of Y, M, and C print positions.

For example, in a color copying machine, a technique for automatically discriminating whether or not an original document to be read is a monochrome original document or a color original document is known. In this technique, when the monochrome original document is detected, a black single-color printing operation is executed. When the color original document is detected, a color printing operation is executed. Upon discrimination of types of original document, a copy execution time can be shortened, and cost can be reduced.

In order to perform such color image processing, a black area of an input image must be accurately discriminated.

However, pixels around a black character of an input image are often erroneously discriminated as a chromatic color due to an offset of a read position of an image input color sensor. For this reason, color blurring of a chromatic color is formed around a black character of an output image.

In particular, in 3-line sensors as disclosed in U.S. Pat. Nos. 4,558,357 and 4,750,048, such erroneous discrimination cannot be relatively negligible. In the 3-line sensor, R (red), G (green), and B (blue) line sensors are arranged to be parallel to each other at given intervals. The read position of each line sensor slightly offsets due to vibration of an optical system driving motor, or the like. More specifically, in the 3-line sensor, the R, G, and B line sensors read different lines on an original document, and perform appropriate processing to obtain pixel data of R, G, and B color component signals associated with the same line on the original document. If a predetermined signal processing is performed, an offset of read positions among lines cannot be negligible due to the influence of the vibration described above.

SUMMARY OF THE INVENTION

The present invention has been made in consideration of the above situation, and has as its first object to provide a color image processing apparatus which can appropriately discriminate a chromatic color area and an achromatic color area of an input image and can reproduce a high-quality color image.

In order to achieve the first object, according to a preferred aspect of the present invention, there is disclosed a color image processing apparatus which comprises means for judging an achromatic area of an input image from component signals of input color signals, and means for correcting an achromatic area signal as an output from the judgement means.

There is also disclosed a color image processing apparatus which comprises means for smoothing component signals of input color signals, and means for judging an achromatic area of an input image based on the smoothed component signals.

Furthermore, there is disclosed a color image processing apparatus which comprises means for generating an achromatic area signal, and means for processing input color signals using a specific single-color component of the input color signals.

It is a second object of the present invention to provide a color image processing apparatus which can appropriately discriminate whether an input image is a monochrome image or a color image, and can perform image processing according to the discriminated image.

In order to achieve the second object, according to another preferred aspect of the present invention, there is disclosed a color image processing apparatus which comprises means for generating a chromatic/achromatic judgement signal of a specific pixel in a block area based on pixel data in the block area consisting of a plurality of pixels, and means for automatically discriminating, on the basis of a plurality of judgement signals, whether an input image signal is a monochrome image signal or a color image signal.

It is third object of the present invention to provide a color image processing apparatus which can precisely judge a saturation by utilizing a color attribute of an input signal.

In order to achieve the third object, according to still another preferred aspect of the present invention, there is disclosed a color image processing apparatus which comprises input means for inputting a plurality of color component signals, means for judging a hue of a pixel to be judged based on the color component signals, and saturation judgement means for switching a saturation judgement reference in accordance with the output from the hue judgement means.

It is a fourth object of the present invention to provide a color image processing apparatus which employs image input means in which a plurality of line sensors for generating color component signals based on different spectral characteristics are arranged in parallel with each other.

In order to achieve the fourth object, according to still another preferred aspect of the present invention, there is disclosed a color image processing apparatus which comprises image input means in which a plurality of line sensors for generating color component signals based on different spectral characteristics are arranged in parallel with each other, and means for performing black character processing on the basis of the color component signals input from the image input means.

There is also disclosed a color image processing apparatus which comprises image input means in which a plurality of line sensors for generating color component signals based on different spectral characteristics are arranged in parallel with each other, and means for performing monochrome/color judgement of the input image on the basis of the color component signals input from the image input means.

The above and other objects and features of the present invention will become apparent from the following description of the embodiments and the accompanying drawings.

BRIEF DESCRIPTION OF THE DRAWINGS

FIG. 12 is a graph for explaining a black area in a max(R,G,B)–min(R,G,B) space of the first embodiment of the present invention;

FIG. 13-1 is a graph showing a distribution of max(R,G,B)–min(R,G,B) values of input color original signals according to the first embodiment of the present invention;

FIG. 13-2 is a graph showing a distribution of max(R,G,B)–min(R,G,B) values of smoothed input color signals according to the first embodiment of the present invention;

FIG. 13-3 is a view showing a sample of a black character original document according to the first embodiment of the present invention;

FIG. 14 is a view for explaining a state wherein a corrected black area is reproduced from a black character of an original document according to the first embodiment of the present invention;

FIG. 15 shows OR signal processing of the first embodiment of the present invention;

Figure 1:
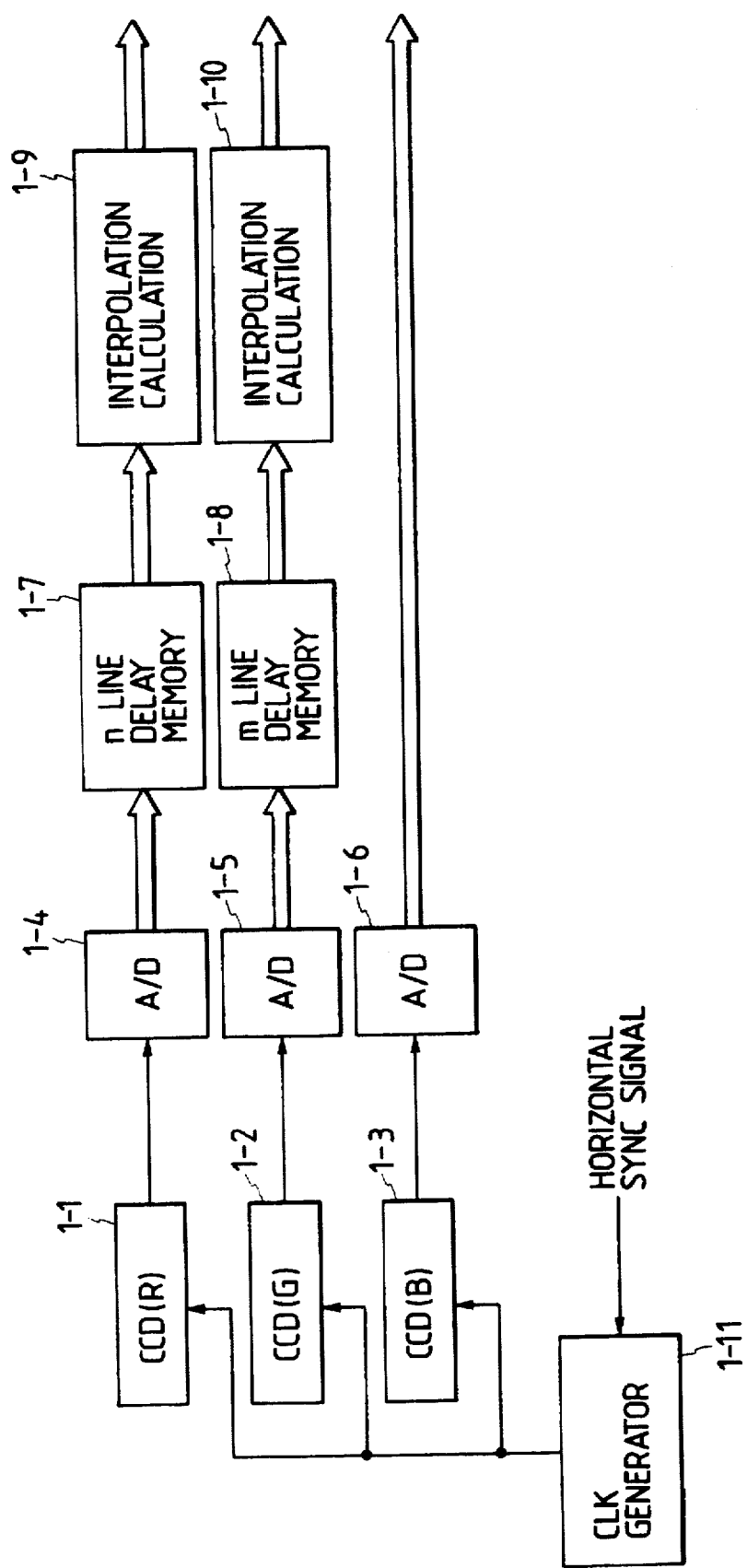
FIG. 1 is a signal processing block diagram of a reading apparatus according to a first embodiment of the present invention.
Figure 2:
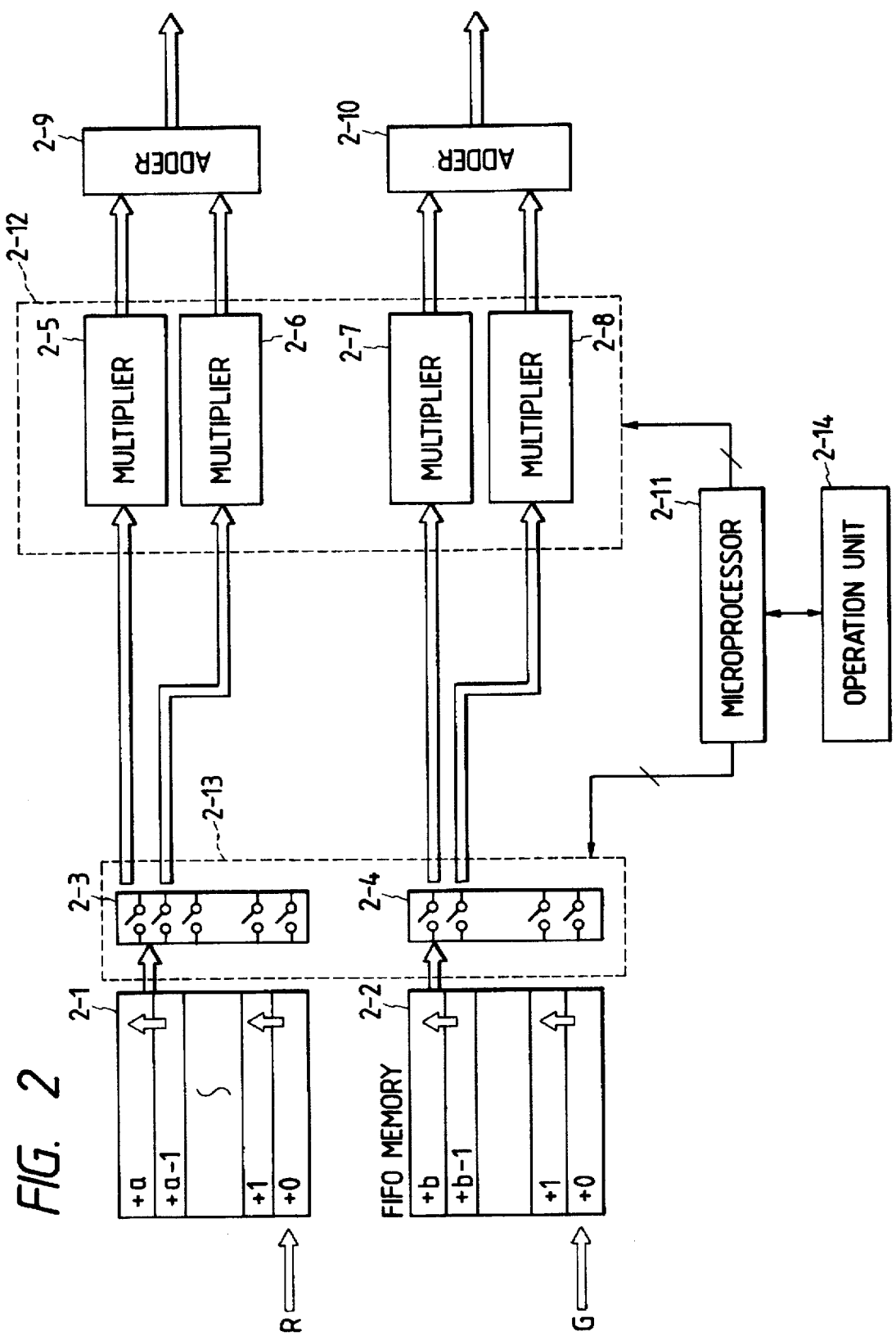
FIG. 2 is a block diagram of a delay line memory and an interpolation calculation unit.
Figure 27:
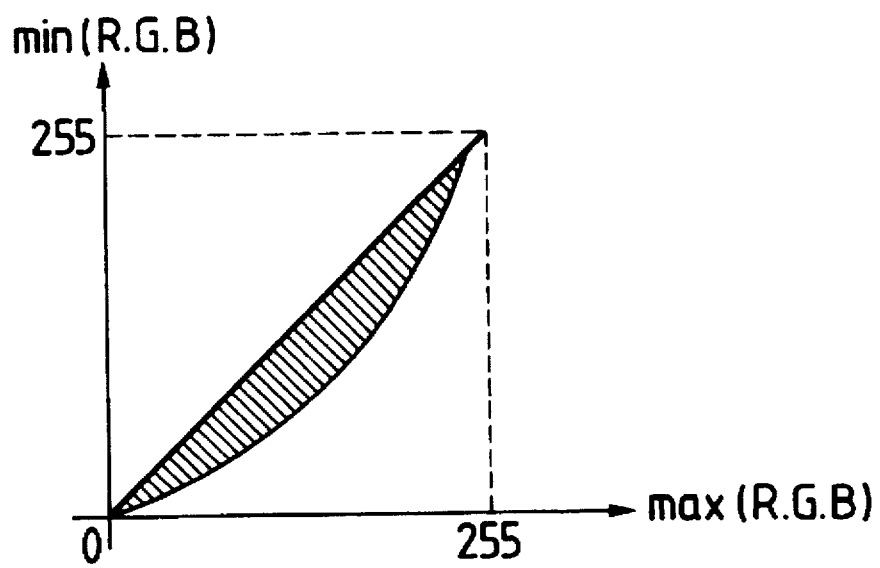
Figures 1, 28:
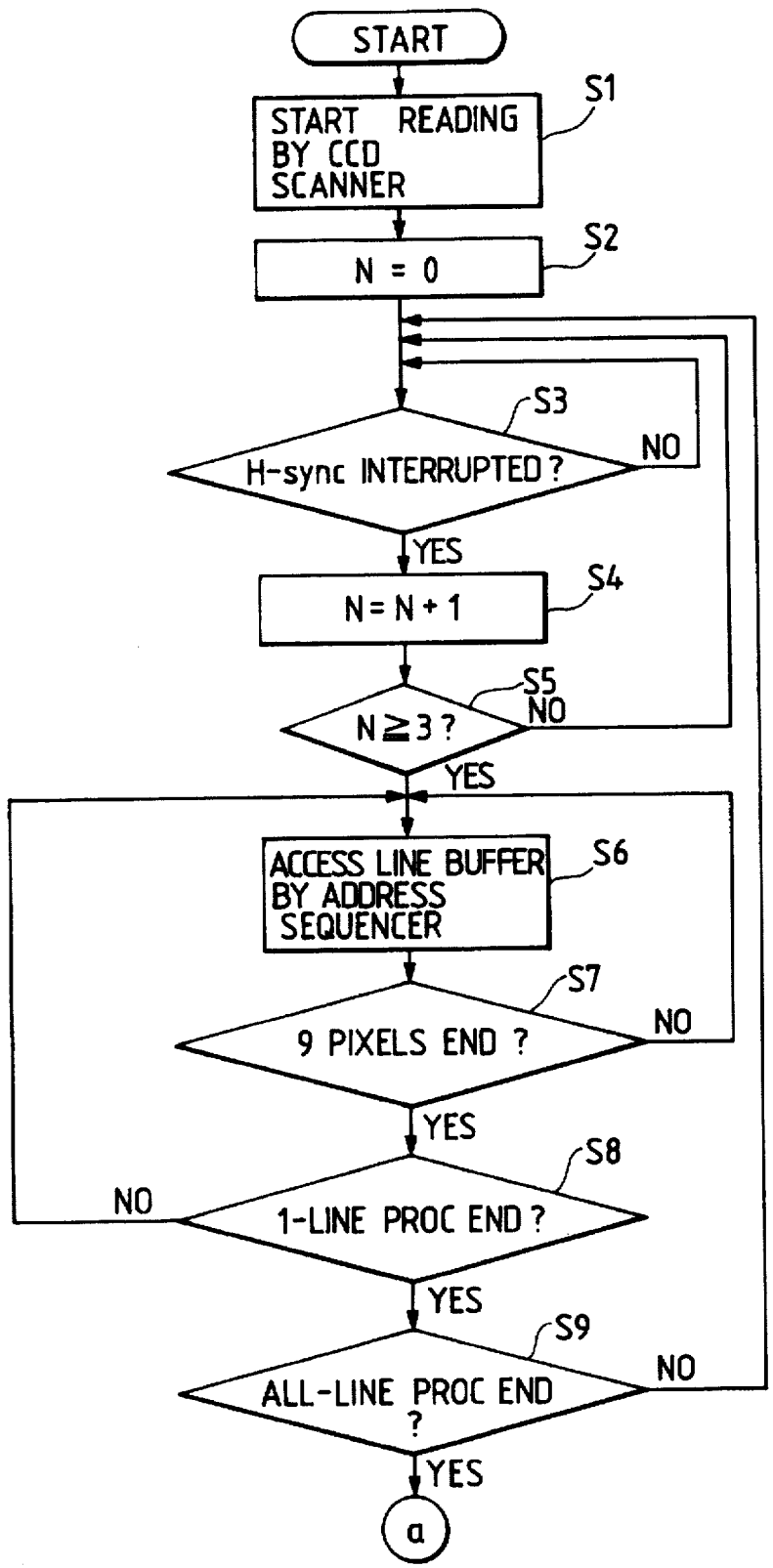
Figures 2, 28:
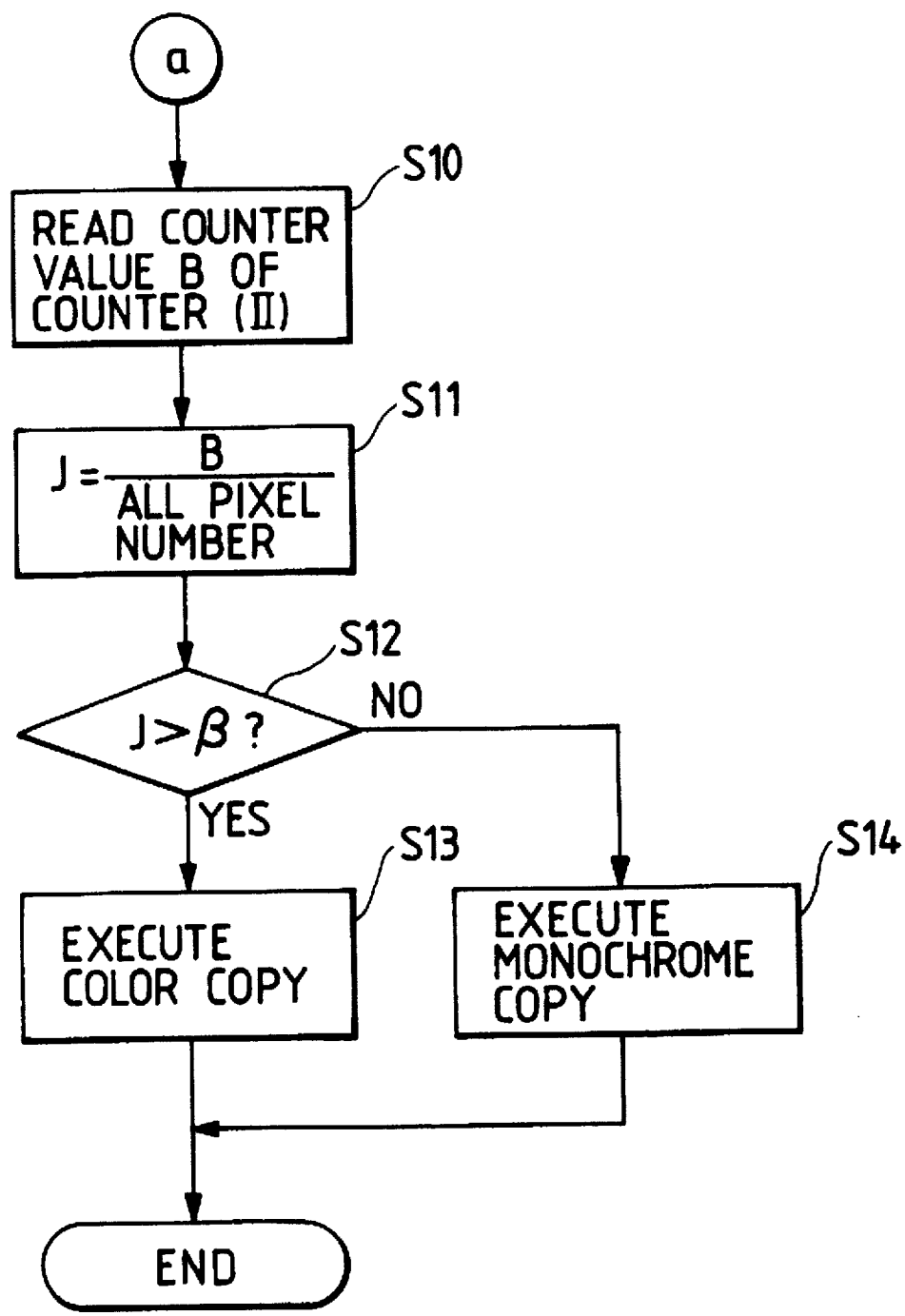
Figure 29:
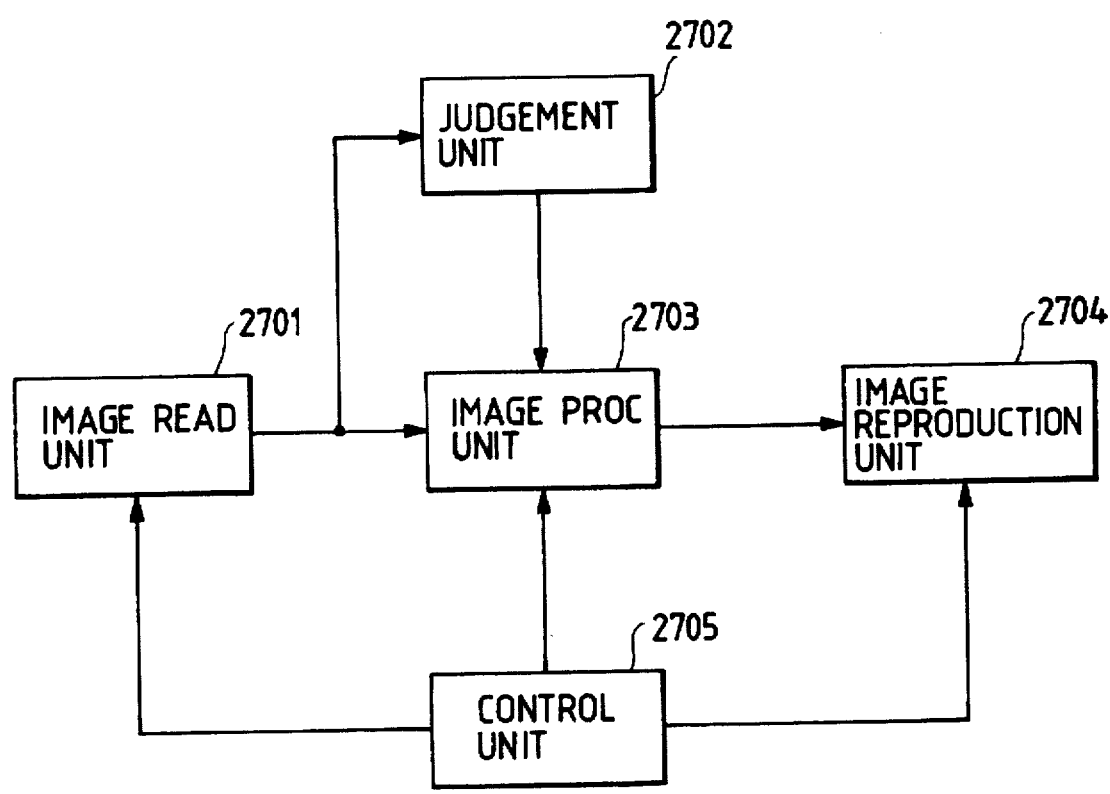
Figures 1, 33:
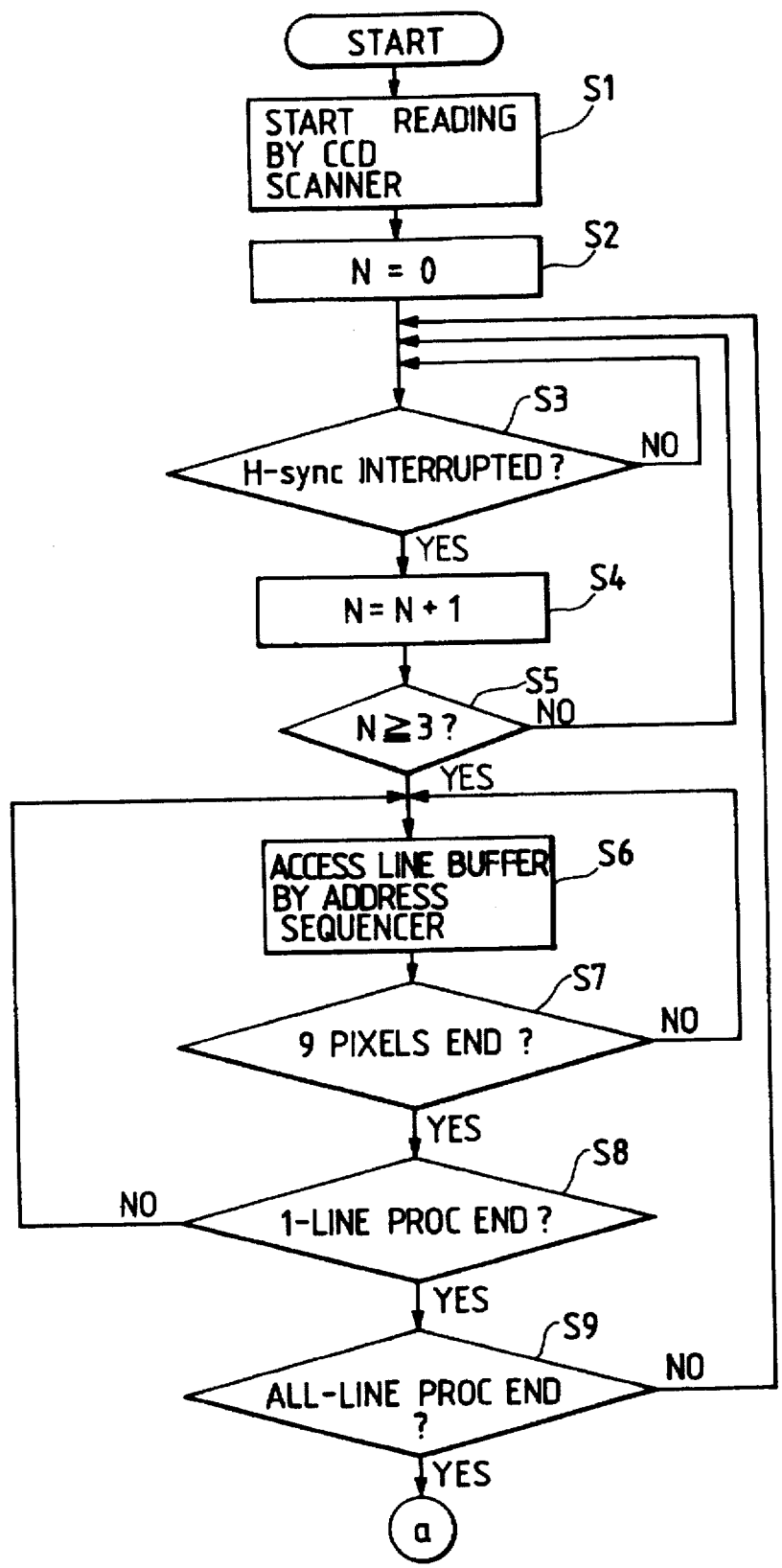
Figures 2, 33:
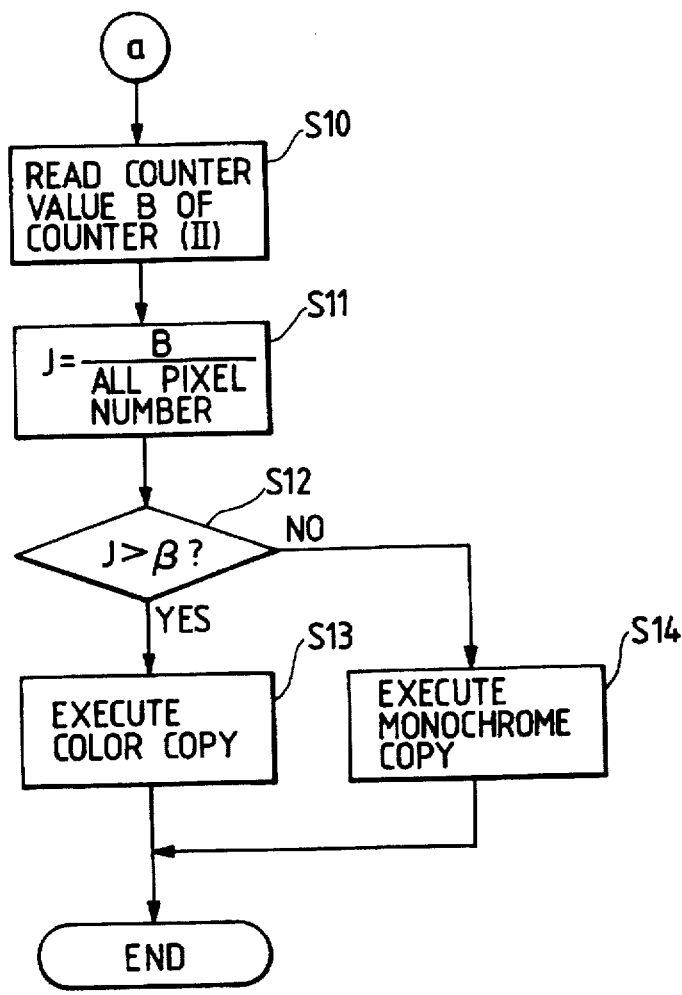
Figure 34:
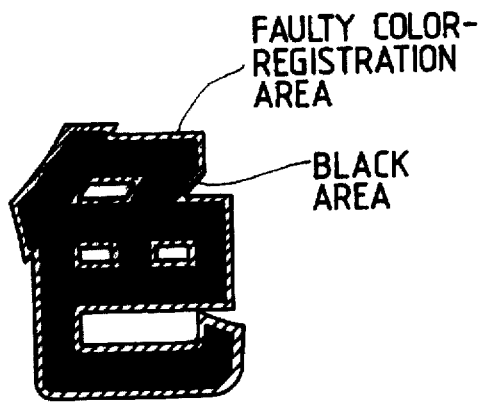
Figure 35:
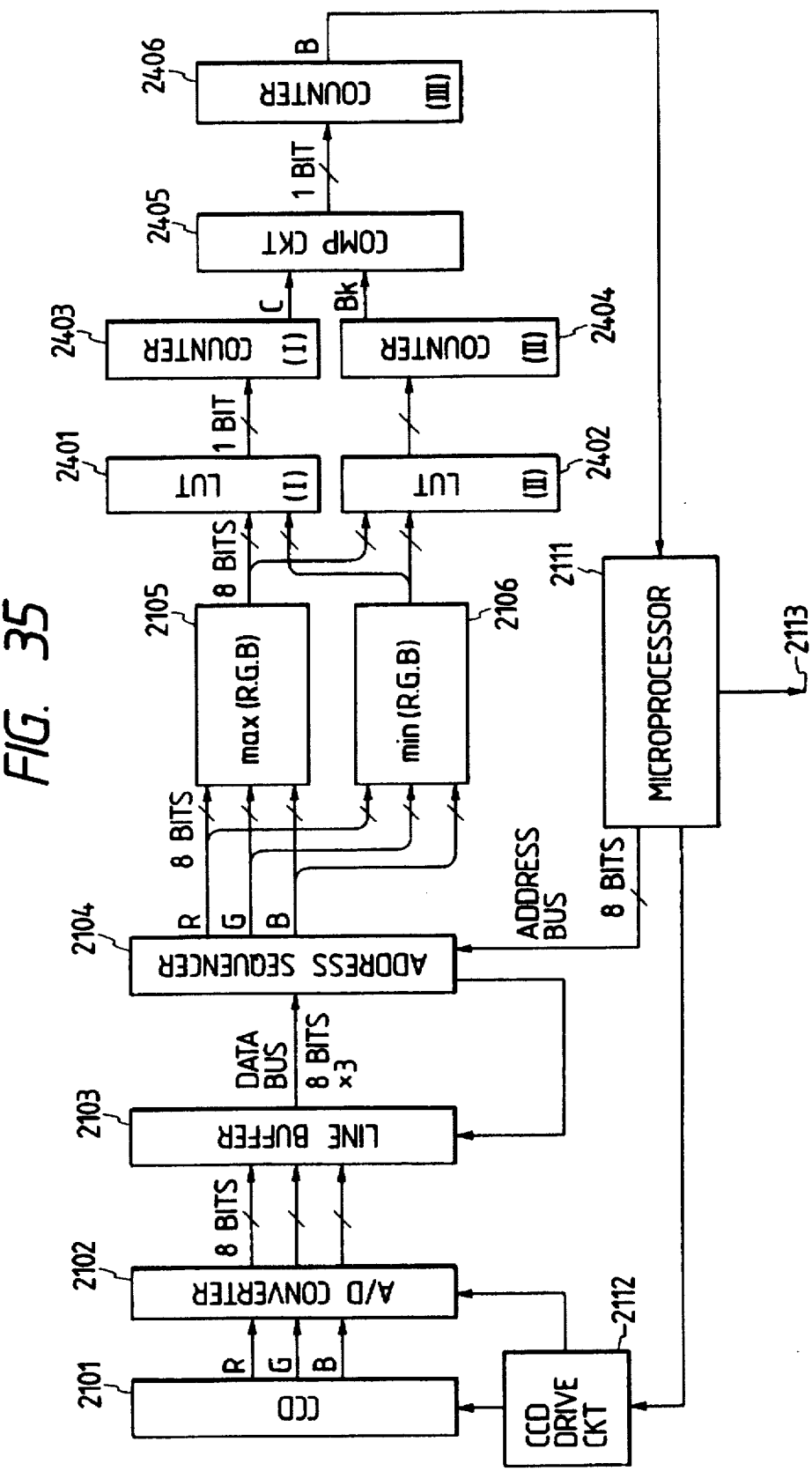
Figure 36:
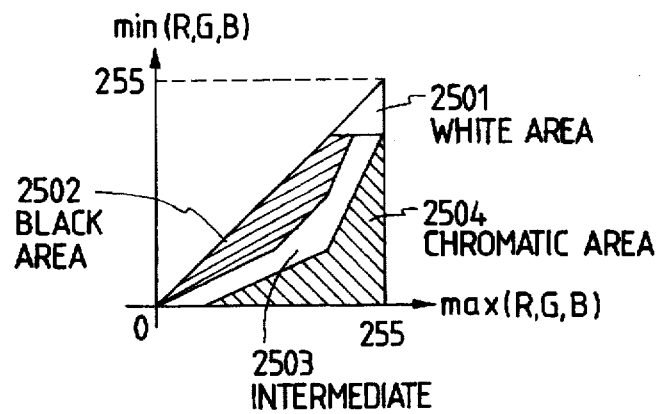
Figure 38:
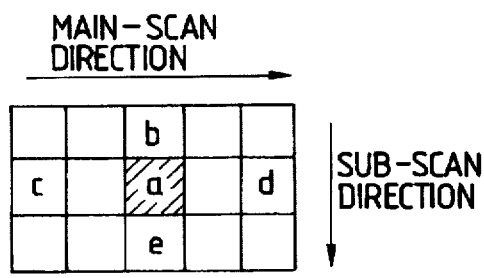
Figure 39:
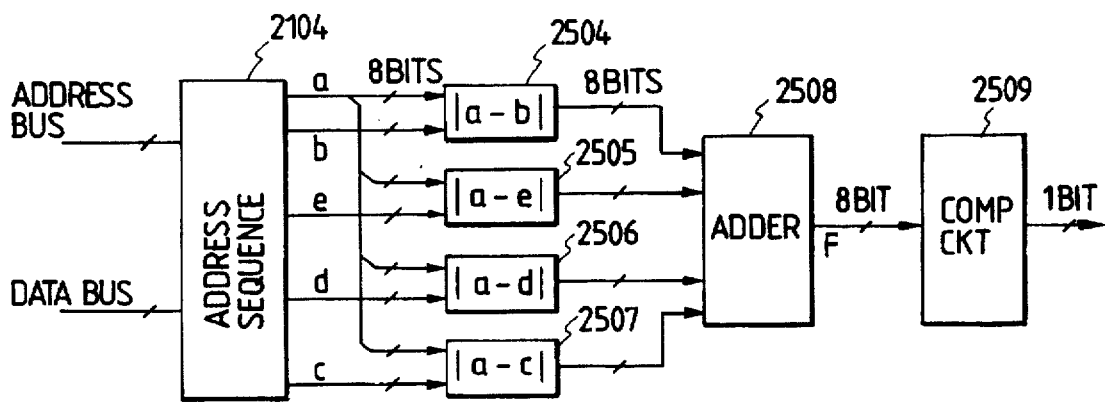
Figure 37:
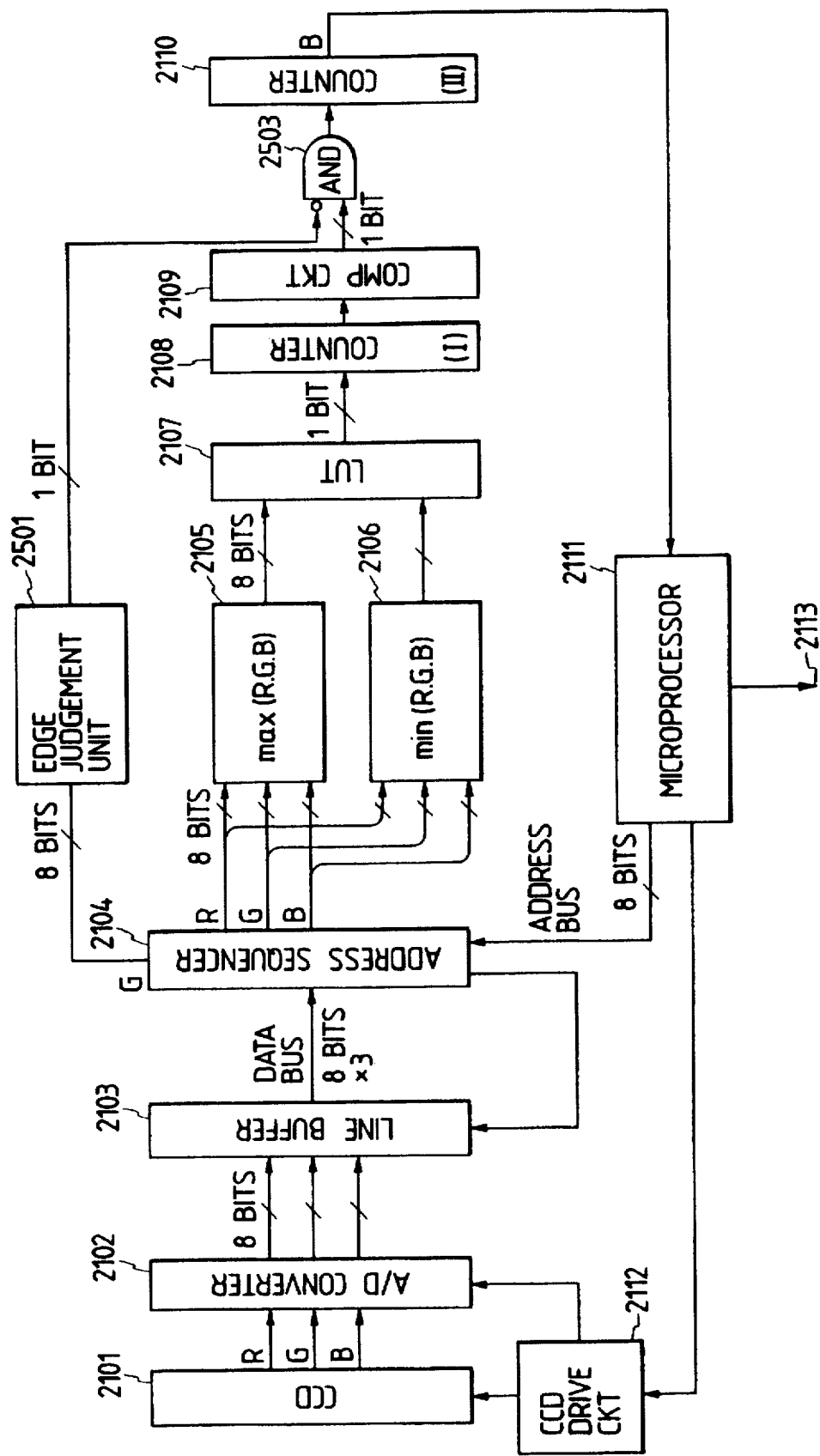
Figures 1, 40:
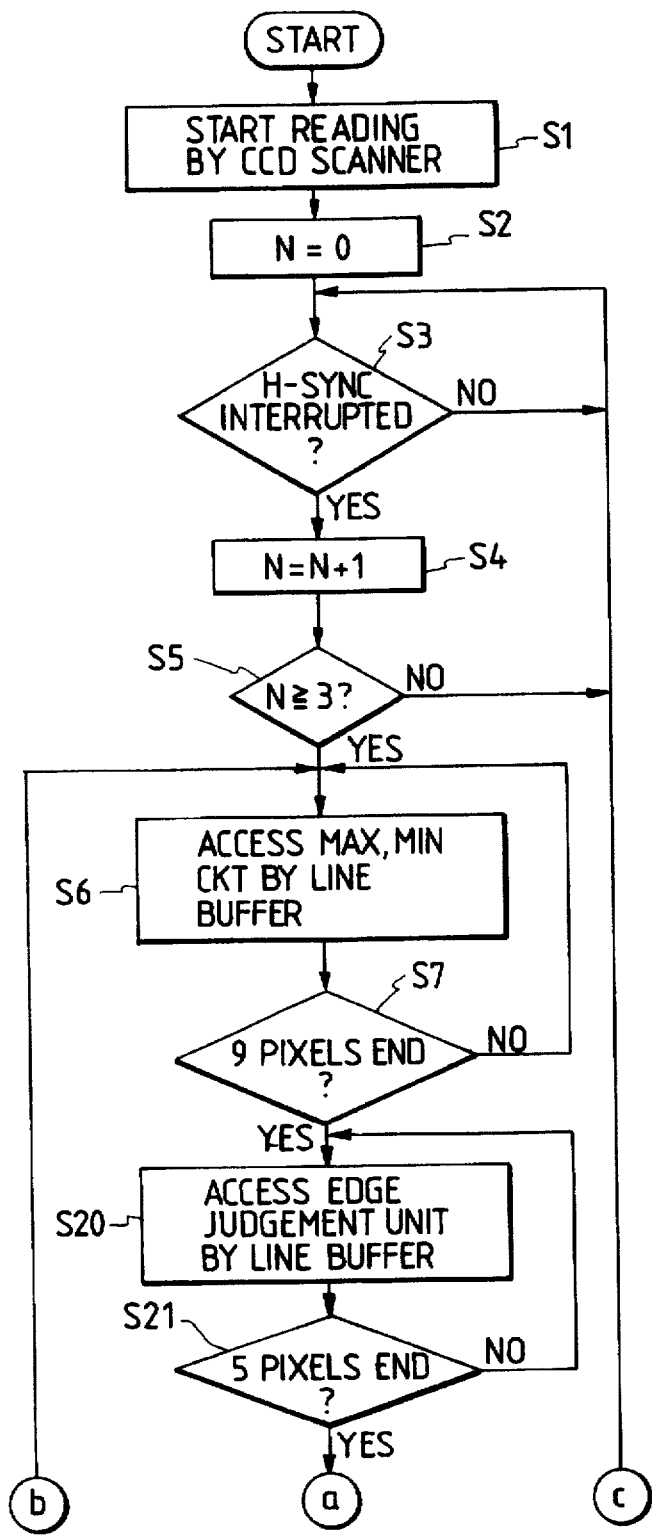
Figures 2, 40:
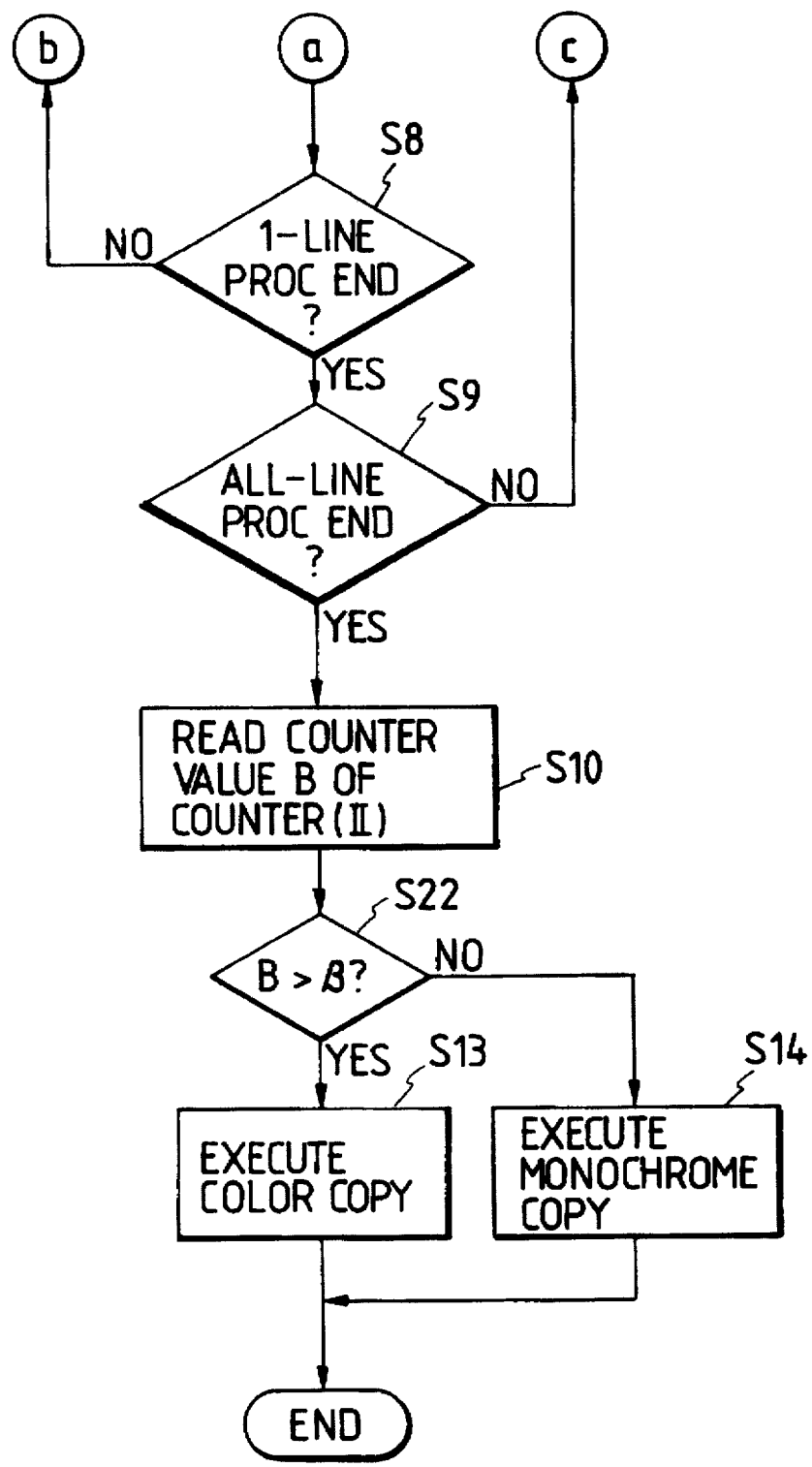
Figures 1, 41:
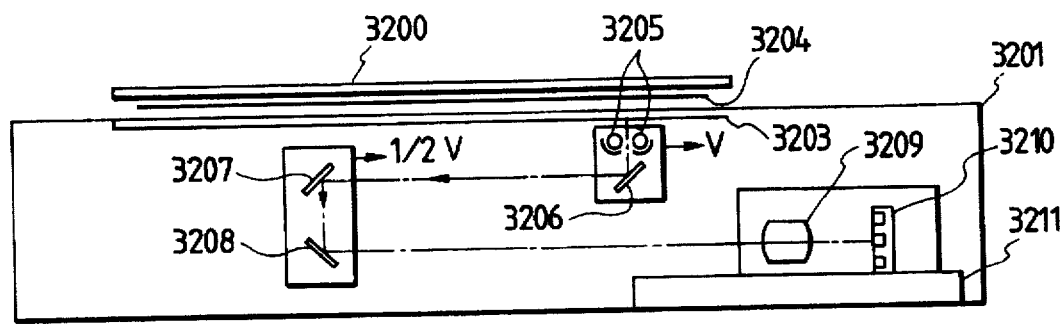
Figures 2, 41:
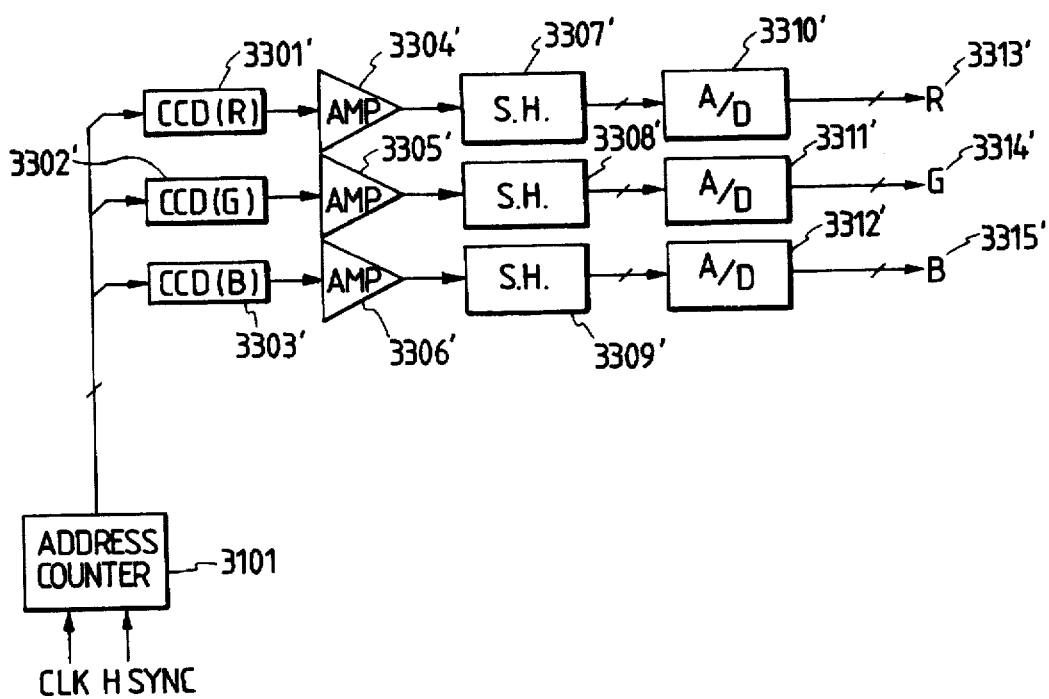
Figure 42:
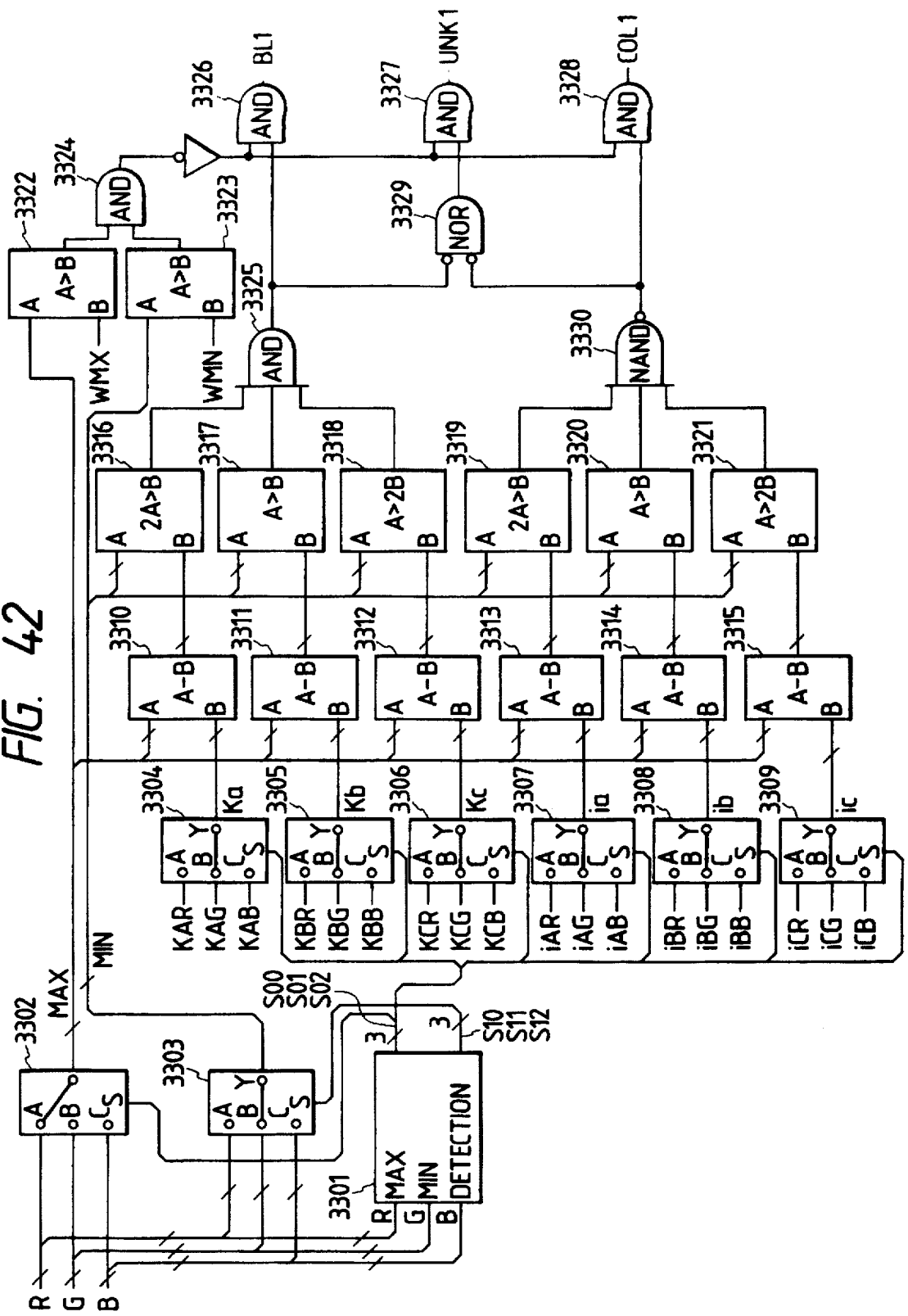
Figures 1, 43:
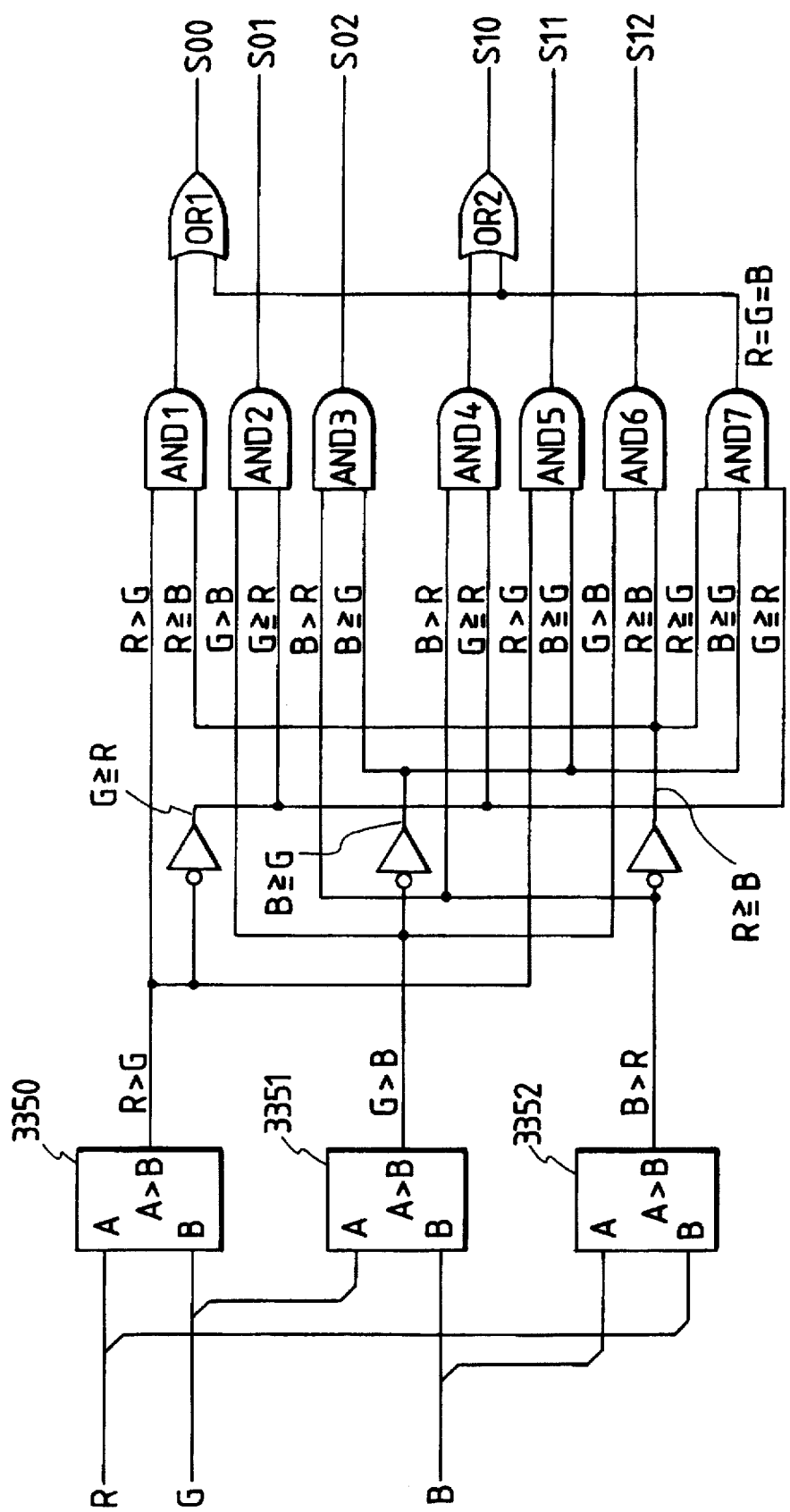
Figures 1, 2, 43, 44:
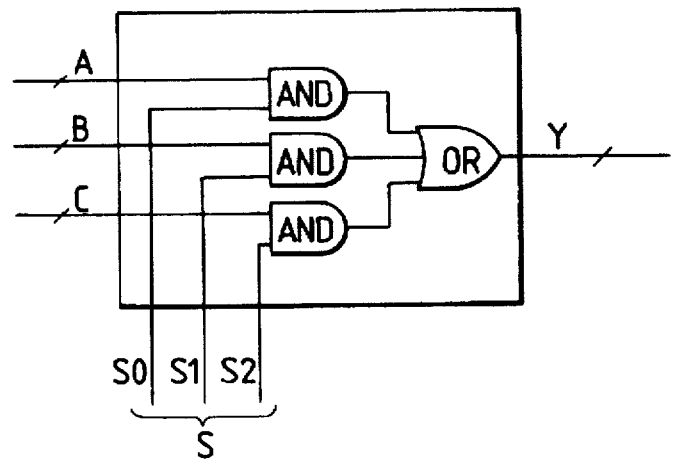
Figures 1, 2, 45:
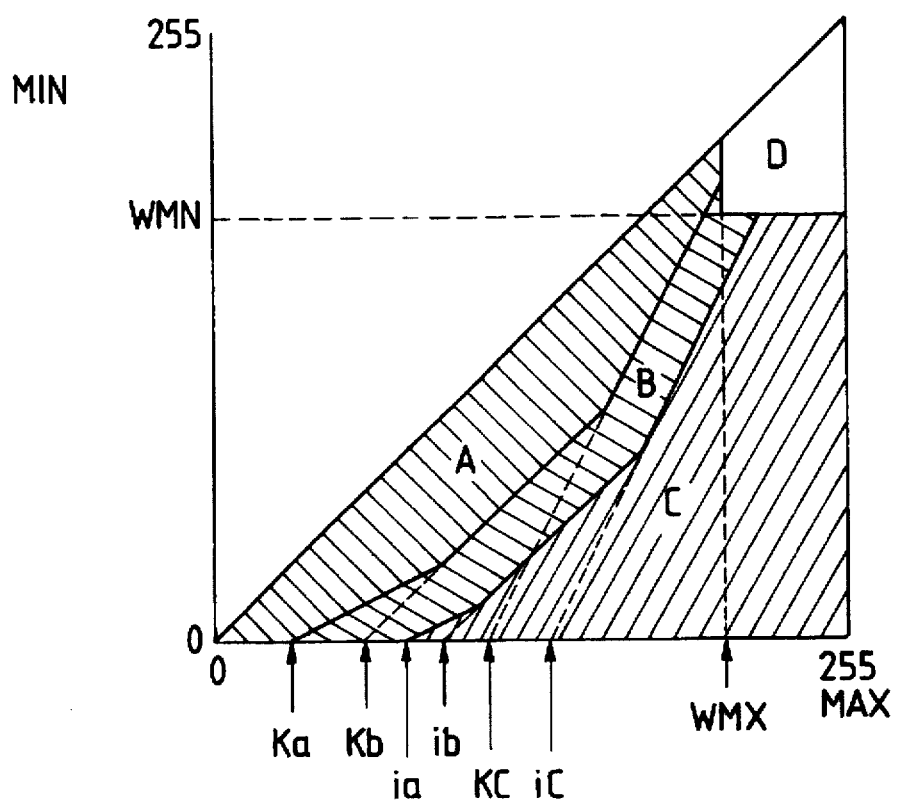
Figure 46:
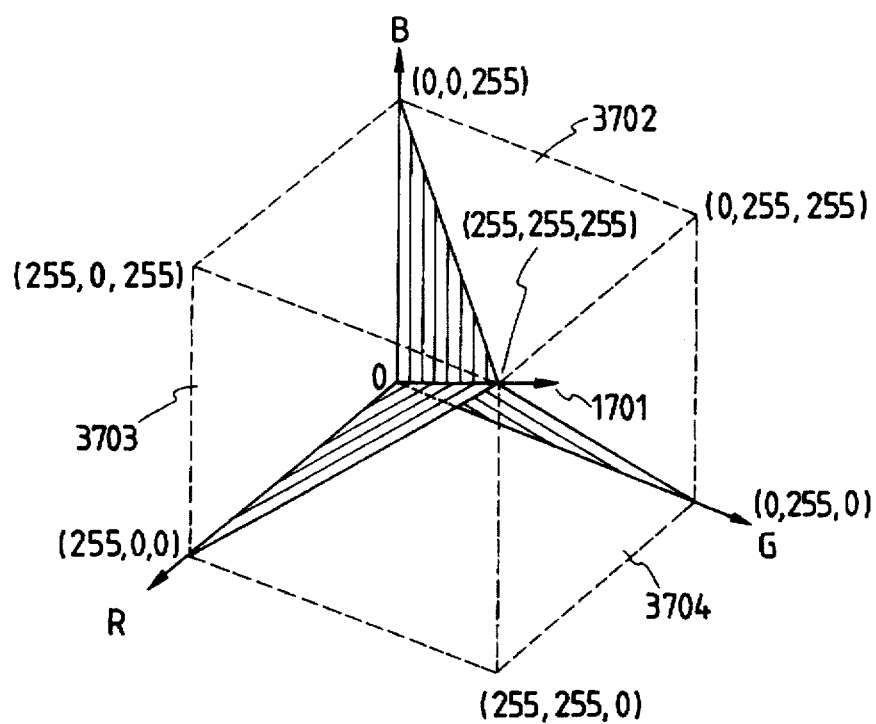
Figure 49:
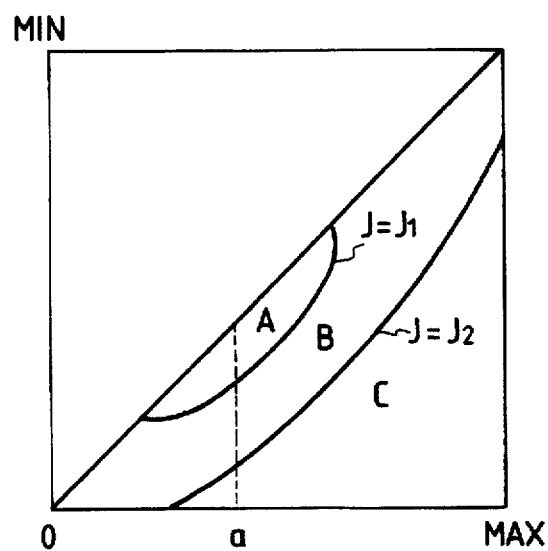
Figure 47:
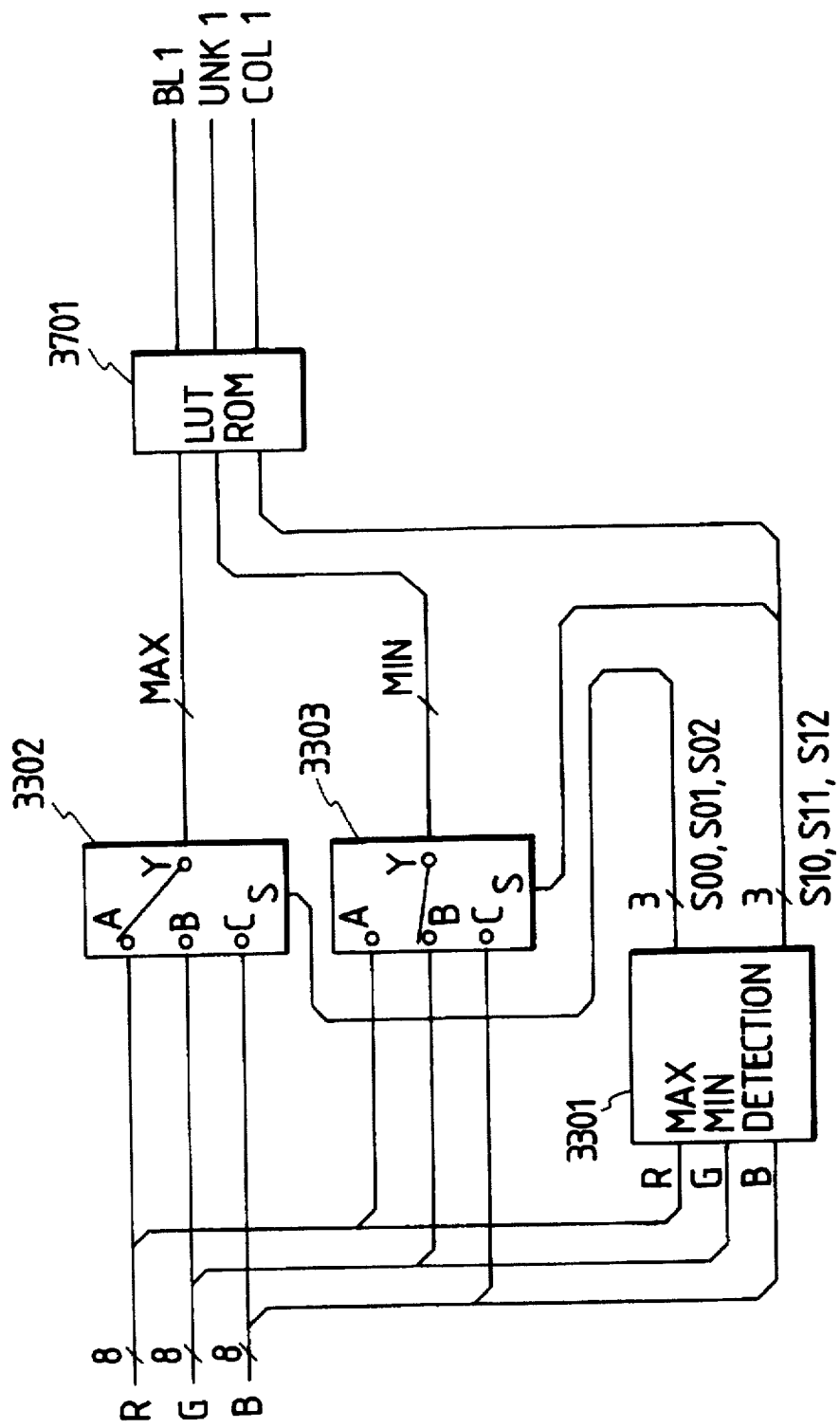
Figure 48:
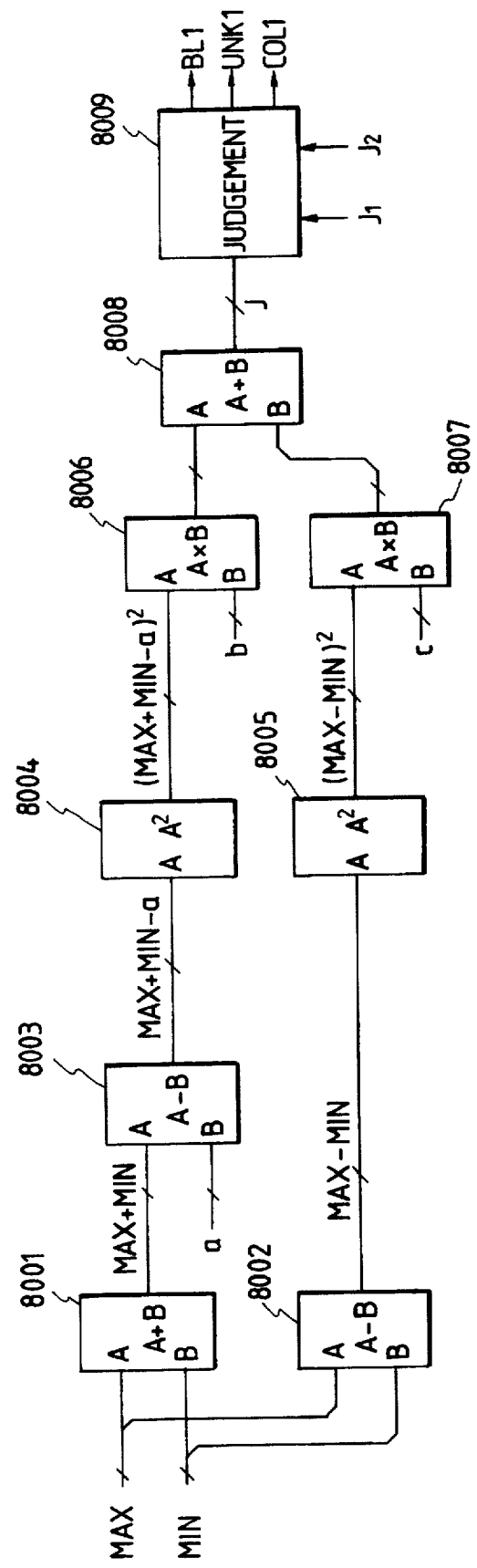
Figure 50:
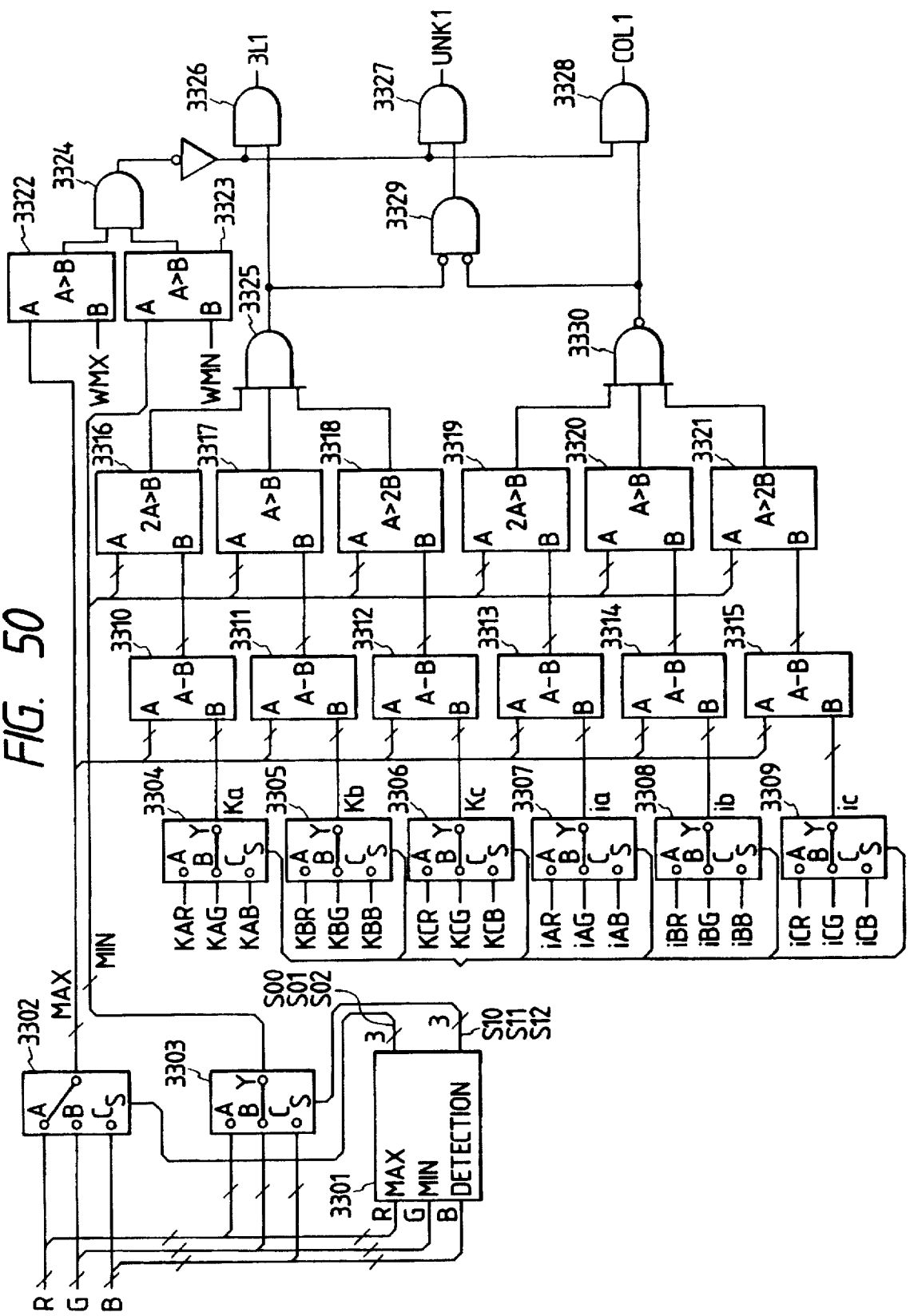
Figure 51:
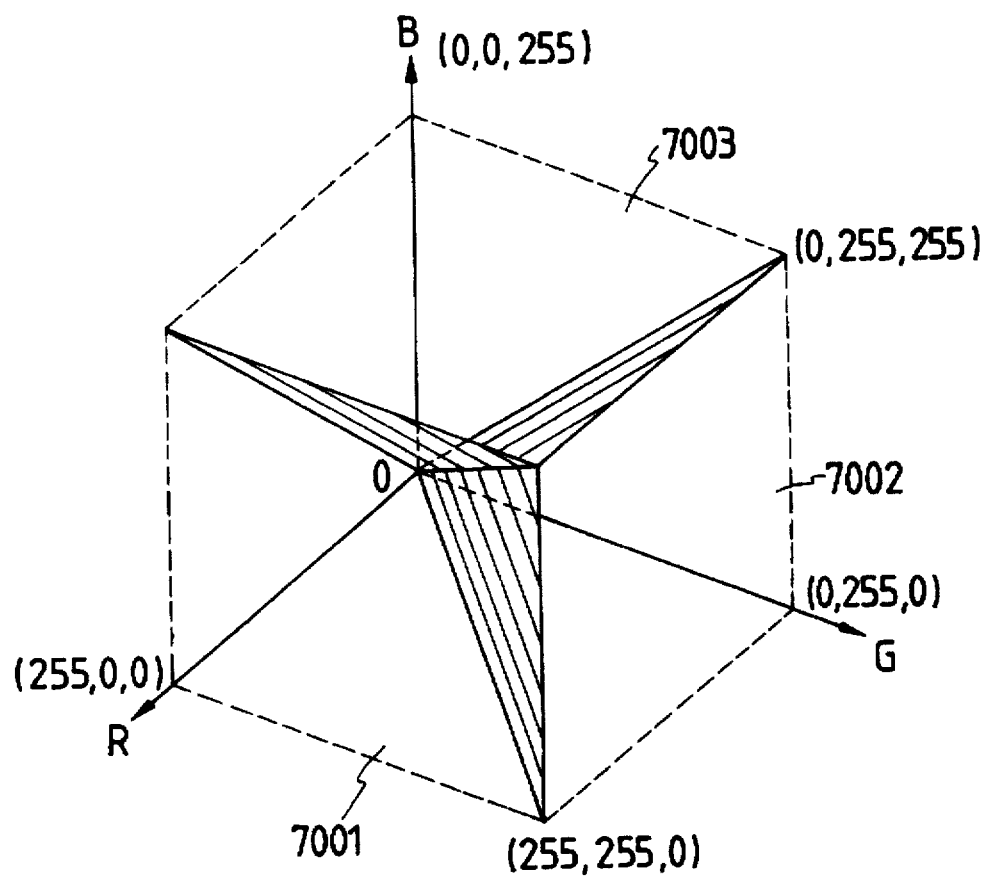
Figure 53:
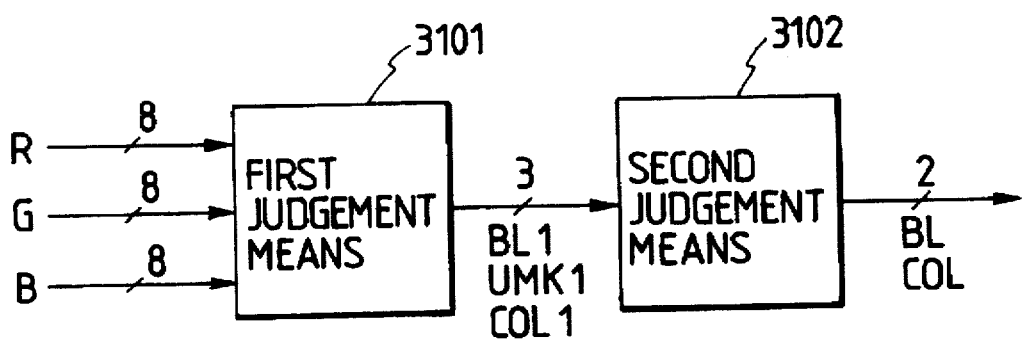
Figure 52:
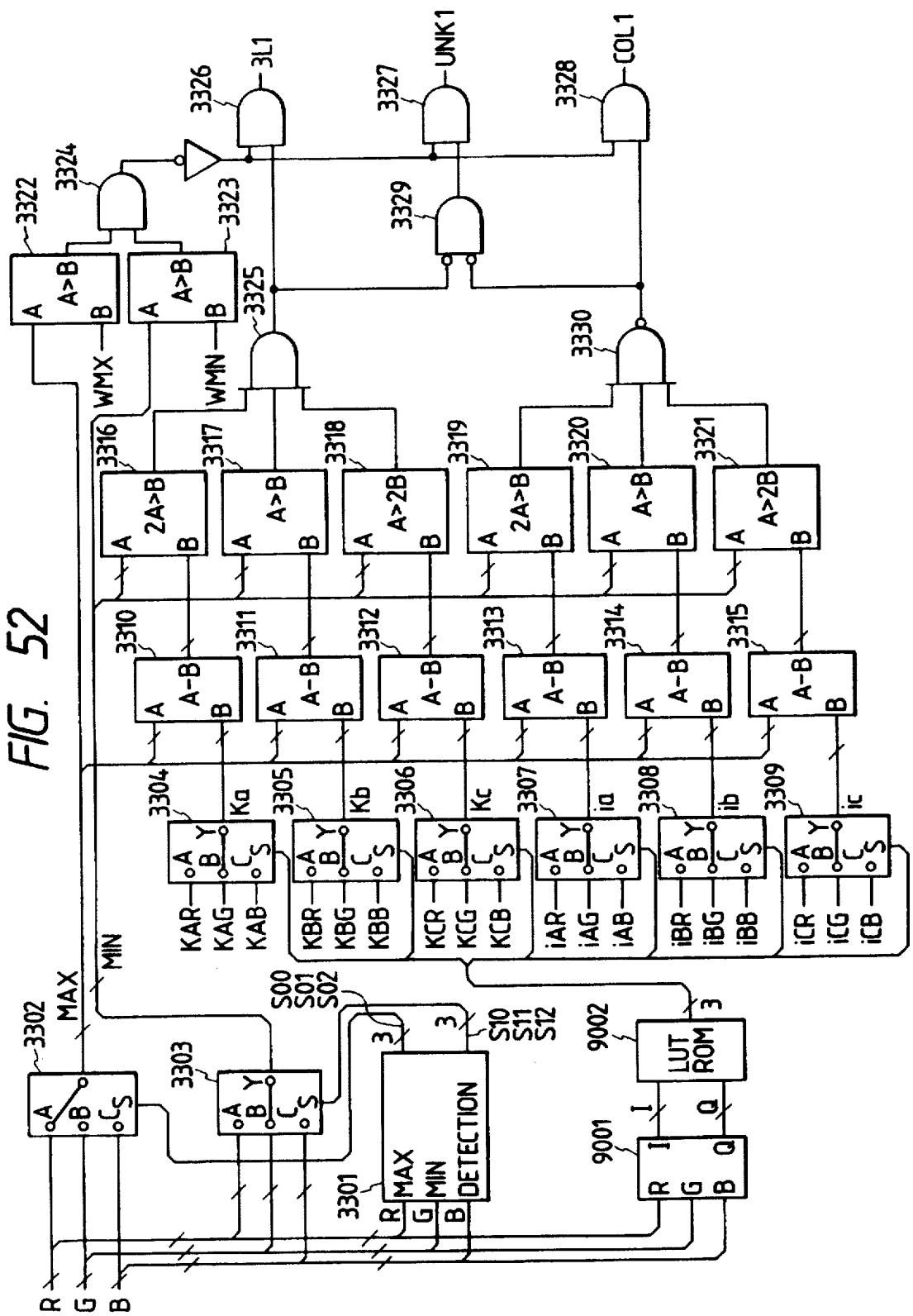
Figure 54:
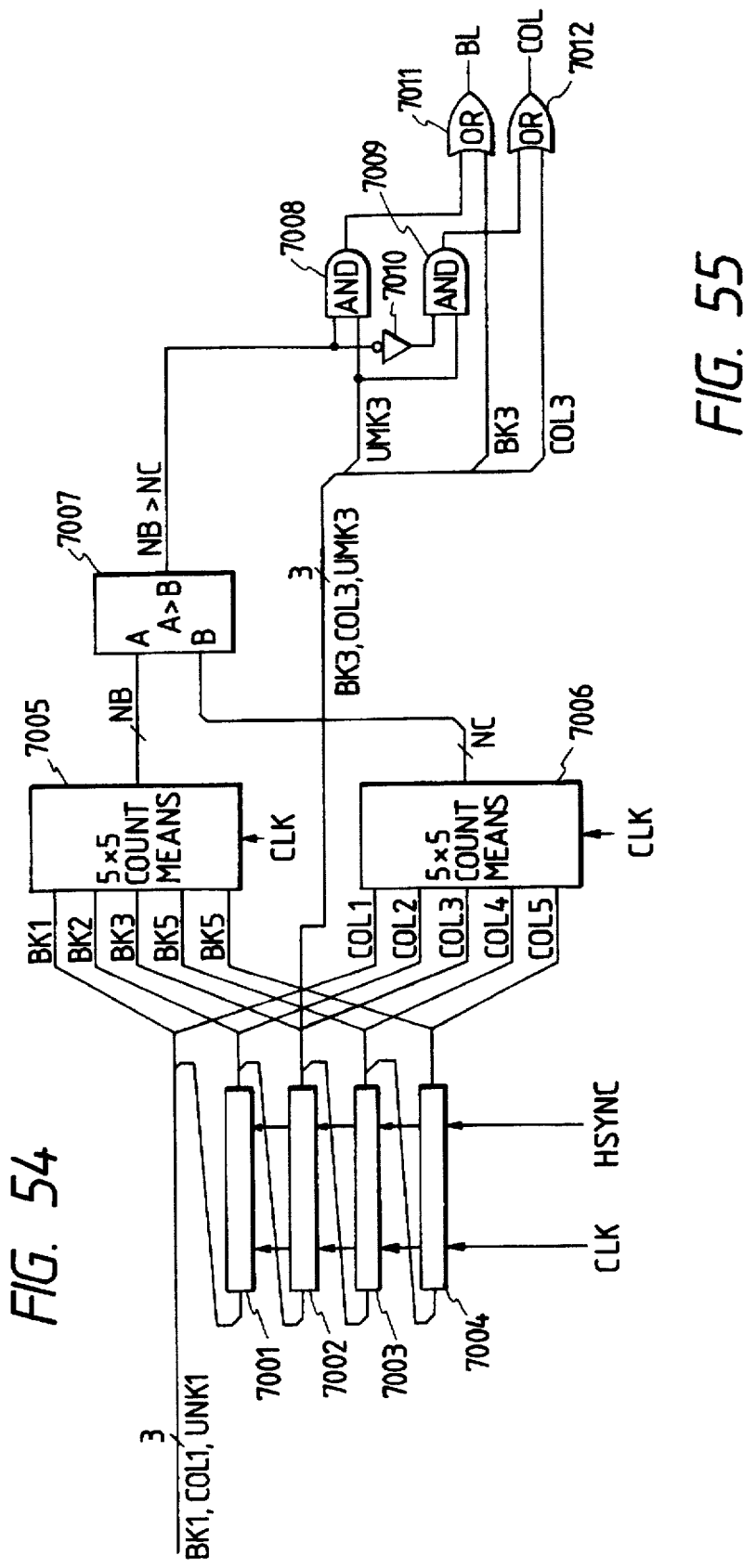
Figure 55:
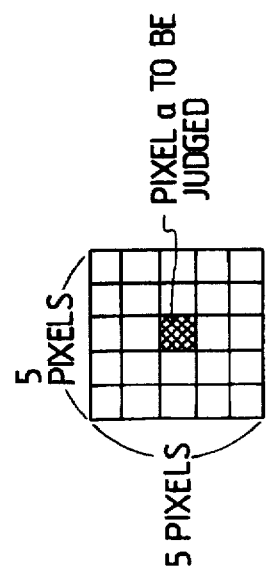

FIG., 26 is a graph showing a conventional chromatic judgement space;

FIG. 27 is a graph showing a distribution of black character input data;

FIGS. 28-1 and 28-2 are flow charts of a microprocessor 2111 according to the fourth embodiment of the present invention;

FIG. 29 is a block diagram showing the relationship between the present invention and the entire image processing apparatus;

FIG. 30 is a cross-sectional view showing the overall arrangement of a color copying machine;

FIG. 31 is a block diagram of a judgement circuit according to a fifth embodiment of the present invention;

FIG. 32 shows a storage state of a line buffer according to the fifth embodiment of the present invention;

FIGS. 33-1 and 33-2 are flow charts of a microprocessor 2111 according to the fifth embodiment of the present invention;

FIG. 34 shows the relationship between a faulty color-registration area and a black character area when a black character is read by a color sensor;

FIG. 35 is a block diagram showing a judgement circuit according to a sixth embodiment of the present invention;

FIG. 36 is a graph showing a judgement area in a (max(R,G,B), min(R,G,B)) space according to the sixth embodiment of the present invention;

FIG. 37 is a block diagram showing a judgement circuit according to a seventh embodiment of the present invention;

FIG. 38 shows a window of a line buffer according to the seventh embodiment of the present invention;

FIG. 39 is a block diagram of an edge judgement unit 2501 according to the seventh embodiment of the present invention;

FIGS. 40-1 and 40-2 are flow charts of a microprocessor 2111 according to the seventh embodiment of the present invention;

FIG. 41-1 is a schematic view showing the overall arrangement of an eighth embodiment of the present invention;

FIG. 41-2 is an internal block diagram of an image scanner unit;

FIG. 42 is a block diagram of a saturation judgement section of a color judgement unit 211;

FIG. 43-1 is a circuit diagram of a MAX/MIN detector;

FIG. 43-2 is a view for explaining output signals of the MAX/MIN detector;

FIG. 44-1 is a circuit diagram of a selector;

FIG. 44-2 is a view for explaining output signals of the selector;

FIG. 45-1 is a graph showing a judgement condition;

FIG. 45-2 is a view for explaining judgement signals;

FIG. 46 is a chart showing an R-G-B color space;

FIG. 47 is a block diagram of a saturation judgement section according to a ninth embodiment of the present invention;

FIG. 48 is a block diagram of a saturation judgement section according to a tenth embodiment of the present invention;

FIG. 49 is a graph showing a judgement condition;

FIG. 50 is a block diagram of a saturation judgement section according to an eleventh embodiment of the present invention;

FIG. 51 is a chart showing an R-G-B hue space;

FIG. 52 is a processing block diagram of a saturation judgement section according to a twelfth embodiment of the present invention;

FIG. 53 is a block diagram showing an arrangement of a thirteenth embodiment of the present invention;

FIG. 54 is a block diagram of a second judgement means;

FIG. 55 shows a 5×5 matrix used in the second judgement means; and

Figure 56:
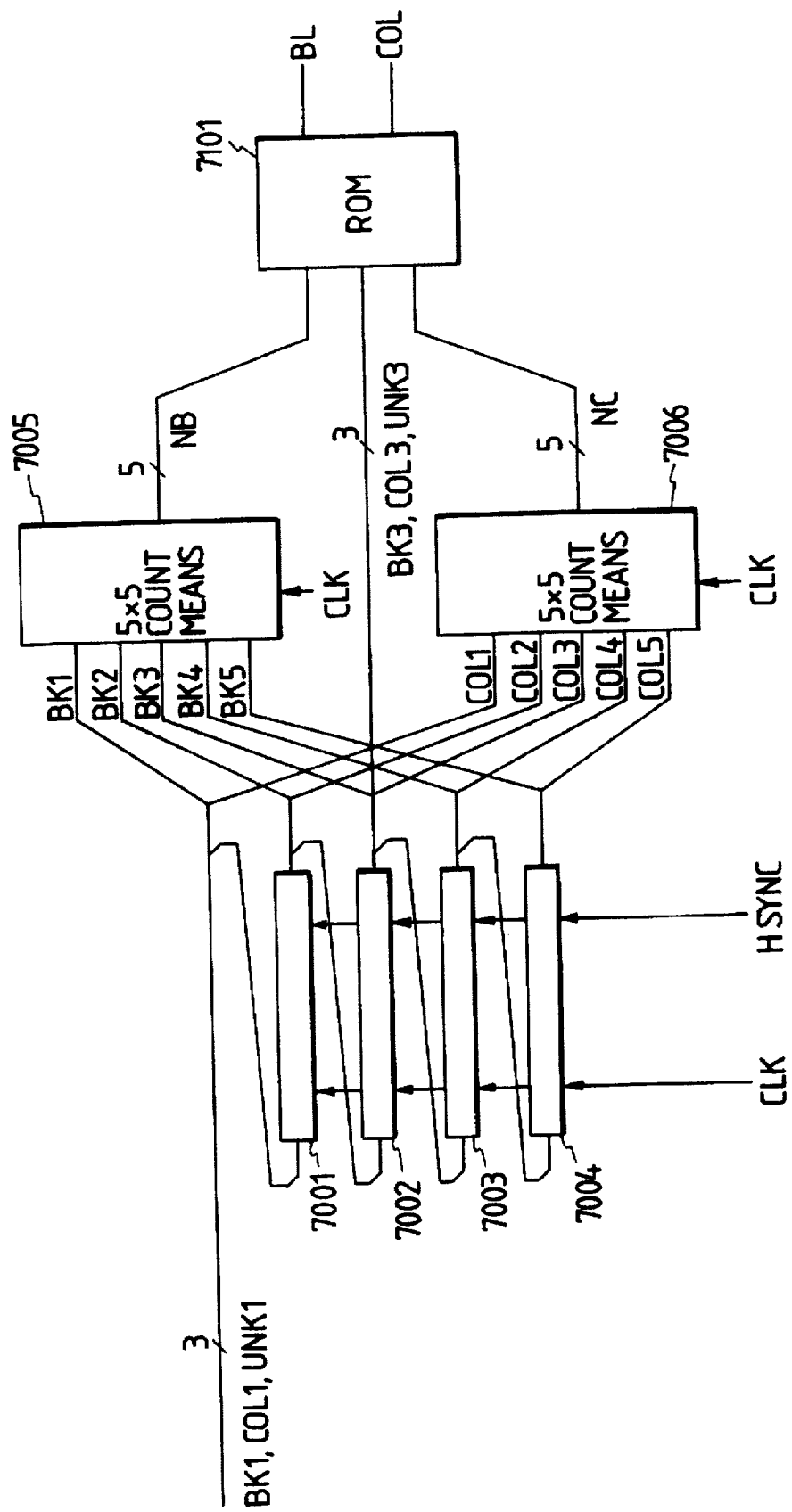

FIG. 56 is a block diagram of the second judgement means.

DETAILED DESCRIPTION OF THE PREFERRED EMBODIMENTS

First Embodiment

An arrangement of a 3-line sensor used as an input means in a first embodiment of the present invention will be explained below.

FIG. 1 is a block diagram of a sensor unit of an image processing apparatus of this embodiment. The sensor unit shown in FIG. 1 includes an R (red) color sensor 1-1, a G (green) color sensor 1-2, a B (blue) color sensor 1-3, analog-to-digital (A/D) converters 1-4, 1-5, and 1-6, an R sensor signal delay memory 1-7, a G sensor signal delay memory 1-8, an R sensor signal interpolation calculation section 1-9, and a G sensor signal interpolation calculation section 1-10. A clock generator 1-11 drives the sensors 1-1, 1-2, and 1-3 by the same clock signal. The clock generator generates a pixel clock signal (CCD transfer clock signal) in synchronism with a horizontal sync signal sent from a printer or a microprocessor 2-11 shown in FIG. 2.

FIG. 2 is a block diagram of the delay memories 1-7 and 1-8 and the interpolation calculation sections 1-9 and 1-10 shown in FIG. 1.

The circuit shown in FIG. 2 includes an R signal delay memory 2-1 comprising a FIFO memory, a G signal delay memory 2-2 comprising a FIFO memory, and selectors 2-3 and 2-4 for selecting sensor line data of the FIFO memories to be supplied to multipliers 2-5, 2-6, 2-7, and 2-8. The outputs of the multipliers 2-5 and 2-6 are connected to an adder 2-9, and the outputs of the multipliers 2-7 and 2-8 are connected to an adder 2-10. An operation unit 2-14 receives magnification data, and the like, and displays input data. A microprocessor 2-11 controls the multipliers 2-5, 2-6, 2-7, and 2-8 and the selectors 2-3 and 2-4 on the basis of magnification data from the operation unit 2-14.

Figure 3:
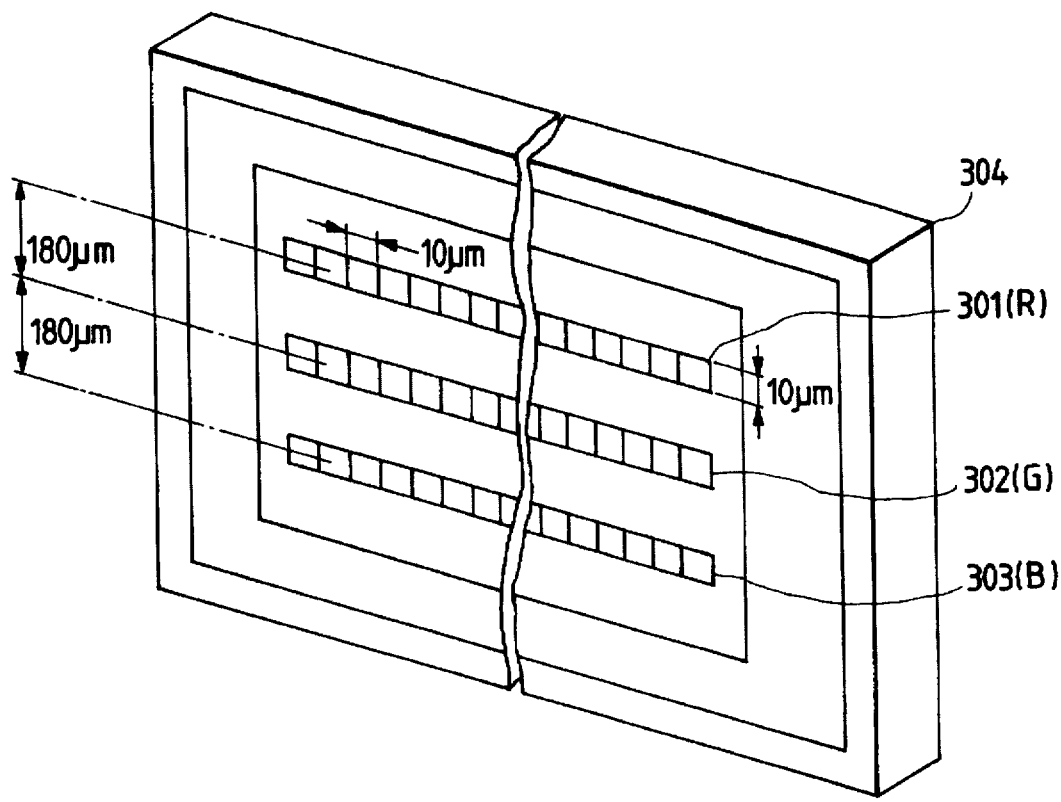
FIG. 3 is a perspective view of a 3-line parallel color sensor.

FIG. 3 is a perspective view of a 3-line parallel color sensor. The color sensor is constituted by an R (red) line sensor 301, a G (green) line sensor 302, a B (blue) line sensor 303, and a color sensor IC main body 304.

In this embodiment, a pitch of adjacent line sensors is 180 μm, and a sensor pixel width is 10 μm. Delay memory sizes required in an equal magnification read mode are 36 lines for the R signal delay memory 2-1 (FIG. 2), and 18 lines for the G signal delay memory 2-2, respectively.

In this embodiment, in order to allow a variable magnification of 100% to 400% in a sub-scan direction, the R signal delay memory 2-1 (FIG. 2) comprises a 144-line memory, and the G signal delay memory 2-2 comprises a 72-line memory.

Figure 4:
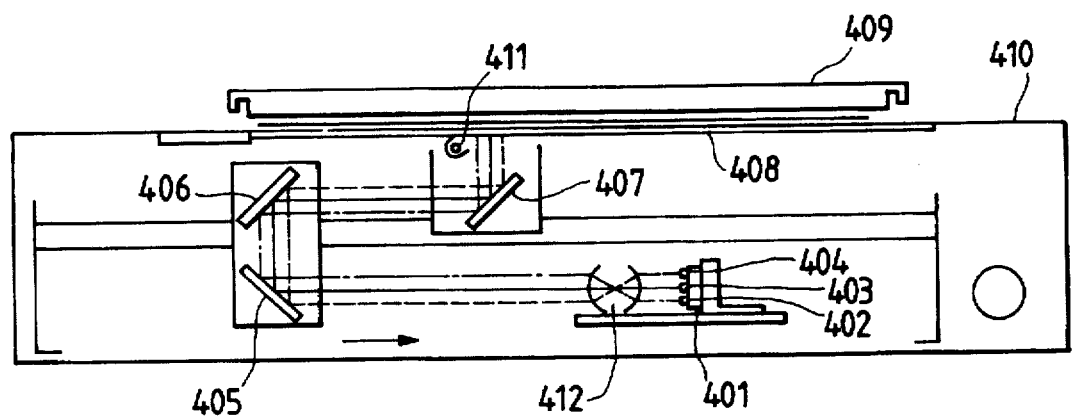
FIG. 4 is a view showing an arrangement of a reading apparatus.

FIG. 4 shows an arrangement of a reading apparatus.

The reading apparatus shown in FIG. 4 is constituted by a color sensor IC main body 401, an R line sensor 402, a G line sensor 403, a B line sensor 404, a third reflection mirror 405, a second reflection mirror 406, a first reflection mirror 407, an original document glass plate 408, an original document pressing plate 409, an illumination lamp 411 for exposing an original document, a focusing lens 412, and a reading apparatus main body 410. An original document is scanned in a direction of an arrow in FIG. 4.

Figure 6:
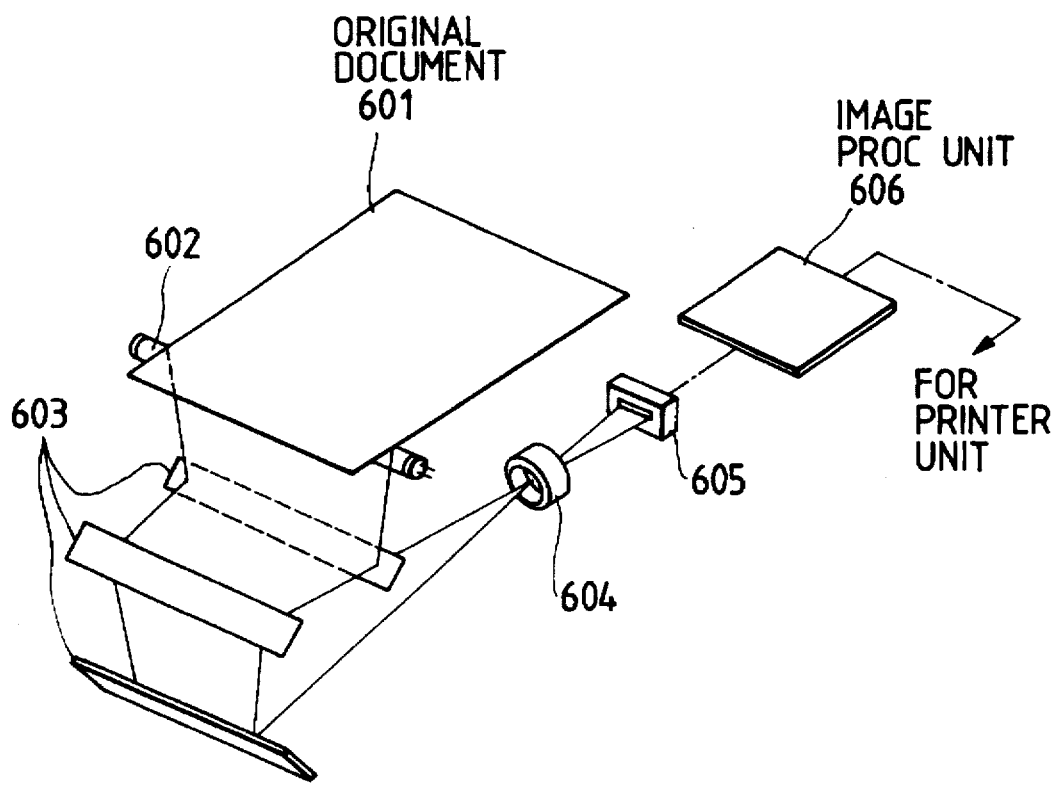
FIG. 6 is an explanatory view of a reading operation.

FIG. 6 schematically shows the reading apparatus.

An original document 601 is illuminated by a lamp 602. Light reflected by the document 601 is reflected by mirrors 603, and is focused on a 3-line sensor 605 by a lens 604. The 3-line sensor 605 converts the input light into an electrical signal and supplies it to an image processing unit 606.

Figure 5:
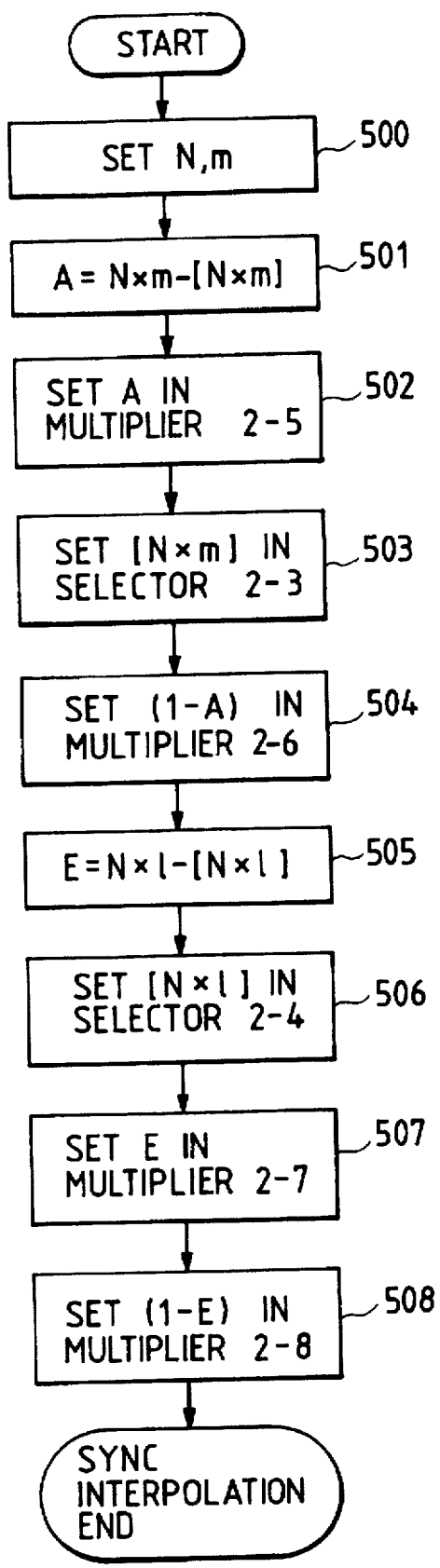
FIG. 5 is a flow chart showing processing of a microprocessor.

FIG. 5 is a flow chart of processing of the microprocessor 2-11 shown in FIG. 2.

A description will be made below with reference to the flow chart of FIG. 5.

Assume that magnification factors N and m are values each obtained by dividing a distance between the R and B sensors with a distance in the sub-scan direction of the sensor or a read pixel pitch in the sub-scan direction in an equal magnification mode.

Assuming that 105% variable magnification in the sub-scan direction is to be performed, N=1.05. As described above, in this embodiment, since m=36, the number of pixels included between the R and B line sensors is N×m= 1.05×36=37.8 (pixels). Note that N×m represent the number of read pixels between sensors at the magnification factor N.

In the FIFO memory 2-1 in FIG. 2, pixel data on a 37th line is represented by D(37), and pixel data on a 38th line is represented by D(38) so as to calculate a value of an R (red) signal corresponding to the same position as an original document position where the B (blue) sensor currently reads by a linear calculation expressed by equation (1):

$$D(37.8)=0.2\times D(37)+0.8\times D(38) \tag{1}$$

The microprocessor 2-11 performs control corresponding to the above-mentioned interpolation processing.

In step 500, N and m are set. In step 501, the microprocessor 2-11 calculates equation (2) below:

$$A=N\times m-[N\times m] \tag{2}$$

where [ ] represents integer processing for rounding off a decimal part.

In this embodiment, since m=36, for 105% sub-scan variable magnification, $$A=36\times 1.05-[36\times 1.05]=0.8 \tag{3}$$

In step 502, the microprocessor 2-11 sets the coefficient A in the multiplier 2-5 as a multiplication coefficient.

In step 503, the microprocessor calculates [N×m], and sets the result in the sensor 2-3. The value [N×m] is an integer part of a pixel interval in the sub-scan direction between the R and B line sensors in a variable magnification mode. When m=36 and N=1.05, [N×m]=37. Thus, the microprocessor 2-11 sets the selector 2-3 so that data D(37) (: pixel data in the +37th line) of the FIFO memory 2-1 is supplied to the multiplier 2-6, and D(37+1) data of the FIFO memory 2-1 is supplied to the multiplier 2-5.

In step 504, the microprocessor calculates (1−A), and sets the result in the multiplier 2-6 as a multiplication coefficient. Thus, equation (1) is calculated to obtain R data.

In order to obtain G data, equation (4) is calculated:

$$E=N\times l-[N\times l] \tag{4}$$

where l is a value obtained by dividing a distance between the G and B sensors by a distance in the sub-scan direction of the sensor or a read pixel pitch in an equal magnification mode.

In this embodiment, l=18. Therefore, when 105% variable magnification in the sub-scan direction is performed, since N=1.05 and N×l=18.9, the following equation must be calculated:

$$D(18.9)=0.1\times D(18)+0.9\times D(19) \tag{5}$$

Thus, E is set as follows:

$$E=18\times1.05-[18\times1.05]=0.9 \tag{6}$$

In step 506, the microprocessor calculates [N×l], and sets the selector 2-4. The value [N×l] corresponds to an integer part of a pixel interval in the sub-scan direction between the G and B line sensors in the variable magnification mode. When l=18 and N=1.05, [N×l]=18. Therefore, the microprocessor 2-11 sets the selector 2-4 so that data D(18) (pixel data in a +18th line) of the FIFO memory 2-2 is supplied to the multiplier 2-8, and data D(18+1) of the FIFO memory 2-2 is supplied to the multiplier 2-7.

In step 507, E=0.9 is set in the multiplier 2-7 as a multiplication coefficient. In step 508, (1−E)=0.1 is set in the multiplier 2-8 as a multiplication coefficient. In this manner, equation (4) is calculated to obtain G data D(18.9).

In the above description, m and l are integers. However, in practice, it is difficult to accurately set distances between the R and B sensors and between the G and B sensors. For example, if the distance in the sub-scan direction of the sensor (or a read pixel pitch in the sub-scan direction in the equal magnification mode) is 10 μm, when the distance between the R and B sensors is 365 μm and the distance between the G and B sensors is 178 μm, m=36.5 and l=17.8. In this case, even in the equal magnification mode, i.e., when N=1.0, interpolation processing must be performed, and equations (1) and (4) are rewritten as follows:

$$A'=1\times36.5-[1\times36.5]=0.5$$

$$\therefore D(36.5)=0.5\times D(36)+0.5\times D(37) \tag{1'}$$

$$E'=1\times17.8-[1\times17.8]=0.8$$

$$\therefore D(17.8)=0.2\times D(17)+0.8\times D(18) \tag{2'}$$

In any case, this processing can be realized by the flow chart of FIG. 5.

An arrangement and operation of the reading apparatus using the 3-line sensor will be described below with reference to FIGS. 7 and 8.

Figure 7:
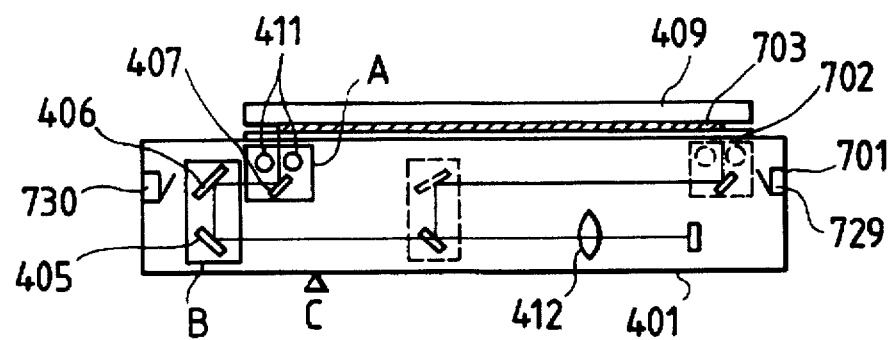
FIG. 7 is a schematic view showing an operation of the reading apparatus.
Figure 8:
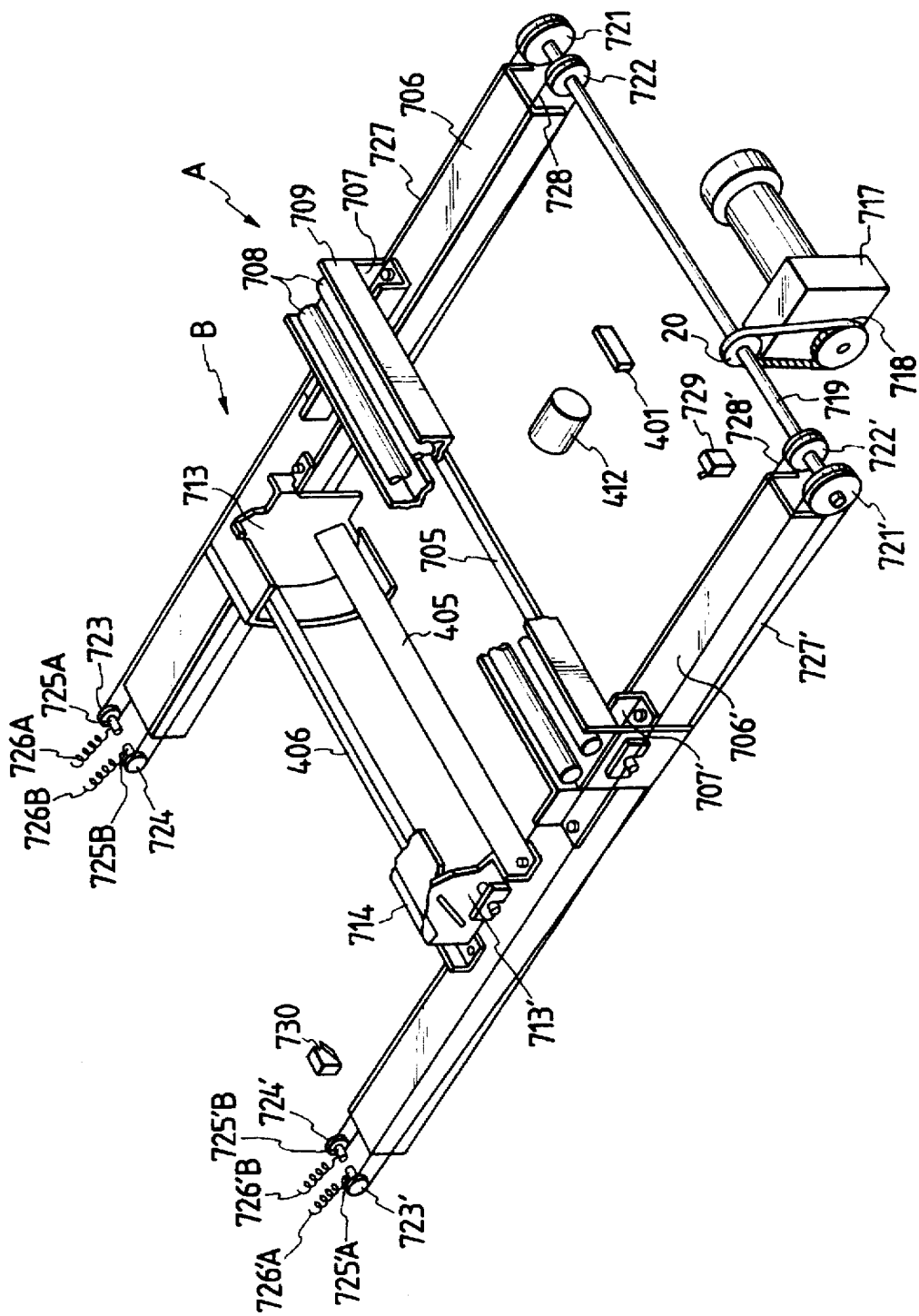
FIG. 8 is a perspective view showing a structure of the reading apparatus.

In FIGS. 7 and 8, the reading apparatus includes a machine housing 701, an original document glass 702, and an original document pressing plate 409 for pressing an original document 703. An optical system of the reading apparatus includes a first mirror 407 supported by support members 707 and 707' which are slidable along rails 706 and 706', lamps 411 for illuminating the original document 703, and lamp covers 709. The lamps 411 and the lamp covers 709 are fixed to the support members. The first mirror 407, the lamps 411, and the lamp covers 709 are moved together, and constitute a first mirror unit A. The optical system also includes second and third mirrors 406 and 405 which are supported by support members 713 and 713' which are slidable along the rails 706 and 706'. The support members 713 and 713' are supported by a second mirror cover 714. The mirrors 405 and 406 and the mirror cover 714 are moved together, and constitute a second mirror unit B. The first and second mirror units A and B are synchronously moved in the same direction at a speed ratio of 2:1.

The optical system further includes a focusing lens 412 and a solid-state image pickup element 401.

A motor 717 is coupled to a drive shaft 719 through a timing belt 718. A driving pulley 720, large-diameter pulleys 721 and 721', and small-diameter pulleys 722 and 722' each having a diameter half that of the large-diameter pulley are fixed to the drive shaft 719. These pulleys are synchronously rotated. Springs $726_A$, $726_A'$, $726_B$, and $726_B'$ are attached to rotating shafts $725_A$, $725_A'$, $725_B$, and $725_B'$ of tension pulleys 723, 723', 724, and 724'.

Two end portions of long wires 727 and 727' are attached to the first mirror support members 707 and 707', respectively, and are wound around the large-diameter pulleys 721 and 721' by several turns and around the tension pulleys 723 and 723' by a half turn. A tension force of 3 to 4 kg is applied to the long wires $727_A$ and $727_A'$ by the springs $726_A$ and $726_A'$. When the large-diameter pulleys 721 and 721' are rotated, the rotational forces are transmitted to the support members 707 and 707' through the long wires 727 and 727', thus sliding the first mirror unit A.

Two end portions of short wires 728 and 728' are attached to the third mirror support members 713 and 713' and are wound around the small-diameter pulleys 722 and 722' by several turns and around the tension pulleys 724 and 724' by a half turn. A tension force of 3 to 4 kg is also applied to the short wires 728 and 728' by the springs $726_B$ and $726_B'$. When the small-diameter pulleys 722 and 722' are rotated, the second mirror unit B is slidably moved.

When the original document 703 is placed on the original document glass 702 and a read key (not shown) is depressed, the lamps 411 are turned on, and the first and second mirror units A and B located at the home positions indicated by solid lines in FIG. 7 start forward movement at a speed ratio of 2:1. Thus, the surface of the original document 703 is scanned along the longitudinal direction of the lamps 411. Light reflected by the original surface is slit-exposed on the solid-state image pickup element 401 via the first, second, and third mirrors 407, 406, and 405, and the focusing lens 412, thus executing a read operation. In the read operation, since the first and second mirror units A and B are synchronously moved at a speed ratio of 2:1, a distance (optical path length) from the original surface to the solid-state image pickup element 401 is kept constant, and an original document image can be slit-exposed without being blurred.

When the first and mirror units A and B reach return positions indicated by broken lines in FIG. 7, the lamps 411 are turned off, and backward movement is started. When the first mirror unit A is moved to an original read start position C, the first and second mirror units A and B are braked, and are then stopped at the home positions indicated by the solid lines in FIG. 7. When a repetitive read operation is designated, the above operation is repeated by a preset number of times.

In FIG. 4, if a moving speed of the mirror 407 is represented by v, the distance between the line sensors is represented by l, and a time required for reading 1-line data is represented by t, a necessary delay line count L is expressed by the following equation:

$$L=l/v\times1/t \tag{1}$$

Equation (1) is established under the condition that the moving speed v is constant. A shift Δv of the moving speed occurs due to the performance (e.g., causing a cogging phenomenon) of the motor for driving the mirror 407 and a drive mechanism. The shift amount Δv of the moving speed changes over time, and takes a positive or negative value.

Since the delay line count L given by equation (1) is fixed, a read position of each line sensor on the original document is offset, thus causing faulty color-registration.

The faulty color-registration caused by this phenomenon is different from a simple faulty color-registration (e.g., reddish color) since the shift amount Δv of the mirror moving speed changes over time, and varies depending on the read positions, resulting in complicated faulty color-registration.

For this reason, when an achromatic original document, e.g., an original document constituted by only black characters, is read by the parallel color sensor 401, complicated faulty color-registration occurs, and causes an erroneous monochrome/color judgement of an original document to be read.

In this embodiment, the erroneous judgement is prevented by the following method.

Figure 9:
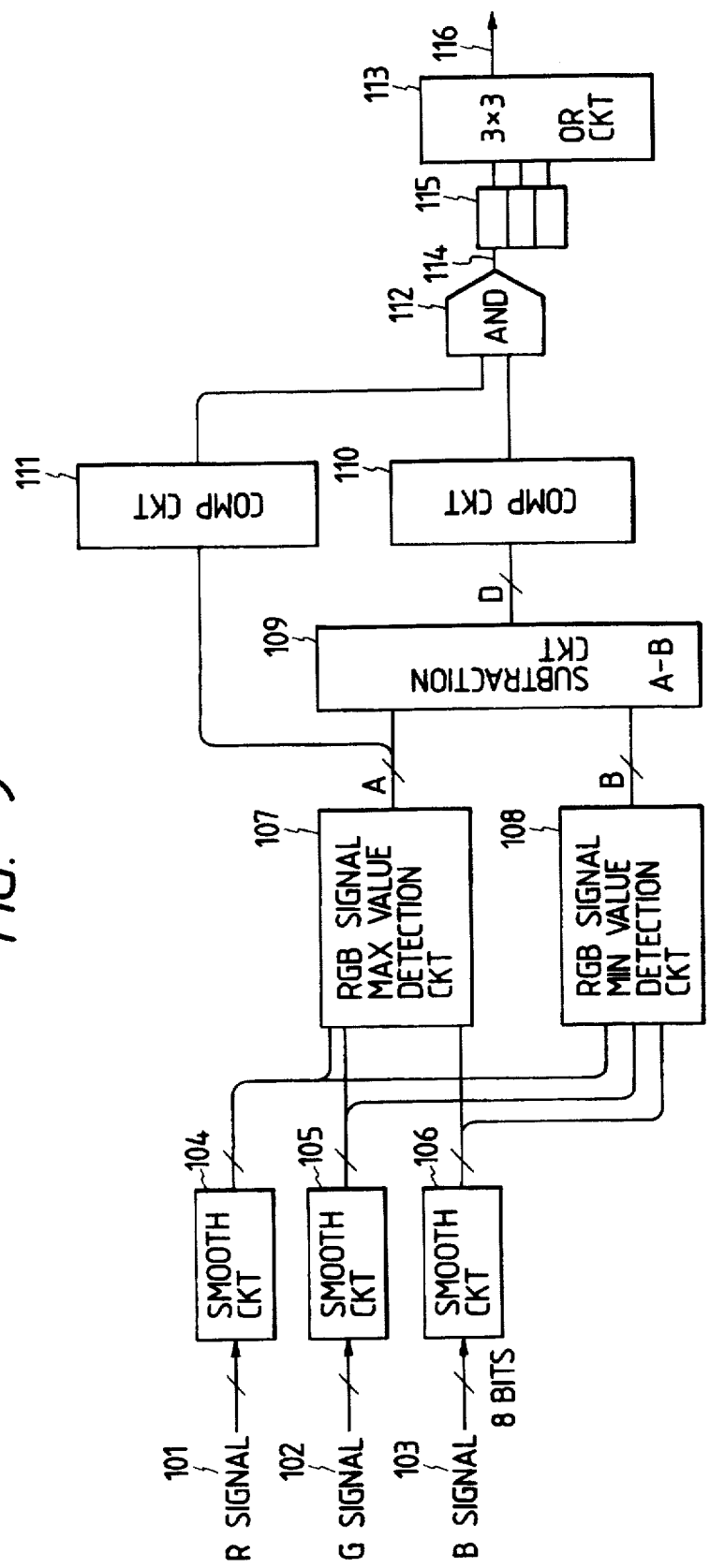
FIG. 9 is a block diagram showing a black area judgement circuit according to the first embodiment of the present invention.

In the block diagram of a black area judgement circuit shown in FIG. 9, input color signals 101, 102, and 103 are 8-bit digital signals respectively corresponding to R (red), G (green), and B (blue). These signals are input from the image sensor shown in FIG. 3. These signals are input to R, G, and B color signal smooth circuits 104, 105, and 106. The outputs from the smooth circuits 104, 105, and 106 are input to an RGB signal max value detection circuit 107 for detecting a maximum value A (A=max(R,G,B)) of the R, G, and B signals and an RGB signal min value detection circuit 108 for detecting a minimum value B (B=min(R,G,B)) of the R, G, and B signals.

A subtraction circuit 109 calculates D=max(R,G,B)−min (R,G,B) based on the values obtained by the max and min value detection circuits 107 and 108. A comparison circuit 110 compares the value D calculated by the subtraction circuit 109 with a constant a to output a comparison result given by relation (1):

$$D < a: \text{output 1}$$
$$D \geq a: \text{output 0} \quad (1)$$

A comparison circuit 111 compares A (A=max(R,G,B)) with a constant b, and outputs a comparison result given by relation (2):

$$A < b: \text{output 1}$$
$$A \geq b: \text{output 0} \quad (2)$$

An AND gate 112 ANDs the output signals from the comparison circuits 110 and 111. An OR circuit (black area signal correction circuit) 113 corrects a black area signal output from the AND gate 112.

In this embodiment, as a lightness is higher, an input color signal value has a larger value. Therefore, when D=max(R, G,B)−min(R,G,B) is smaller than the constant a and A=max (R,G,B) is smaller than a given lightness corresponding to the constant b, i.e., when the input color signal value is included in a hatched area shown in FIG. 12, the output "1" is supplied from the AND gate 112 to the black area signal correction circuit 113. Otherwise, that is, when the input color signal value is not included in the hatched area shown in FIG. 12, the output "0" is supplied from the AND gate 112 to the correction circuit 113.

When the constants a and b are appropriately selected, a black area of an input image can be discriminated from other chromatic areas and a bright original document background portion.

However, as described above, a portion around a black area may be erroneously judged due to the influence of a faulty color-registration error of input color signals. The black area signal correction circuit 113 corrects erroneous judgement. A black area signal 114 is output from the AND gate 112 after a black character of an original document is read and judged. A judgement signal 116 is output from the correction circuit 113. A line buffer 115 is connected between the AND gate 112 and the correction circuit 113.

Figure 10:
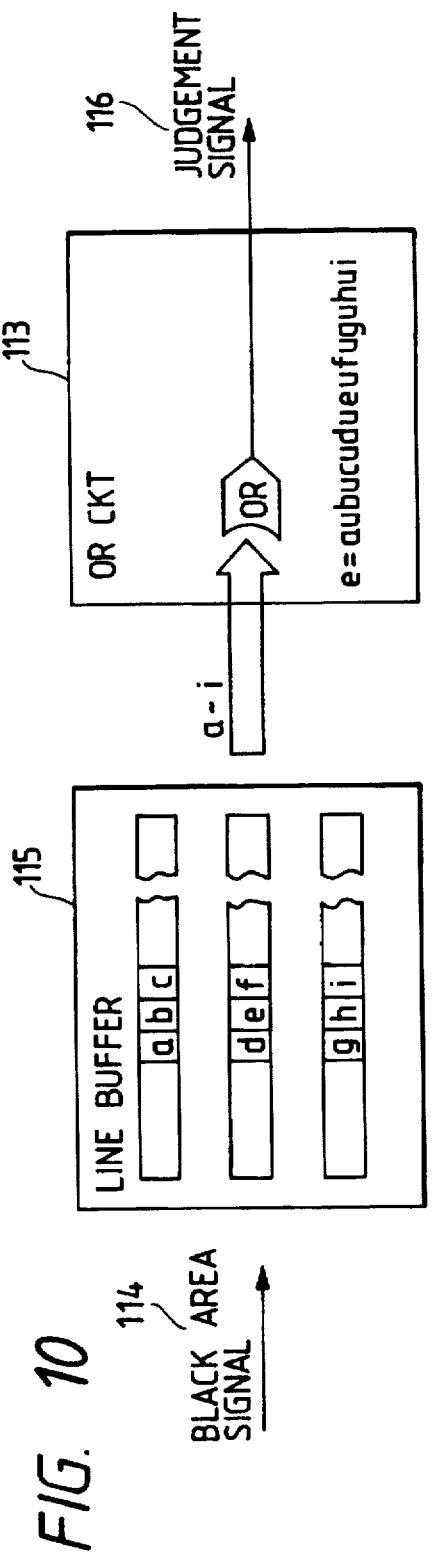
FIG. 10 is a block diagram of a black area correction circuit according to the first embodiment of the present invention.

FIG. 10 is a functional block diagram of the black area signal correction circuit 113. In FIG. 10, the line buffer 115 stores the black area signal 114 output from the AND gate 112, and is constituted by one bit per pixel. The OR circuit 113 corrects the black area signal 114 stored in the line buffer 115, and outputs the judgement signal 116. This circuit ORs a pixel e to be corrected and its adjacent eight pixels (a, b, c, d, f, g, h, and i). When at least one of the pixels a to i is "1", the circuit generates an output "1"; when all the pixels a to i are "0", the circuit generates an output "0". FIG. 15 shows a correction example by this correction circuit. In Correction Example 1, of pixels a to i, pixels a, b, d, e, g, and h are "0", and pixels c, f, and i are "1". In this case, even if the value of the pixel e to be corrected before correction is "0", the value of e after correction becomes "1". In Correction Example 2 only the pixel b is "0" and other pixels are "0". In this case, even if the value of the pixel e to be corrected before correction is "0", the value of e after correction also becomes "1".

FIG. 14 is a view for explaining a state wherein a corrected black area is reproduced from a black character of an original document according to this embodiment. FIG. 14 illustrates a black character 601 of an original document, an input image 602, a black area 604 before correction, and a corrected black area 605. As shown in FIG. 14, the black area signal 114 obtained by reading and judging the black character 601 of the original document is judged to be thinner than the black character 601 due to a faulty color-registration error 603, as represented by the black area 604. Thus, the correction circuit 113 corrects the black area signal 114 and outputs the judgement signal 116 to reproduce the corrected black area 605 which is processed to be wider.

Figure 11:
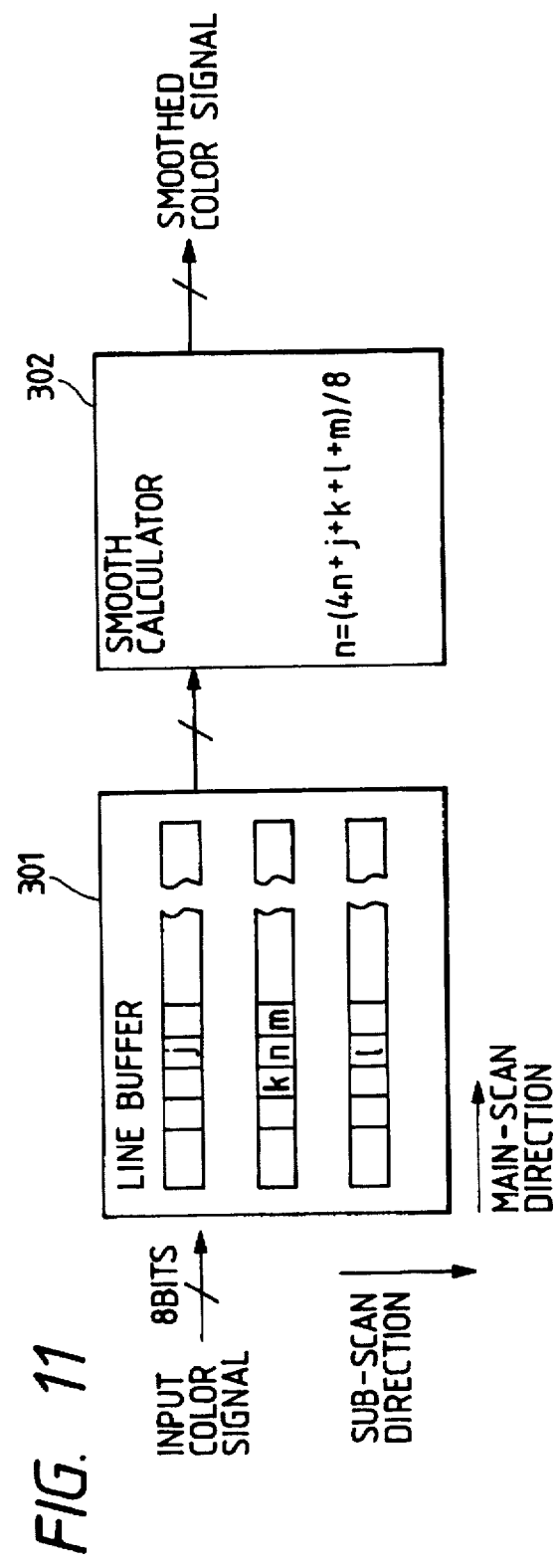
FIG. 11 is a functional block diagram of a smooth circuit according to the first embodiment of the present invention.

FIG. 11 is a block diagram showing functions of the smooth circuits 104 to 106 shown in FIG. 9. In FIG. 11, a line buffer 301 stores an input color signal, and is constituted by 8 bits per pixel. A smooth calculator 302 smoothes the input color signal stored in the line buffer 301, and outputs it as a smoothed color signal. The calculator calculates a weighted average, given by the following equation, of a pixel n to be smoothed using four adjacent pixels (j, k, l, m) to output the smoothed color signal:

$$n = (4n + j + k + l + m)/8$$

FIGS. 13-1, 13-2, and 13-3 show computer test results. FIG. 13-3 shows an example of black characters of an original document, and FIGS. 13-1 and 13-2 show a distribution of max(R,G,B)−min(R,G,B) values of color signals. FIG. 13-1 shows an input color original signal before smooth processing, and FIG. 13-2 shows a smoothed color signal after smooth processing. As can be seen from these drawings, when the smooth processing is performed, a variation in input max(R,G,B)−min(R,G,B) values is reduced. Thus, it was demonstrated that it was effective to use the smoothed color signals in judgement processing for extracting a black area. Especially, a conspicuous effect can be observed in characters having many strokes, as shown in FIG. 13-3.

Figure 16:
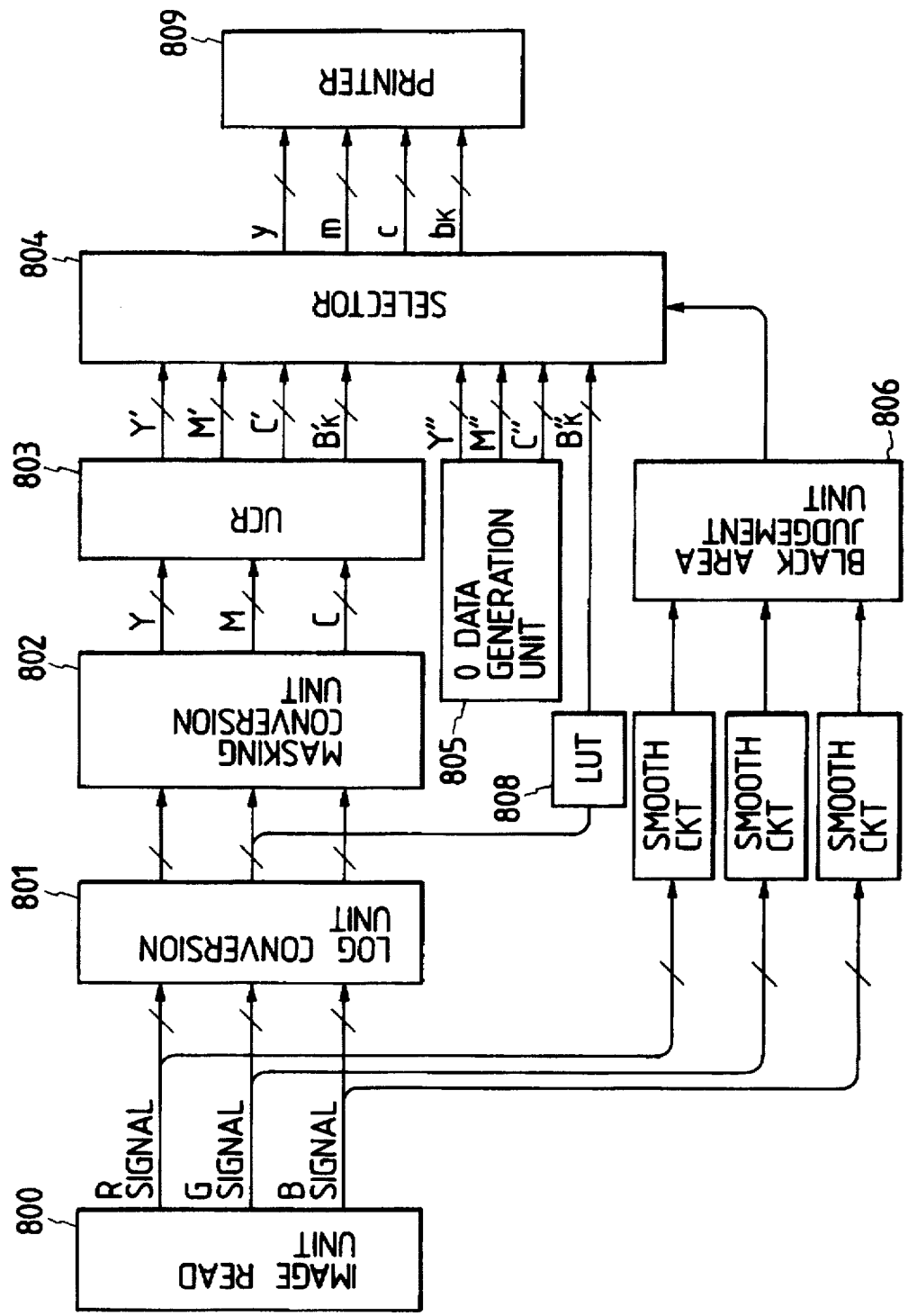
FIG. 16 is a block diagram showing a color signal processing section according to the first embodiment of the present invention.

FIG. 16 is a block diagram of a color signal processing section based on the black area judgement signal.

The color signal processing section shown in FIG. 16 includes an image read unit 800, a log conversion unit 801, a masking conversion unit 802, an UCR (undercolor removal) unit 803, and a selector 804.

R, G, and B signals input by the image read unit (e.g., a CCD) 800 are subjected to log conversion by the log conversion unit 801, and are then subjected to a masking calculation by the masking conversion unit 802 so as to be converted to Y, M, and C signals. The Y, M, and C signals are subjected to undercolor removal (UCR) processing by the UCR unit 803, and are input to the selector 804 as Y', M', and C' signals.

On the other hand, the R, G, and B signals are sent to a black area judgement unit 806 through corresponding smooth circuits. The R, G, and B signals are subjected to black area judgement shown in FIG. 9. When a pixel of interest is judged as a black area by the black area judgement unit 806, the selector 804 selects Y", M", C", and Bk" as outputs y (yellow), m (magenta), c (cyan), and bk (black).

The signals Y", M", and C" are outputs from a 0 data generation unit 805, and their values are "0". Therefore, the outputs y, m, and c from the selector are "0". The signal Bk" is obtained by log-converting the G (green) signal of input color signals and then density-converting the converted signal by referring an LUT (look-up table) 808.

As shown in FIG. 16, as the signals input to the judgement unit 806, smoothed signals are used, and signals for a print operation are independently supplied to a printer 809 without being smoothed. Thus, degradation of output signals due to signal processing for judgement can be avoided.

Of three primary color signals, i.e., R (red), G (green), and B (blue) signals, the G signal is used since the G signal is most approximate to a neutral density image (ND image), as shown in the spectral sensitivity characteristic graph of the R, G, and B sensors in FIG. 13. More specifically, in a method of performing a calculation using the R, G, and B signals to generate a neutral density signal (e.g., a Y signal of the NTSC scheme), a resultant signal is influenced by offsets of positions of the R, G, and B signals, and sharpness of an image may be degraded. In contrast to this, when the G signal as a single color is used for outputting a black area, the circuit arrangement can be simplified, and degradation of an MTF can be prevented.

If it is determined that an area of interest is not a black area, the selector 804 selects signals Y', M', C', and Bk', and outputs the signals Y', M', C', and Bk' as the outputs y, m, c, and bk.

In this embodiment, when the image read unit 800 employs three primary color filters, i.e., R, G, and B filters, the G signal as a single color is used for outputting a black area. For example, the same applies to a case wherein other filters, e.g., C (cyan), Y (yellow), and W (white) filters are used. More specifically, in this case, an achromatic area is output using a W (white) signal as a single color without performing a calculation using the Y, M, and C signals, so that a circuit arrangement can be simplified, and MTF degradation can be prevented, thus providing the same effects as described above.

As an improved arrangement of the CCD 3-line sensor described above, a sensor shown in FIG. 17A may be proposed.

Figure 17A:
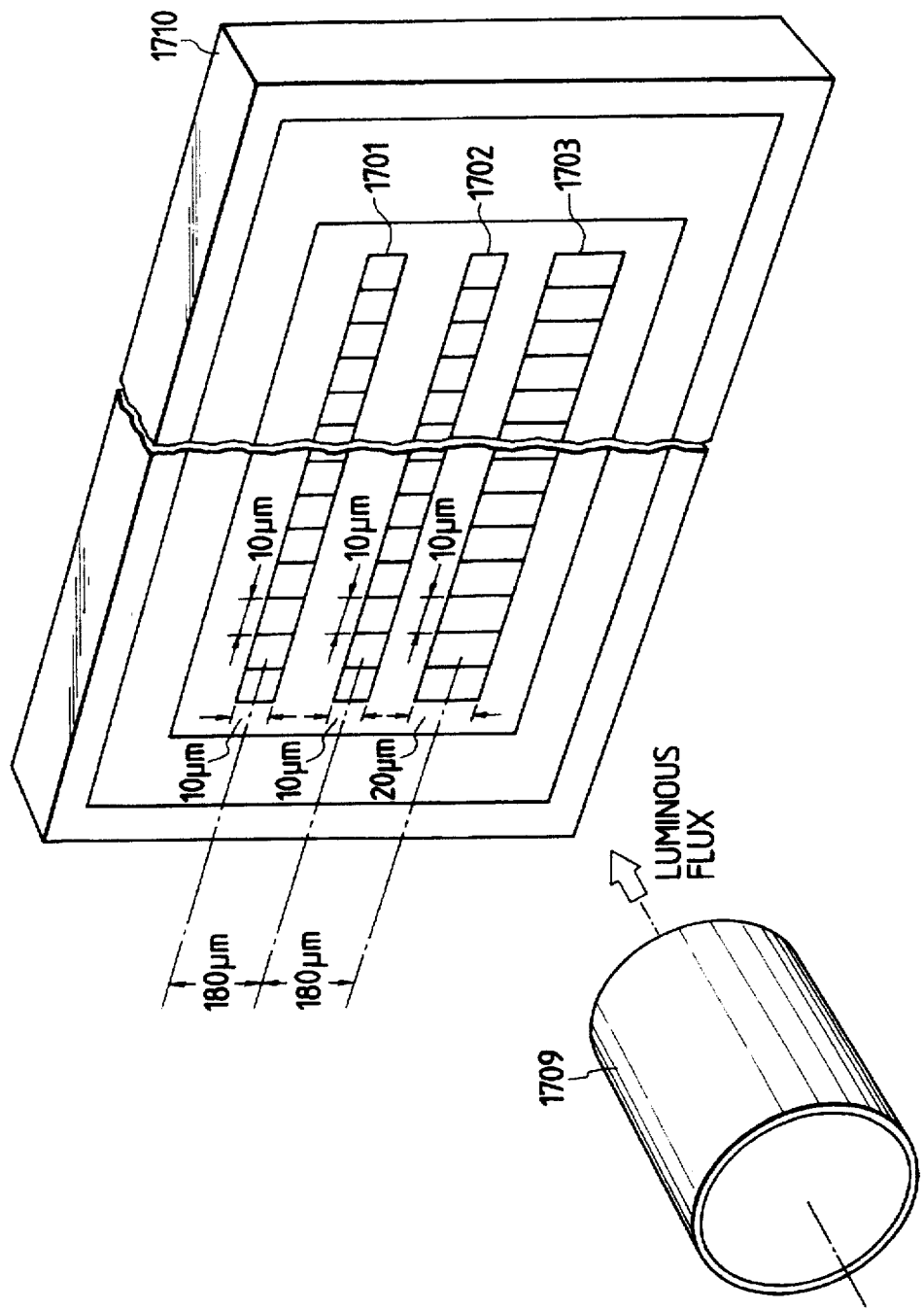
FIGS. 17A and 17B are respectively a perspective view and a graph showing another 3-line sensor.

In FIG. 17A, a red component (R) line sensor 1701 has a plurality of light-receiving elements whose surfaces are covered with a filter which allows only a red light component to pass therethrough. The 3-line sensor of FIG. 17A also includes a green component (G) line sensor 1702, and a blue component (B) line sensor 1703. Each of these sensors similarly has a plurality of light-receiving elements whose surfaces are covered with a filter which allows only a green (or blue) light component to pass therethrough.

Figure 17B:
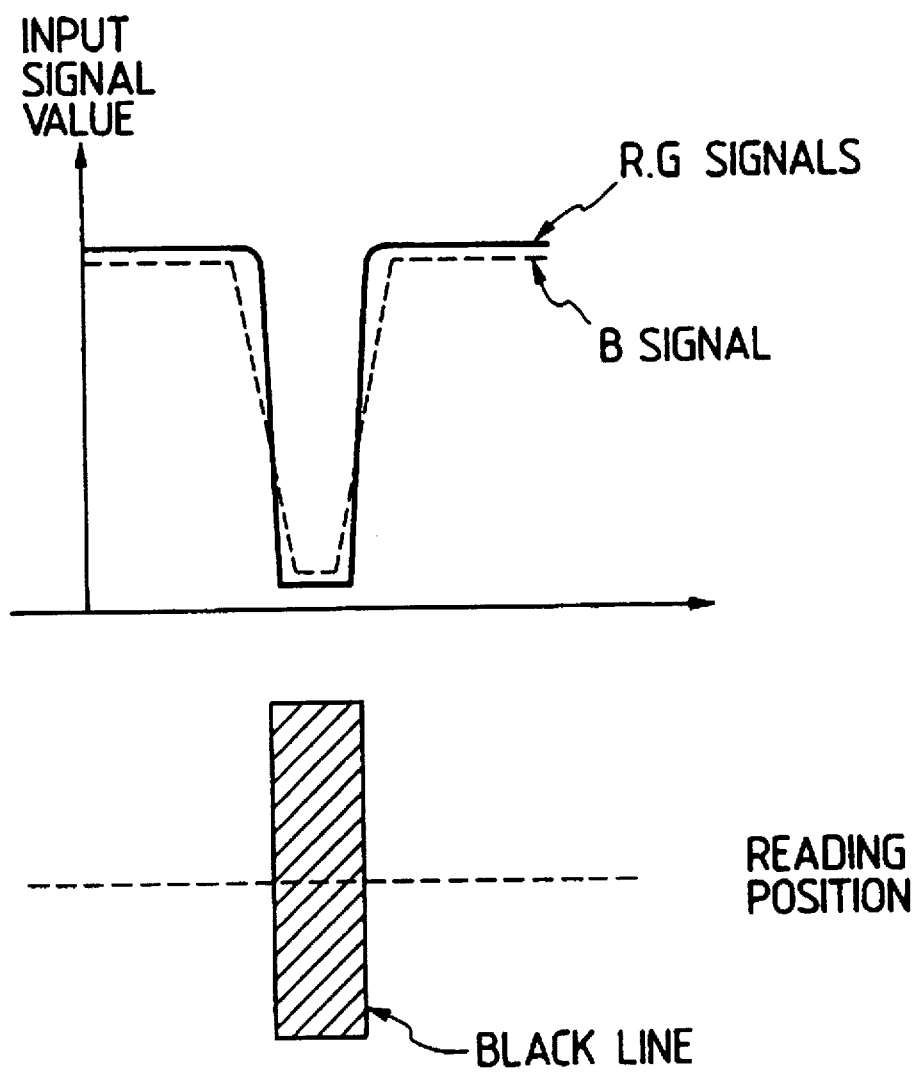

The line sensors are parallelly arranged adjacent to each other at a pitch of 180 μm. The B line sensor comprises a 20 μm×10 μm light-receiving element array. Each of the R and G sensors comprises a 10 μm×10 μm light-receiving element array. The B light-receiving element array has a different light-receiving area from those of the R and G light-receiving element arrays for the following reason. That is, in a filter which allows only a blue light component to pass therethrough, a transmittance of the blue light component tends to be lower than that of a red/green light component in a filter which allows only a red/green light component to pass therethrough. Therefore, in order to increase an S/N (signal-to-noise ratio) of a signal, the light-receiving area of only the B sensor is increased to match its level with those of the R and G signals. For this reason, as shown in FIG. 17B, the input level of the B sensor does not coincide with those of the R and G sensors, and faulty color-registration occurs.

Since a faulty color-registration amount caused by a vibration on an original surface or the like is amplified and supplied to a sensor, a reduction optical system is strongly influenced by faulty color-registration caused by an irregular moving speed in the sub-scan direction. Therefore, an achromatic area judgement means and an output signal correction means of this embodiment are effectively used in the reduction optical system.

SECOND EMBODIMENT

In the first embodiment, processing for, when a black area is determined, outputting data in only a black color is performed. When a color dot image is an input original document, a black portion of an image is emphasized, and black in color dots of an output image is unnaturally emphasized.

In this embodiment, when a chromatic pixel is present near an achromatic pixel, the chromatic pixel near the achromatic pixel is not determined as a black area, thus eliminating the above drawback.

Figure 18:
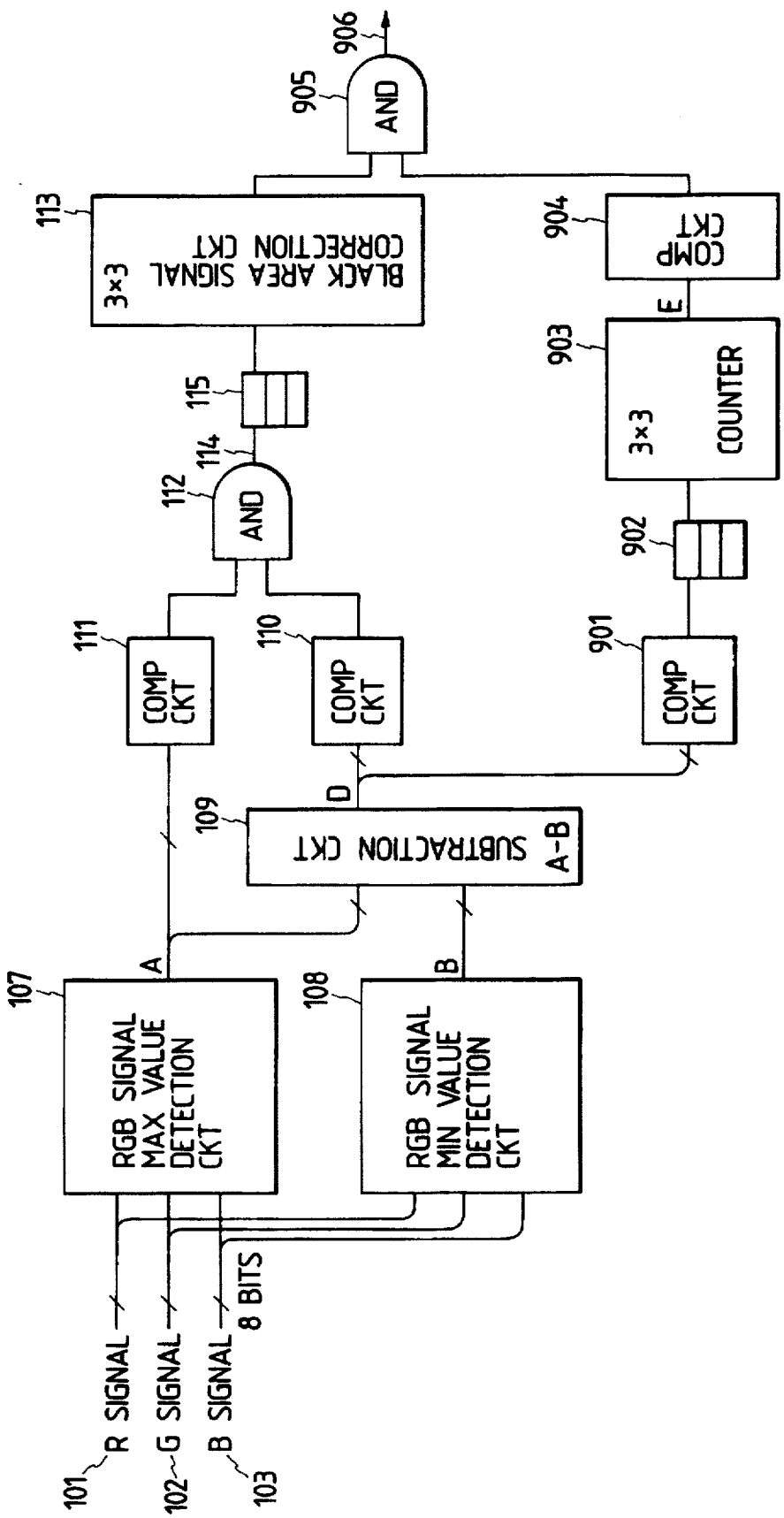
FIG. 18 is a block diagram of a black area judgement circuit according to a second embodiment of the present invention.
Figure 19:
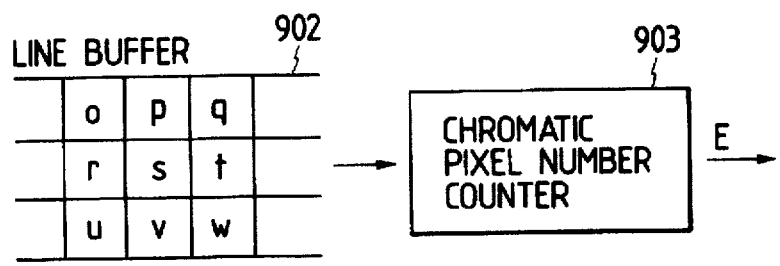
FIG. 19 is a block diagram of a chromatic pixel number counting circuit according to the second embodiment of the present invention.
Figure 20:
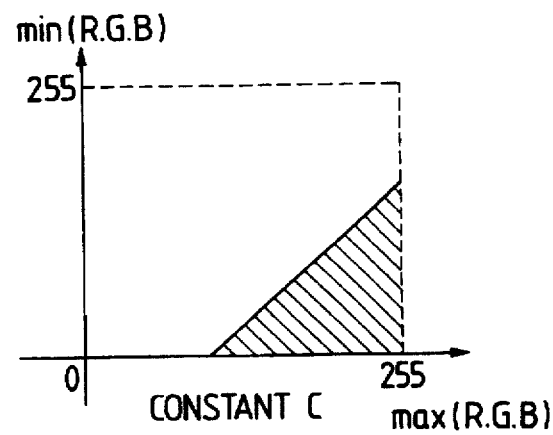
FIG. 20 is a graph for explaining a chromatic area in a max(R,G,B)–min(R,G,B) space according to the second embodiment of the present invention.
Figure 22:
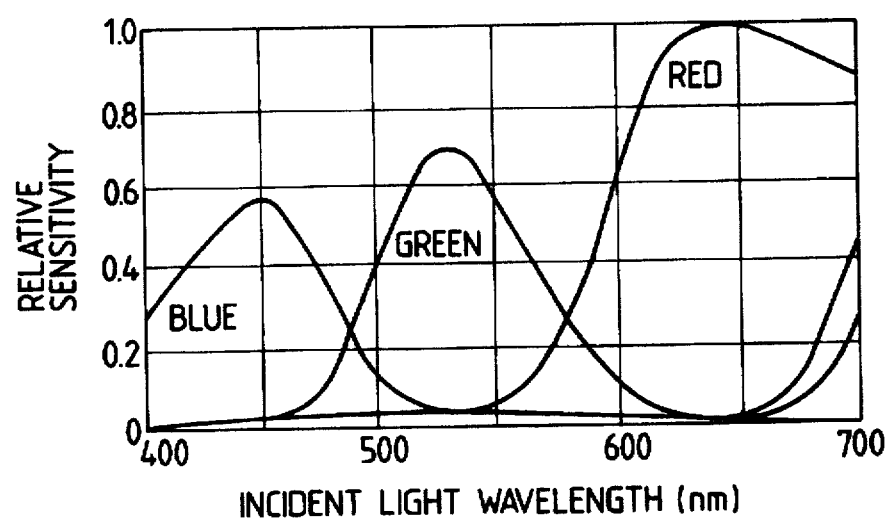
FIG. 22 is a graph showing spectral sensitivity characteristics of Red, Blue, and Green color sensors.

FIGS. 18, 19, and 20 are drawings for explaining the second embodiment of a color image processing apparatus of the present invention. FIG. 18 is a block diagram of a black area judgement circuit of the processing apparatus, FIG. 19 is a block diagram of an achromatic pixel number count circuit of the processing apparatus, and FIG. 20 is a graph showing a chromatic area in a max(R,G,B)−min(R,G,B) space.

In FIG. 18, components 101 to 115 are the same as those in FIG. 9, and a detailed description thereof will be omitted. A comparison circuit 901 compares to determined whether or not a value D=max(R,G,B)−min(R,G,B) is larger than a given constant C, and judges whether or not a pixel of interest is included in a hatched portion in FIG. 20.

Since the value D=max(R,G,B)−min(R,G,B) of a chromatic pixel becomes larger than that of the achromatic pixel, whether or not a pixel of interest is a chromatic or achromatic one can be determined by appropriately selecting the constant C. The comparison circuit 901 outputs "0" when D≦C, and outputs "1" when D>C.

A 3-line FIFO buffer memory 902 stores a judgement result of a chromatic pixel. A counter 903 counts the number of chromatic pixels present in eight pixels around a pixel of interest. More specifically, assuming a pixel S stored in the line buffer 902, as shown in FIG. 19, the number of chromatic pixels detected from the pixel S and surrounding pixels o, p, q, r, t, u, v, and w is a value E, and is output from the counter 903.

A comparison circuit 904 determines whether or not the chromatic pixel number E counted by the counter 903 exceeds a constant d (d=1 in this embodiment). More specifically, the comparison circuit 904 outputs "0" when E>d and outputs "1" when E≦d.

With the above processing, only when the number of chromatic pixels in eight surrounding pixels around the pixel of interest is equal to or smaller than a specific number (corresponding to the constant d), a black area is determined.

An AND circuit 905 outputs "1" as a judgement signal 906 when both the outputs from a correction circuit 113 and the comparison circuit 904 are "0"; otherwise, outputs "0".

When an input color original document includes a color dot image, black in color dots can be prevented from being unnaturally emphasized.

In this embodiment, chromatic area judgement is performed by using the same number of pixels, i.e., eight surrounding pixels as in achromatic area judgement. However, the number of surrounding pixels may be different from that in achromatic judgement.

THIRD EMBODIMENT

Figure 21:
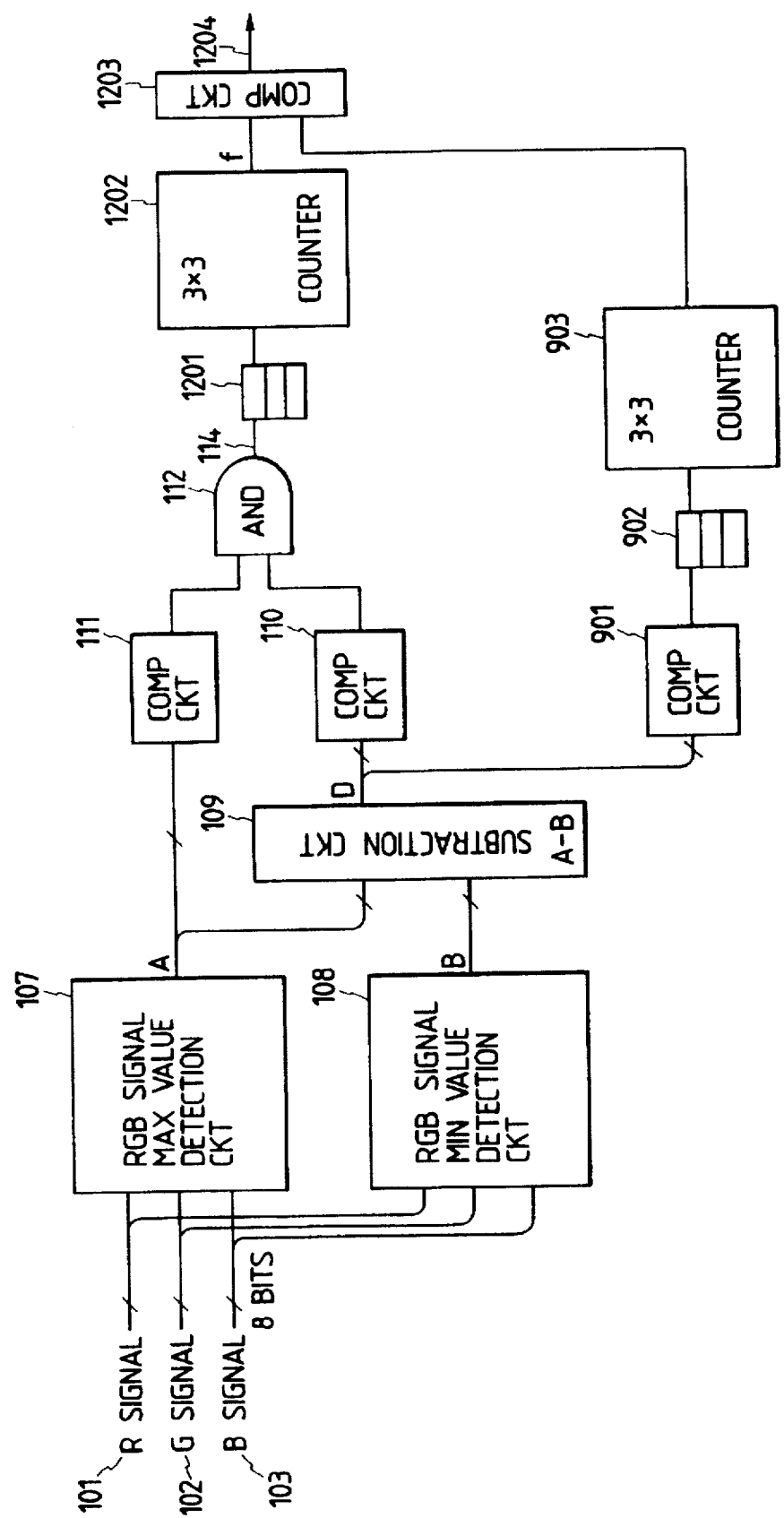
FIG. 21 is a block diagram of a black area judgement circuit according to a third embodiment of the present invention.

FIG. 21 is for explaining a third embodiment of a color image processing apparatus of the present invention, and is a block diagram of a black area judgement circuit.

In the second embodiment, when a chromatic pixel is present near a pixel of interest, it disturbs black area judgement. In this embodiment, however, a number f of black area judgement pixels near the pixel of interest is compared with a chromatic judgement pixel number E, and when f>E, black area judgement is performed.

In FIG. 21, a 3-line FIFO buffer memory 1201 stores a black area judgement result. A counter 1202 counts the number of black pixels in eight pixels near a pixel of interest. A comparison circuit (comparator) 1203 compares the black pixel number f and the chromatic pixel number E. When f>E, the comparator 1203 outputs "1" as a judgement signal 1204, and when f≦E, outputs "0" as the judgement signal 1204.

According to this embodiment, when a chromatic pixel is present near a black pixel, formation of unnatural black in an output image of a color dot original document upon disturbance of black area judgement can be prevented.

As described above, according to the first to third embodiments of the present invention, a means for correcting a judged black area signal is arranged so that color blurring around a black character due to erroneous judgement of a black area caused by offsets of positions of input color sensors can be prevented.

Since input color signals are smoothed to judge a black area, a more accurate black area judgement can be assured.

Input color signals are processed by using a specific color component of the input color signals, thus simplifying a circuit arrangement.

In the above embodiment, the printer 809 need only output a color image, and may comprise, e.g., a color laser beam printer, a color thermal transfer printer, a color ink-jet printer, or the like.

The number of surrounding pixels used in the smooth circuits 104 to 106, and a matrix of the black area signal correction circuit 113 may be changed according to the magnification factor of an image described above.

The black area judgement circuit may be used in automatic monochrome/color judgement of an original document, as will be described later.

FOURTH EMBODIMENT

FIGS. 23 to 30 are views for explaining a fourth embodiment of the present invention.

Figure 23:
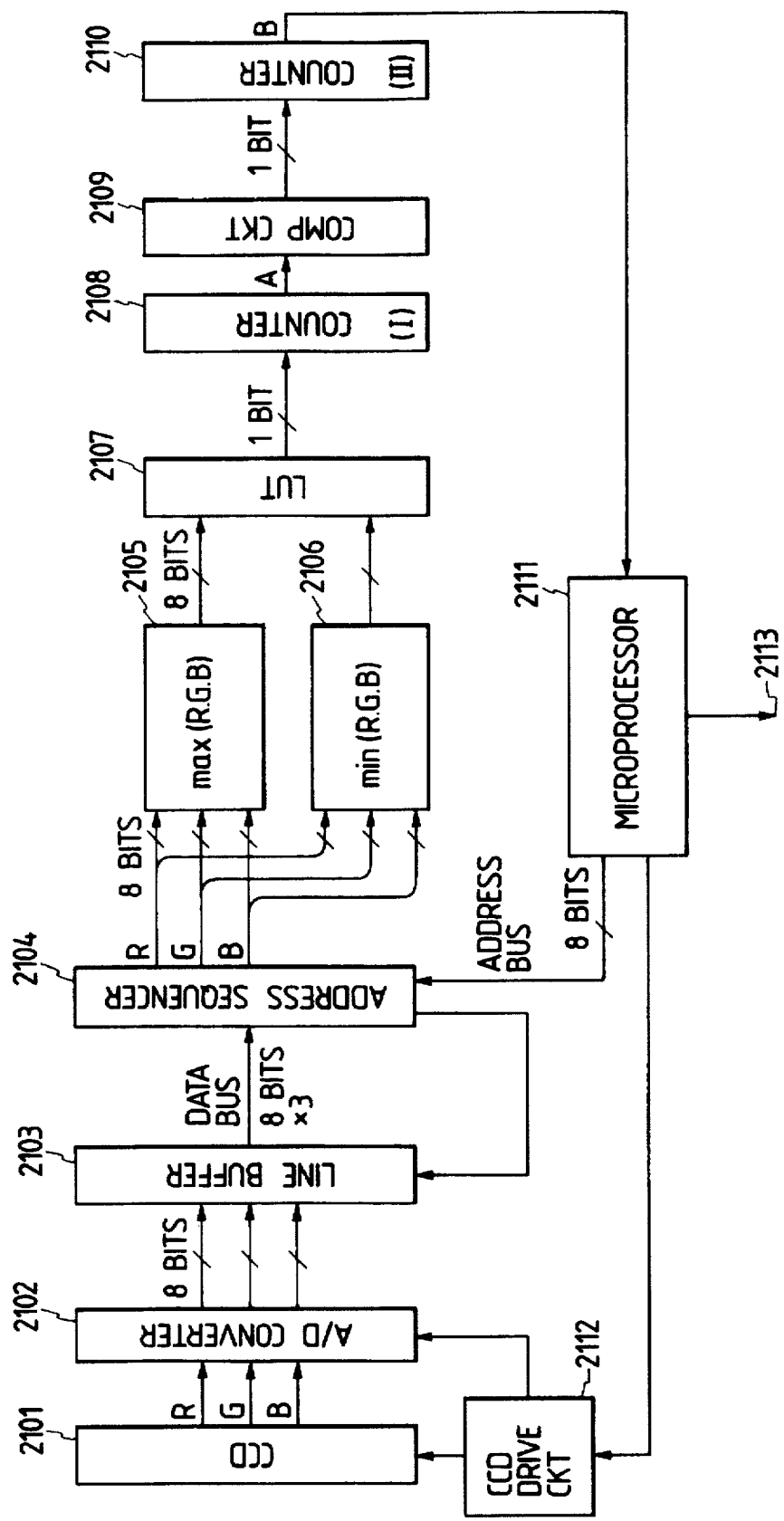
FIG. 23 is a block diagram of a judgement circuit according to a fourth embodiment of the present invention.

In the block diagram of a judgement circuit of FIG. 23, a CCD 2101 as an image sensor reads R (red), G (green), and B (blue) light components, and can comprise a 3-line sensor of the first embodiment. An A/D converter 2102 converts an analog input signal into an 8-bit (256 gradation levels) digital signal. A line buffer 2103 stores R, G, and B digital color signals. An address sequencer 2104 controls to sequentially read out image data from the line buffer 2103. A maximum value detection circuit 2105 detects a maximum value of R, G, and B 8-bit signals from the address sequencer 2104. A minimum value detection circuit 2106 detects a minimum value of R, G, and B 8-bit signals from the address sequencer 2104. A look-up table (LUT) 2107 comprises a ROM (read-only memory), and has 16-bit inputs and a 1-bit output. The LUT 2107 outputs "1" when a value (max(R,G,B), min(R,G,B)) is included in a hatched chromatic area in FIG. 25; otherwise, outputs "0". A counter (I) 2108 counts the number of chromatic pixels in a pixel of interest and its eight surrounding pixels. A comparator 2109 compares a chromatic pixel number (represented by A) counted by the counter 2108 with a given positive constant α. The comparator 2109 outputs "1" when A>α, otherwise, outputs "0". A counter (II) 2110 counts the number of "1"s appearing at the output of the comparator 2109. A microprocessor 2111 judges on the basis of the content of the counter 2110 whether an original document is a monochrome document or a color document, and performs other control operations. The judgement circuit also includes a CCD drive circuit 2112. Note that a signal 2113 is output from the microprocessor 2111 to control a color or monochrome copy operation.

The constituting portions of the above arrangement perform the following operations.

Figure 24:
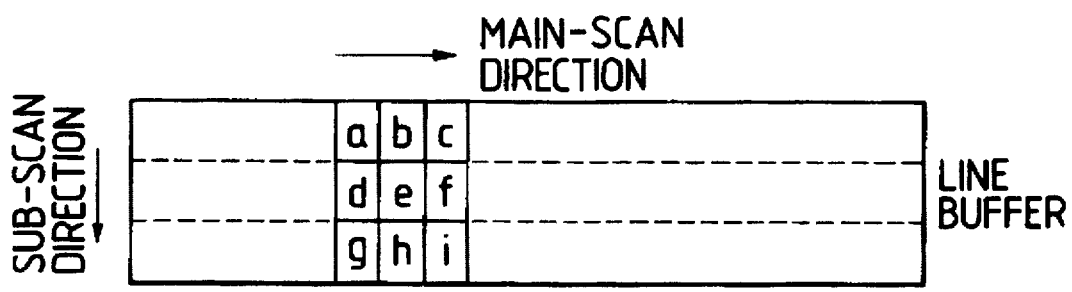
FIG. 24 shows a storage state of a line buffer according to the fourth embodiment of the present invention.

R (red), G (green), and B (blue) analog input signals read by the CCD 2101 are respectively converted to 8-bit digital signals by the A/D converter 2102, and are stored in the line buffer 2103. The line buffer 2103 can store image data of three lines, and three buffers are prepared for the R, G, and B signals, respectively. FIG. 24 shows a state of image data stored in the line buffer 2103.

A procedure for determining whether a given pixel is a chromatic or achromatic pixel will be described below. Assuming that a pixel e in FIG. 24 is set as a pixel to be judged, R, G, and B 8-bit data of the pixel e are accessed from the line buffer 2103 by the address sequencer 2104. Using the accessed data, a maximum value max(R,G,B) of the R, G, and B data is detected by the maximum value detection circuit 2105, and a minimum value min(R,G,B) of the R, G, and B data is detected by the minimum value detection circuit 2106. The max(R,G,B) and min(R,G,B) values are respectively 8-bit digital signals, and are input to the LUT 2107. When values (max(R,G,B), min(R,G,B)) are included in the hatched area in FIG. 25, the LUT 2107 determines that the pixel of interest is a chromatic pixel, and outputs "1" to the counter (I) 2108. Otherwise, the LUT determines that the pixel of interest is an achromatic pixel, and outputs "0".

Figure 25:
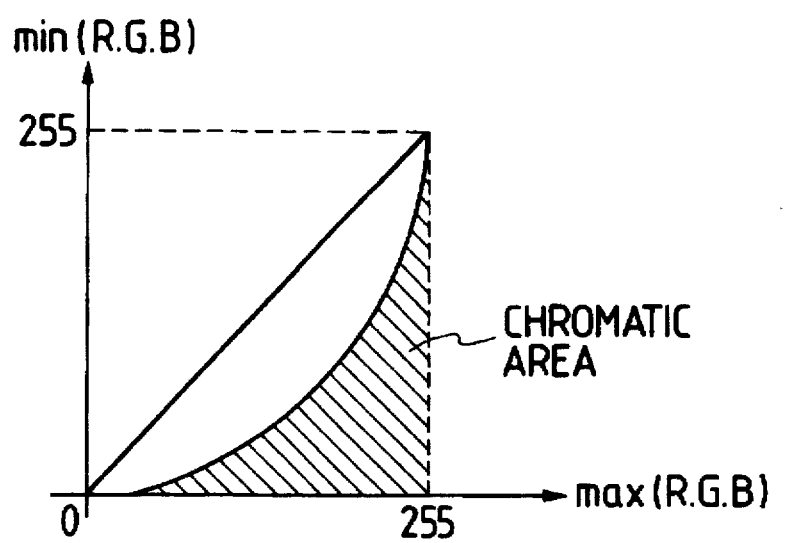
FIG. 25 is a graph showing the relationship between a (max(R,G,B), min(R,G,B)), space and a chromatic area according to the fourth embodiment of the present invention.
Figure 26:
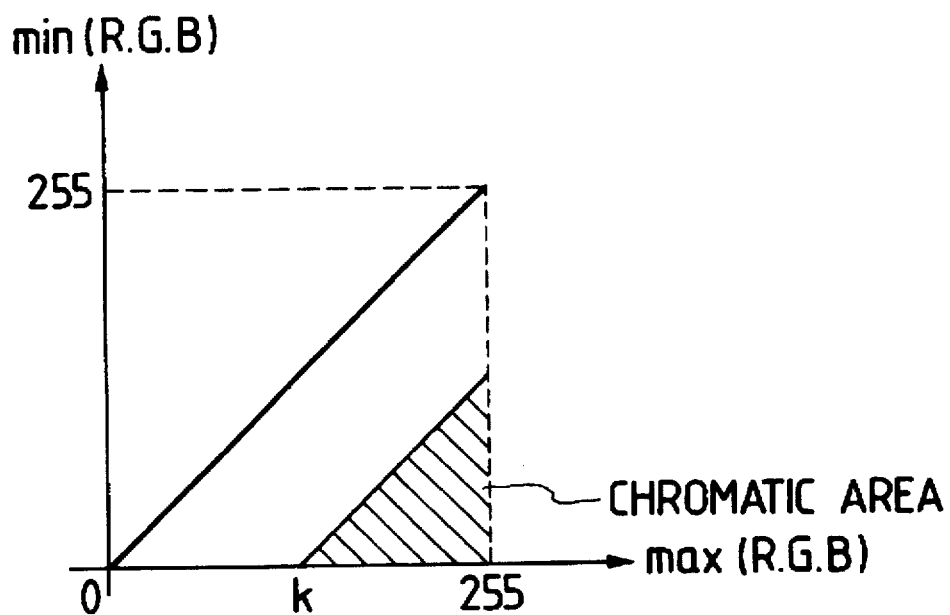

FIG. 25 shows a chromatic area in a (max(R,G,B), min(R,G,B)) space. As shown in FIG. 26, a conventional method of judging a pixel of interest when a value A (=max(R,G,B)−min(R,G,B)) exceeds a given constant k, i.e., when A>k, is known. In contrast to this, as shown in FIG. 25, the (max(R,G,B), min(R,G,B)) space is non-linearly divided to judge a chromatic color, thus allowing a more accurate judgement.

Note that a distribution of the (max(R,G,B), min(R,G,B)) space when an original document image of a black character (achromatic color) by the CCD 2101 is as shown in FIG. 27.

As described above, chromatic/achromatic judgement for the pixel e can be performed. However, with only the above arrangement, an erroneous judgement caused by offsets of positions of the CCD sensors may occur. In the present invention, such an erroneous judgement is prevented by the following arrangement.

More specifically, in FIG. 24, the same chromatic/achromatic judgement as described above is performed for the pixel e to be judged and its eight surrounding pixels a, b, c, d, f, g, h, and i (a 3×3 matrix area having the pixel e as the center). The number of "1"s of the LUT output for the total of nine pixels a to i, i.e., the number of chromatic pixels is counted by the counter (I) 2108. The count number A is compared with a given proper positive constant $\alpha$ by the comparator 2109. When A>a, the pixel e is finally judged as a chromatic pixel; when A$\leq\alpha$, it is judged as an achromatic pixel.

Chromatic/achromatic judgement is performed on the basis of pixel data of the 3×3 matrix, i.e., a total of nine pixels, so that the erroneous judgement can be prevented.

The comparator 2109 outputs "1" when a chromatic pixel is determined, and outputs "0" when an achromatic pixel is determined.

The series of operations described above are performed for all the pixels on an original document, and the number of "1"s appearing at the output of the comparator 2109, i.e., the number of chromatic pixels is counted by the counter (II) 2110. When a ratio J of the count number of the counter (II) to the total number of pixels is larger than a given constant $\beta$, the microprocessor 2111 determines a color original document; otherwise, determines a monochrome original document. Then, the microprocessor 2111 performs the corresponding copy operation.

The processing of the microprocessor 2111 in the above-mentioned operation will be described below with reference to the flow charts of FIGS. 28-1 and 28-2.

In step S1, the microprocessor 2111 controls the CCD drive circuit 2112 to start reading. The CCD drive circuit 2112 supplies a conversion pulse to the A/D converter 2102 to convert R, G, and B signals into 8-bit digital signals in units of pixels.

The first line is scanned (step S2). The next line is then scanned after an H-sync (horizontal sync signal) interruption (step S4). After the third line is scanned, image data necessary for judgement are stored in the line buffer 2103.

In step S6, 8-bit image data stored in the R, G, and B line buffers are sequentially accessed by the address sequencer 2104 (step S6). This operation is repeated for nine pixels including pixels around a pixel to be judged (step S7). If one-line processing is completed, the control returns to step S3 of reading the next line (step S9). If reading of all the lines is completed, the counter value B of the counter (II) is read (step S10), and a ratio of the count value of the counter (II) to the all pixel number is calculated as J (step S11). When the value J is larger than the proper constant $\beta$, a color original document is determined (step S12), and a color copy operation is executed (step S13). On the other hand, if J$\leq\beta$, a monochrome original document is determined (step S12), and a monochrome copy operation is executed (step S14). In this case, the color copy operation is omitted.

FIG. 29 is a view for explaining the relationship between the present invention and the arrangement of the overall image processing apparatus.

The image processing apparatus shown in FIG. 29 includes an image read unit 2701, a color/monochrome judgement unit 2702, an image processing unit 2703, an image reproduction unit 2704, and a control unit 2705.

The color/monochrome judgement unit 2702 judges a color or monochrome original document on the basis of data from the image read unit 2701. The image processing unit 2703 performs color image processing for the color original document or monochrome image processing in accordance with the judgement result of the judgement unit 2702. For the color original document, the image reproduction unit 2704 executes a color printing operation using Y (yellow), M (magenta), C (cyan) inks, and the like, and executes a monochrome printing operation using a Bk (black) ink for the monochrome original document. When this judgement is made, a copy time can be shortened, and cost can be reduced.

FIG. 30 shows the overall arrangement of a digital color copying apparatus to which the embodiment of the present invention is applied.

In FIG. 30, an image scanner unit 2201 reads an original document, and performs digital signal processing. A printer unit 2202 full-color prints an image corresponding to an original document image read by the image scanner unit 2201 onto a paper sheet.

The image scanner unit 2201 includes a mirror-surface pressing plate 2200. An original document 2204 on an original document glass table (to be referred to as a platen hereinafter) 2203 is irradiated with light emitted from a lamp 2205. Light reflected by the original document 2204 is guided by mirrors 2206, 2207, and 2208, and is focused on a 3-line sensor (to be referred to as a CCD hereinafter) 2210 by a lens 2209. Thereafter, red (R), green (G), and blue (B) components of full-color data are supplied to a signal processor 2211. Note that the lamp 2206 and the mirror 2206 are mechanically moved in a direction perpendicular to an electrical scan direction of the line sensor at a speed v, and the mirrors 2207 and 2208 are moved in the same direction as above at a speed ½ v, thereby scanning the entire surface of the original document. The signal processor 2211 electrically processes the read signals, and separates them into magenta (M), cyan (C), yellow (Y), and black (Bk) components. The processor 2211 then supplies these components to the printer unit 2202. One of the M, C, Y, and Bk components is supplied to the printer unit 2202 in each original document scan operation of the image scanner unit 2201, and one print-out is completed by a total of four original document scan operations.

The M, C, Y, or Bk image signal sent from the image scanner unit 2201 is sent to a laser driver 2212. The laser driver 2212 modulates and drives a semiconductor laser 2213 in accordance with the input image signal. A laser beam scans the surface of a photosensitive drum 2217 through a polygonal mirror 2214, an f-θ lens 2215, and a mirror 2216.

A rotary developing unit 2218 is constituted by a magenta developing section 2219, a cyan developing section 2220, a yellow developing section 2221, and a black developing section 2222. The four developing sections are alternately brought into contact with the photosensitive drum 2217, thus developing an electrostatic latent image formed on the photosensitive drum 2217 with toners.

A paper sheet fed from a paper cassette 2224 or 2225 is wound around a transfer drum 2223, and the developed image on the photosensitive drum 2217 is transferred onto the paper sheet.

In this manner, after the four color images, i.e., M, C, Y, and Bk images are sequentially transferred onto the paper sheet, the paper sheet is ejected through a fixing unit 2226.

FIFTH EMBODIMENT

FIGS. 31 to 33-2 are views for explaining a fifth embodiment of an image processing apparatus of the present invention.

In the block diagram of a judgement circuit of FIG. 31, components 2101, 2102, and 2105 to 2113 are the same as those in FIG. 23, and a detailed description thereof will be omitted. In FIG. 31, a line buffer stores a 1-bit signal from an LUT 2107. An address sequencer 2302 accesses data stored in the line buffer 2301 in units of pixels in response to a signal from a microprocessor 2511 through an address bus.

In the above arrangement, the respective sections perform the following operations.

R, G, and B analog signals read by the CCD 2101 is converted to 8-bit digital signals by the A/D converter 2102. On the basis of the R, G, and B 8-bit signals, the maximum value detection circuit 2105 detects a maximum value max(R,G,B) of the R, G, and B signals in units of pixels, and the minimum value detection circuit 2106 detects a minimum value min(R,G,B) of the R, G, and B signals. The values max(R,G,B) and min(R,G,B) are respectively 8-bit digital signals, and are input to the LUT 2107. In the fourth embodiment described above, when values (max(R,G,B), min(R,G,B)) are included in the hatched area of FIG. 25, the LUT 2107 determines that a pixel of interest is a chromatic pixel, and outputs "1". Otherwise, the LUT determines that the pixel of interest is an achromatic pixel, and outputs "0".

The LUT 2107 determines a chromatic/achromatic pixel in units of pixels scanned by the CCD 2101, and the judgement result is stored in the line buffer 2301. The line buffer 2301 can store data for three lines, and when data for three lines are stored, the following procedure is started.

FIG. 32 shows a storage state of the line buffer. Assuming that a pixel to be finally subjected to chromatic/achromatic judgement is set to be a pixel e, the address sequencer 2302 accesses nine pixels including eight pixels a, b, c, d, f, g, h, and i around the pixel e in units of pixels from the line buffer 2301. A counter (I) 2108 counts the number of data "1" stored in the line buffer, i.e., the number of chromatic pixels. Thereafter, the same processing as in the fourth embodiment is performed. A count value A of the counter 2108 is compared with a proper positive constant α by a comparator 2109. When A>α, the pixel e is finally judged as a chromatic pixel. When A>α, the pixel e is finally judged as an achromatic pixel. The comparator 2109 outputs "1" for the chromatic pixel, and outputs "0" for the achromatic pixel.

The series of operations described above are performed for all the pixels on an original document, and the number of "1"s output from the comparator 2109, i.e., the number of chromatic pixels is counted by a counter (II) 2110. When a ratio J of the count value of the counter (II) to the all the pixel number is larger than a given constant β, the microprocessor 2111 determines a color original document. Otherwise, the microprocessor determines a monochrome original document. Thereafter, the microprocessor performs the corresponding copy operation.

The processing procedures of the microprocessor 2111 in the above-mentioned operation will be described below with reference to the flow charts of FIGS. 33-1 and 33-2.

Since steps S1 to S5 are the same as those in the fourth embodiment, a detailed description thereof will be omitted.

In step S6, the address sequencer 2302 accesses data stored in the line buffer 2301. In this embodiment, since chromatic/achromatic data in units of pixels have already been stored in the line buffer 2301, the counter (I) need only count the number of chromatic pixels in a target pixel and its eight surrounding pixels, i.e., a total of nine pixels. Therefore, a processing speed can be increased as compared to the fourth embodiment.

Since steps S7 to S14 are also the same as those in the fourth embodiment, a detailed description thereof will be omitted.

According to this embodiment, the line buffer 2301 is connected to the output of the LUT 2107, an operation for performing chromatic/achromatic judgements need not be performed nine times per pixel, and a time required for processing can be shortened. Since the R, G, and B line buffers need not be arranged at the output side of the A/D converter, the apparatus can be simplified.

SIXTH EMBODIMENT

FIGS. 34 to 36 show a sixth embodiment of an image processing apparatus of the present invention.

In the fourth embodiment, chromatic judgement of a pixel of interest is performed on the basis of chromatic judgement signals of pixels around a pixel to be subjected to chromatic judgement, and monochrome/color judgement of an input original document is performed on the basis of the judgement signal.

In this embodiment, chromatic judgement of a pixel of interest is performed on the basis of chromatic judgement signals and black judgement signals of pixels around a pixel to be subjected to chromatic judgement, and monochrome/color judgement of an input original document is performed on the basis of the judgement signal.

When an input original document is a monochrome document, a faulty color-registration area of input signals caused by color sensors appears near a black area, as shown in FIG. 34. Therefore, when some pixels which are judged to be black are present near a pixel to be judged, chromatic judgement is disturbed, and an erroneous judgement caused by faulty color-registration can be reliably prevented.

FIG. 35 is a block diagram of a judgement circuit of the sixth embodiment.

In FIG. 35, components 2101 to 2106 and 2111 to 2113 are the same as those in FIG. 23, and a detailed description thereof will be omitted. In FIG. 35, a 16-bit input/1-bit output look-up table (LUT) 2401 is employed for performing chromatic judgement, and a 16-bit input/1-bit output LUT 2402 is employed for performing black judgement. A counter (I) 2403 counts "1"s appearing at the output of the LUT (I) 2401, i.e., a chromatic pixel number C, and a counter (II) 2404 counts "1"s appearing at the output of the LUT (II) 2402, i.e., a black pixel number Bk. A comparator 2405 compares the output C of the counter (I) 2403 and the output Bk of the counter (II) 2404. When C>Bk, i.e., when the black pixel number is larger than the chromatic pixel number, the comparator 2405 outputs "1"; when C≦Bk, outputs "0". A counter (III) 2406 counts the outputs of the comparator 2405.

In the above arrangement, the respective constituting sections perform the following operations.

R (red), G (green), and B (blue) analog input signals read by the CCD 2101 are respectively converted to 8-bit digital signals by the A/D converter 2102, and are stored in the line buffer 2103. The line buffer 2103 can store image data for three lines, and three buffers are prepared for R, G, and B signals, respectively.

Assuming that a pixel e in FIG. 24 is set to be a pixel to be judged like in the fourth embodiment, R, G, and B 8-bit data for the pixel e are accessed from the line buffer 2103 by the address sequencer 2104.

Using these data, the maximum value detection circuit 2105 detects a maximum value max(R,G,B) of the R, G, and B data, and the minimum value detection circuit 2106 detects a minimum value min(R,G,B) of R, G, and B data. The values max(R,G,B) and min(R,G,B) are respectively 8-bit digital signals, and are input to the LUT (I) 2401 and the LUT (II) 2402.

FIG. 36 shows a judgement area in a (max(R,G,B), (min(R,G,B)) space.

FIG. 36 illustrates a white area 2501, a black area 2502, an intermediate area 2503, and a chromatic area 2504.

When the values (max(R,G,B), (min(R,G,B)) are included in the chromatic area 2504 shown in FIG. 36, the LUT (I) 2401 determines a pixel of interest as a chromatic pixel, and outputs "1" to the counter (I) 2403. On the other hand, when these values are not included in the chromatic area 2504, the LUT 2401 outputs "0".

When the values (max(R,G,B), (min(R,G,B)) are included in the black area 2502 shown in FIG. 36, the LUT (II) 2402 determines a pixel of interest as a black pixel, and outputs "1" to the counter (II) 2404. On the other hand, when these values are not included in the black area 2502, the LUT 2402 outputs "0".

The comparator 2405 compares the count value C of the counter (I) 2403, i.e., the chromatic pixel number with the count value Bk of the counter (II) 2404, i.e., the black pixel number. When C>Bk, the comparator 2405 outputs "1"; when C≦Bk, outputs "0". This output is counted by the counter (III) 2406. The series of operations described above are performed for all the pixels on an original document, and the number of "1"s appearing at the output of the comparator 2405, i.e., the number of chromatic pixels is counted by the counter (III) 2406. When a ratio J of the count value of the counter (III) to the all pixel number is larger than a given constant β, the microprocessor 2111 determines a color original document; otherwise, determines a monochrome original document. The microprocessor 2111 then performs the corresponding copy operation.

The processing flow chart of the microprocessor 2111 is substantially the same as that in the fourth embodiment, and a description thereof will be omitted.

According to this embodiment, as described above, the chromatic pixel number and the black pixel number are compared with each other to judge whether a pixel to be judged is a chromatic or achromatic pixel. Therefore, judgement precision can be improved as compared to the fourth embodiment.

SEVENTH EMBODIMENT

FIGS. 37 to 40-2 are drawings for explaining a seventh embodiment of an image processing apparatus of the present invention.

As shown in FIG. 34 described above, color blurring of an input image of a monochrome original document noticeably occurs at an edge portion. In this embodiment, a means for detecting an edge portion is arranged, and no color judgement is performed at the edge portion, thus eliminating erroneous judgement.

In this embodiment, a scan speed for monochrome/color judgement of an original document is increased to be higher than that in an image formation mode, thus shortening a time required for a copy operation.

In the block diagram of a judgement circuit according to the seventh embodiment of the present invention in FIG. 37, components 2101 to 2113 are the same as those in the fourth embodiment, and a description thereof will be omitted. An edge judgement unit 2501 judges whether or not a pixel of interest is located at an edge. An AND gate 2503 sends a chromatic judgement signal to the counter 2110 only when the pixel of interest is not located at an edge portion.

In the above arrangement, respective sections perform the following operations.

The basic operation of this embodiment is the same as that in the fourth embodiment. In this embodiment, however, an original document scan operation for monochrome/color judgement is performed at a speed twice that in a read scan operation for a copy operation.

As shown in FIG. 38, a size of a window to be subjected to block processing is determined so that a main-scan size is twice a sub-scan size. Thus, the main- and sub-scan directions in monochrome/color judgement are balanced.

The edge judgement unit 2501 determines whether or a pixel a to be judged is located at an edge portion, as shown in the block diagram of FIG. 39. In FIG. 39, an address sequencer 2104 sends 8-bit G (green) data of pixels a to e shown in FIG. 38 to calculation circuits 2504 to 2507. The calculation circuits 2504 to 2507 respectively output 8-bit data |a−b|, |a−e|, |a−d|, and |a−c|. As shown in FIG. 38, the pixel a is a pixel to be judged, pixels b and c are adjacent to the pixel a in the sub-scan direction, and pixels c and d are the next to adjacent pixels of the pixel a in the main-scan direction. The pixels are sampled in this manner since an original document scan operation for monochrome/color judgement is performed at a speed twice that in a normal scan operation in this embodiment. An adder 2508 calculates a total sum F (F=|a−b|+|a−e|+|a−d|+|a−c|). A comparator 2509 compares the total sum F with a predetermined value γ. When the total sum F is larger than the predetermined value γ, the comparator 2509 determines an edge portion, and outputs "0", otherwise, determines no edge portion, and outputs "1".

The AND gate 2503 outputs "1" to the counter (II) 2110 when both the outputs of the comparators 2109 and 2509 are "1"; otherwise, outputs "0".

In this manner, no monochrome/color judgement is performed for a pixel which is determined as an edge portion, thus preventing erroneous judgement.

FIGS. 40-1 and 40-2 are flow charts of the processing of a microprocessor 2111 in the above operation. In FIGS. 40-1 and 40-2, steps S1 to S10, S13, and S14 are the same as those in the fourth embodiment, and a description thereof will be omitted.

In steps S20 and S21, 8-bit G (green) data of the pixels a to e, i.e., a total of five pixels shown in FIG. 38 are accessed from the line buffer 2103 to the calculation circuits 2504 to 2507 in order to perform edge judgement.

If it is determined in step S22 that a value of a chromatic judgement pixel number B is larger than a constant β, a color original document is determined. Especially, when a degree of faulty color-registration of input color sensors is small, the judgement method of this embodiment is effective. Thus, if a color portion is present regardless of a read size, a color original document can be determined.

As described above, according to this embodiment, monochrome/color judgement of an edge portion is not performed, thus preventing erroneous judgement of monochrome/color original document.

According to this embodiment, an original document scan speed in monochrome/color judgement is increased to be higher than a read scan speed in a normal copy operation, so that a time required for monochrome/color judgement can be shortened.

According to the above embodiments, different LUTs (look-up tables) may be prepared depending on whether the maximum or minimum value detection circuit outputs R, G, or B data. With this arrangement, an appropriate table loop-up operation can be assured.

Processing after data are accessed from the address sequencer is not performed in a hardware manner but may be performed in a software manner under the control of a computer.

Upon determination of a chromatic area in a (max(R,G,B), min(R,G,B)) space, the space need not be non-linearly divided but may be linearly divided and approximated.

Chromatic/achromatic judgement need not always be performed using a 3×3 matrix, i.e., a total of nine pixels. For example, a matrix pattern may be a pattern including a target pixel and its upper, lower, right, and left neighboring pixels, i.e., a total of five pixels, or may be a 5×5 matrix, i.e., a total of 25 pixels.

As described above, the color image processing apparatus of each of the fourth to seventh embodiments of the present invention comprises a means for generating a chromatic/achromatic judgement signal of a specific pixel in a block area on the basis of pixel data in the block data consisting of a plurality of pixels, and a means for automatically judging whether an input image signal is a monochrome or color image signal on the basis of a plurality of the judgement signals. Thus, any erroneous automatic judgement can be prevented.

EIGHTH EMBODIMENT

FIG. 41-1 is a schematic view showing the overall arrangement of an eighth embodiment of the present invention. In FIG. 41-1, an image scanner unit 3201 reads an original document, and performs digital processing.

The image scanner unit 3201 includes a mirror-surface pressing plate 3200. An original document 3204 on an original document glass table (to be referred to as a platen hereinafter) 3203 is irradiated with light emitted from a lamp 3205. Light reflected by the original document 3204 is guided by mirrors 3206, 3207, and 3208, and is focused on a 3-line sensor (to be referred to as a CCD hereinafter) 3210 by a lens 3209. Thereafter, red (R), green (G), and blue (B) components of full-color data are supplied to a signal processor 3211. Note that the lamp 3206 and the mirror 3206 are mechanically moved in a direction perpendicular to an electrical scan direction of the line sensor at a speed v, and the mirrors 3207 and 3208 are moved in the same direction as above at a speed ½ v, thereby scanning the entire surface of the original document.

FIG. 41-2 is an internal block diagram of the image scanner unit. In FIG. 41-2, a counter 3101 outputs a main-scan address 3102 for designating a main-scan position of the CCD 3210. More specifically, a predetermined value is set in the counter 3101 by a CPU (not shown) when a horizontal sync signal HSYNC is "1", and the counter 3101 is incremented in response to a pixel clock signal CLK.

An image focused on the CCD 3201 is photoelectrically converted into R, G, and B component read signals by three line sensors 3301', 3302', and 3303'. These read signals are output as 8-bit digital color image signals 3313(R), 3314(G), and 3315(B) through amplifiers 3304', 3305', 3306', sample-hold circuits 3307', 3308', and 3309', and A/D converters 3310', 3311', and 3312', respectively.

FIG. 42 is a block diagram of a saturation judgement section of a color judgement unit 3211.

The saturation judgement section shown in FIG. 42 comprises a MAX/MIN detector 3301, selectors 3302 to 3309, subtractors 3310 to 3315 each for outputting (A−B) for inputs A and B, comparators 3316 to 3323, AND gates 3324 to 3328, a NOR gate 3329, and a NAND gate 3330. For inputs A and B, the comparators 3316 and 3319 output "1" when 2A>B, the comparators 3317, 3320, 3322, and 3323 output "1" when A>B, and the comparators 3318 and 3321 output "1" when A>2B. Otherwise, these comparators output "0".

In this arrangement, the MAX/MIN detector 3301 comprises a circuit shown in FIG. 43-1. In FIG. 43-1, comparators 3350, 3351, and 3352 output "1" respectively when R>G, G>B, and B>R. The circuit shown in FIG. 43-1 generates judgement signals S00, S01, S02, S10, S11, and S12, as shown in FIG. 43-2. More specifically, when MAX=R or R=G=B,
  S00=1 and S01=S02=0
when MAX=G,
  S01=1 and S00=S02=0
when MAX=B,
  S02=1 and S00=S01=0
when MIN=R or R=G=B,
  S10=1 and S11=S12=0
when MIN=G,
  S11=1 and S10=S12=0
when MIN=B,
  S12=1 and S10=S11=0

For example, when MAX=R, since R>G and R≧B, the comparator 3350 outputs "1", and the comparator 3352 outputs "0". An AND gate AND1 outputs "1", and an OR gate OR1 outputs "1". AND gates AND2 and AND3 output "0". More specifically, S00=1, and S01=S02=0. The table in FIG. 43-2 shows the judgement results.

The outputs S00, S01, and S02 of the MAX/MIN detector are input to the selector 3302, and the outputs S10, S11, and S12 are input to the selectors 3303 to 3309.

Each of the selectors 3302 to 3309 is constituted by AND gates and an OR gate, as shown in FIGS. 44-1. As shown in FIG. 44-2, when S0=1 and S1=S2=0 for inputs A, B, and C, the selector outputs A; when S1=1 and S0=S2=0, B; and when S2=1 and S0=S1=0, C. In this embodiment, the inputs A, B, and C correspond to the R, G, and B signals.

Pixel color judgement of this embodiment is performed such that a maximum value of R, G, and B signals is represented by MAX, a minimum value thereof is represented by MIN, and a judgement area is divided into four areas A, B, C, and D, as shown in FIG. 45-1.

More specifically, in an achromatic area, a difference between MAX and MIN is small, and as a pixel color approaches a chromatic color, a difference between MAX and MIN is increased. By utilizing this fact, a MAX−MIN plane is divided by linear simultaneous inequalities using MAX and MIN as parameters.

More specifically, ka, kb, kc, ia, ib, ic, WMX, and WMN are used as predetermined constants, and the MAX−MIN plane is divided into four areas A, B, C, and D, as shown in FIG. 45-1.

An area A is a dark achromatic (black) area. A condition for values (MAX, MIN) which are included in this area is to satisfy:

$$MIN \leq WMN \text{ or } MAX \leq WMX,$$

and to satisfy all the following inequalities:

$$\begin{cases} MAX - ka < 2MIN \\ MAX - kb < MIN \\ MAX - kc < 1/2MIN \end{cases}$$

An area B is an intermediate area between chromatic and achromatic colors. A condition for values (MAX, MIN) which are included in this area is to satisfy:

$$MIN \leq WMN \text{ or } MAX \leq WMX$$

to satisfy one of the following inequalities:

$$\begin{cases} MAX - ka \geq 2MIN \\ MAX - kb \geq MIN \\ MAX - kc \geq 1/2MIN \end{cases}$$

and to satisfy all the following inequalities:

$$\begin{cases} MAX - ia < 2MIN \\ MAX - ib < MIN \\ MAX - ic < 1/2MIN \end{cases}$$

An area C is a chromatic area. A condition for values (MAX, MIN) which are included in this area is to satisfy:

$$MIN \leq WMN \text{ or } MAX \leq WMX$$

to satisfy one of the following inequalities:

$$\begin{cases} MAX - ia \geq 2MIN \\ MAX - ib \geq MIN \\ MAX - ic \geq 1/2MIN \end{cases}$$

An area D is a bright achromatic (white) area. A condition for (MAX, MIN) which is included in this area is to satisfy both the following inequalities:

$$\begin{cases} MIN > WMN \\ MAX > WMX \end{cases}$$

FIG. 45-2 shows output signals for the above-mentioned states A, B, C, and D.

When included in the area A,

BL1=1 and UNK1=COL1=0

When included in the area B,

UNK1=1 and BL1=COL1=0

When included in the area C,

COL1=1 and BL1=UNK1=0

When included in the area D,

BL1=1 and UNK1=COL1=0

The circuits 3304 to 3330 shown in FIG. 42 perform the above-mentioned area judgement. The selectors 3302 and 3303 select MAX and MIN signals from the R, G, and B signals in accordance with the output from the MAX/MIN detector 3301. The selectors 3304 to 3309 also select the values of the constants ka, kb, kc, ia, ib, and ic in synchronism with the selector 3303. Note that the constants ka, kb, kc, ia, ib, and ic are set by a CPU (not shown). For example, when MAX is the R signal and MIN is the G signal, the selector 3304 selects KAG; 3305, KBG; 3306, KCG; 3307, iAG; 3308, iBG; and 3309, iCG, and use these values as the constants ka, kb, kc, ia, ib, and ic, respectively. In this manner, the values of the constants ka, kb, kc, ia, ib, and ic are changed in accordance with whether the minimum value is R, G, or B for the following reason.

Since a normal full-color sensor suffers from a color balance unique to a sensor element of a specific color component, if chromatic/achromatic judgement is performed for all the colors using one judgement reference, this causes erroneous judgement. Thus, an R-G-B three-dimensional space is divided into three areas, as shown in FIG. 46, to correspond to color balance characteristics of each sensor. More specifically, the R-G-B three-dimensional space is divided into an area 3702 with MIN=R, an area 3703 with MIN=G, and an area 3704 with MIN=B, and the values ka, kb, kc, ia, ib, and ic corresponding to these areas are used.

For example, for a sensor whose R component signal tends to be low, values KAR, KBR, KCR, iAR, iBR, and iCR in FIG. 41 are set to be slightly larger. Thus, when MIN=R, the area A can be wider, and the area C can be narrower in an area shown in FIG. 45-1. Thus, various sensor characteristics can be finely coped with.

The subtractors 3310 to 3312 and the comparators 3316 to 3318 compare:
MAX−ka and 2 MIN
MAX−kb and MIN
MAX−kc and ½ MIN The subtractors 3313 to 3315 and the comparators 3319 to 3321 compare
MAX−ia and 2 MIN
MAX−ib and MIN
MAX−ic and ½ MIN The comparators 3322 and 3323 respectively compare:
MAX and WMX
MIN and WMN As described above, the area judgement is performed, and judgement results are output as judgement signals BL1, UNK1, and COL1.

According to this embodiment, a saturation judgement means for selecting a saturation judgement reference in accordance with a hue judgement result is arranged, so that saturation judgement corresponding to color balance characteristics of each read sensor is allowed, and it is effective to preventing erroneous monochrome/color judgement.

Since saturation judgement is performed while finely dividing a MAX−MIN space into a chromatic area, a bright achromatic (white) area, a dark achromatic (black) area, and an intermediate color area between chromatic and achromatic colors, a more accurate chromatic/achromatic judgement is allowed.

Since the areas are linearly divided, they can be determined by simple inequalities.

In this embodiment, as a judgement reference to saturation judgement, a MAX−MIN space of color component signals is divided into a plurality of areas. However, parameters representing a saturation are not limited to a combination of MAX and MIN. For example, various other combinations of parameters may be posed, e.g., MAX and an average value, MIN and an average value, a square root of MAX and a square root of MIN, and the like.

In this embodiment, an R-G-B three-dimensional space is divided into three areas. However, the present invention is not limited to three areas. For example, the three-dimensional space may be divided into six or 12 areas. When the space is divided into smaller areas, more appropriate judgement processing can be assured.

NINTH EMBODIMENT

FIG. 47 is a block diagram for explaining a ninth embodiment of the present invention. In FIG. 47, components 3301 to 3303 are the same as those in FIG. 42, and a description thereof will be omitted. A read-only memory (ROM) 3701 receives a MAX signal, a MIN signal, and S10, S11, and S12 signals as address signals. In the ROM 3701, data is programmed in advance to output judgement results shown in FIGS. 45-1 and 45-2. Thus, the ROM 3701 outputs BL1, UNK1, and COL1.

According to this embodiment, upon area judgement, judgement results can be obtained without repeating calculations, and a time required for judgement can be shortened.

In addition, a circuit arrangement can be simplified.

Note that in this embodiment, the ROM is used. However, a RAM may be used in place of the ROM.

TENTH EMBODIMENT

FIGS. 48 and 49 are views for explaining a tenth embodiment of the present invention.

FIG. 48 is a block diagram of a saturation judgement section. In FIG. 48, MAX and MIN are the same signals as described in FIG. 42, and a judgement signal J is generated through an adder 8001, subtractors 8002 and 8003, square calculators 8004 and 8005, multipliers 8006 and 8007, and an adder 8008. The judgement signal J is given by:

$$J = (MAX + MIN - a)^2 \times b + (MAX - MIN)^2 \times c$$

Thus, the signal J is calculated in accordance with values of a, b, and c preset in the subtractor 8003 and the multipliers 8006 and 8007.

When the values a, b, and c are appropriately selected, a curve which yields $J = J_1$ with appropriate constants $J_1$ and $J_2$ ($J_1 < J_2$), and a curve which yields $J = J_2$ are represented by elliptic curves, as shown in FIG. 49. Therefore, a judgement circuit 8009 compares the value J with $J_1$ and $J_2$ to perform the same judgement as in FIG. 45-1.

According to this embodiment, since elliptic curves are used to divide areas, areas can be divided more flexibly than in a case wherein areas are linearly divided.

The present invention is not limited to elliptic curves of this embodiment. For example, area divisions may be made by various other linear or non-linear equations such as hyperbolas, parabolas, and the like.

ELEVENTH EMBODIMENT

FIGS. 50, 51, and 52 are views for explaining an eleventh embodiment of the present invention. FIG. 50 is a block diagram of a saturation judgement section, and FIG. 51 shows an R-G-B space.

In FIG. 50, a difference from FIG. 42 is that signals S00, S01, and S02 indicating a MAX signal are input to selectors 3304, 3305, 3306, 3307, 3308, and 3309 as select signals. According to this embodiment, in a space 5001 with MAX=R, a space 5002 with MAX=G, and a space 5003 with MAX=B, as shown in FIG. 51, ia, ib, ic, ka, kb, and kc values can be selected.

TWELFTH EMBODIMENT

FIG. 52 is a block diagram of a saturation judgement section for explaining a twelfth embodiment of the present invention.

A calculator 9001 calculates (I,Q) of a (Y,I,Q) space from (R,G,B) according to the following equations:

$$\begin{cases} I = 0.60R - 0.28G - 0.32B \\ Q = 0.21R - 0.52G + 0.31B \end{cases}$$

Since a hue can be judged based on the (I,Q), if judgement results according to hues are programmed in advance in a ROM 9002, the ROM can output select signals of selectors 3304 to 3309.

In this embodiment, the signals (I,Q) are used. However, (a*,b*) of an (L*,a*,b*) space or other signals representing chromaticity may be employed.

The selector need not always be selected in three ways based on the hue but may be in six ways or 12 ways.

In place of switching the selectors 3304 to 3309, an output from the ROM 9002 is supplied to a CPU (not shown) to change values of constants KAR, KAG, KAB, . . . .

Furthermore, as a selector signal, a MAX signal, and a combination of MAX and MIN signals may be used.

THIRTEENTH EMBODIMENT

FIGS. 53 to 56 are views for explaining a thirteenth embodiment of the present invention.

FIG. 53 is a block diagram showing an arrangement of this embodiment. The arrangement of this embodiment includes first and second judgement means 3101 and 3102.

The first judgement means 3101 corresponds to a hue judgement means described in the eighth embodiment, and outputs, to the second judgement means 3102, a BL1 signal indicating that a pixel of interest is in dark achromatic color, i.e., black, a COL1 signal indicating the pixel is in chromatic color, and a UNK1 signal indicating that the pixel is in intermediate color between the dark achromatic color and chromatic color in response to input R, G, and B signals for each pixel.

The second judgement means 3102 corrects the judgement result of the pixel of interest on the basis of the judgement result of a group of surrounding pixels of a 5×5 matrix (FIG. 55) having a pixel to be judged as a central pixel, and outputs a BL signal indicating that the pixel of interest is in dark achromatic color, i.e., black, and a COL signal indicating the pixel is in chromatic color.

More specifically, in this embodiment, an extra judgement of the output from the hue judgement means of the eighth embodiment is performed to output a chromatic/achromatic judgement signal.

FIG. 54 is a block diagram of the second judgement means 3102. The BK1, COL1, and UNK1 signals judged by the first judgement means are line-delayed by line memories 7001, 7002, and 7003, and are synchronized with an HSYNC signal and a CLK signal. Thus, signals for five lines are simultaneously output. Signals obtained by delaying the BK1, COL1, and UNK1 signals by one line are represented by:

BK2, COL2, UNK2;
delayed by two lines,
BK3, COL3, UNK3;
delayed by three lines,
BK4, COL4, UNK4; and delayed by four lines,
BK5, COL5, UNK5

In this case, a count means 7005 counts black pixels in a 5×5 matrix area shown in FIG. 55 to obtain NB, and a count means 7006 counts chromatic pixels to obtain NC. A comparator 7007 compares the black pixel number NB and the chromatic pixel number NC in a 5×5 block.

Furthermore, the output from the comparator 7007 is calculated together with the outputs BK3, COL3, and UNK3 from the first judgement means for the central pixel of the 5×5 matrix area through gate circuits 7008, 7009, 7010, and 7011, thus outputting a BL signal indicating that the central pixel is in black, and a COL signal indicating that the central pixel is in chromatic color. A judgement reference in this case does not overrule judgement when the judgement result of the first judgement reference indicates the black or chromatic pixel. More specifically, when BK3=1 or COL3=1, then BK=1 or COL=1. When the judgement result of the first judgement reference indicates an intermediate pixel between chromatic and achromatic pixels, the values NB and NC are compared. When NB>NC, a black pixel is determined and BL=1; when NB≦NC, a chromatic pixel is determined, and COL=1. As a result, an indefinite intermediate area B shown in FIG. 45-1 can be classified with high precision to one of the black area A and the chromatic area C.

Comparison between NB and NC may be performed using a ROM, as shown in FIG. 56. In FIG. 56, a ROM 7101 receives NB, NC, BK3, COL3, and UNK3 as address signals in the same manner as in FIG. 54, and outputs prestored calculation results BL and COL.

When the ROM is employed, the circuit arrangement can be simplified.

As described above, a color image processing apparatus according to each of the eighth to thirteenth embodiments of the present invention comprises an input means for inputting a plurality of color component signals, a means for judging a hue of a pixel to be judged on the basis of the color component signals, and a saturation judgement means for selecting a saturation judgement reference in accordance with an output from the hue judgement means or comprises an input means for inputting a plurality of color component signals, a means for extracting a plurality of parameters indicating a saturation upon its combination on the basis of the color component signals, and a judgement means for dividing a space defined by the parameters into a plurality of areas including a chromatic area, a bright achromatic (white) area, a dark achromatic area, and an intermediate area between chromatic and achromatic colors, and judging a saturation in accordance with an area to which a pixel to be judged belongs. Thus, erroneous monochrome/color judgement can be prevented.

The present invention is not limited to the 3-line sensor, but may be applied to various other image processing apparatuses having various other image sensors (using a solid-state image pickup element or an image pickup tube) such as RGB dot-sequential line sensor, an area sensor, and the like.

An image output means may comprise various output apparatuses, such as a laser beam color printer, a thermal transfer color printer, an ink-jet color printer, a dot color printer, and the like.

As described above, according to the present invention, a good image can be obtained without being influenced by offsets of positions of read sensors in a color image processing apparatus.

What is claimed is:

1. A color image processing apparatus comprising:
   a) image input means comprising a plurality of parallelly arranged line sensors, each of said line sensors generating a color component signal of a different portion of an original on the basis of different spectral characteristics, said image input means including optical means for conveying light from the original to said plurality of line sensors;
   b) judgement means for judging whether a specific pixel belongs to an achromatic area of the original on the basis of the plural color component signals generated by said line sensors, and for outputting a judgement signal; and
   c) correcting means for correcting the judgement signal, representing whether the specific pixel belongs to the achromatic area, output from said judgment means, wherein said correcting means corrects the judgement signal in order to correct a judgment error of said judgement means which is caused by said optical means.

2. An apparatus according to claim 1, further comprising:
   d) process means for processing the plurality of color component signals in accordance with the corrected judgement signal.

3. An apparatus according to claim 1, wherein said correcting means comprises chromatic area detection means for detecting a chromatic area on the basis of characteristics different from said judgement means.

4. An apparatus according to claim 3, wherein said judgment means comprises means for judging the achromatic area on the basis of a predetermined threshold value, and said chromatic area detection means comprises means for detecting the chromatic area on the basis of a threshold value different from that of said judgment means.

5. An apparatus according to claim 1, wherein said judgement means comprises means for judging the achromatic area on the basis of a difference between maximum and minimum values of the plural color component signals.

6. A color image processing apparatus comprising:
   a) image input means for generating Red, Green and Blue signals representing a color original;
   b) generating means for generating an achromatic area signal representing whether a specific pixel belongs to an achromatic area of the color original on the basis of the Red, Green and Blue signals generated by said image input means; and
   c) reproducing means for reproducing the achromatic area of the color original by using the Green signal generated by said image input means, in accordance with the achromatic area signal.

7. An apparatus according to claim 6, wherein said reproducing means comprises a printer operating in an electrophotographic manner.

8. An apparatus according to claim 6, wherein said reproducing means uses a level of the Green signal as a level of an achromatic color.

9. A color image processing apparatus comprising:
   a) input means for inputting image data representing an original;
   b) first judgement means for judging whether a pixel of interest is a chromatic pixel or an achromatic pixel on the basis of image data corresponding to a plurality of neighboring pixels of the pixel of interest;
   c) accumulation means for accumulating a plurality of judgement results corresponding to one picture of the original judged by said first judgement means; and d) second judgement means for automatically judging whether one picture of the original is a monochrome original or a color original on the basis of the judgement results accumulated by said accumulation means.

10. An apparatus according to claim 9, wherein said input means comprises a plurality of parallelly arranged line sensors for generating color component signals on the basis of different spectral characteristics.

11. A color image processing apparatus according to claim 9, wherein when a number of chromatic pixels in a predetermined block area is larger than a specific value, said first judgement means judges that the specific pixel in the block area is a chromatic pixel.

12. A color image processing apparatus comprising:
a) judgement signal generating means for generating a chromatic/achromatic judgement signal of a specific pixel in a block area on the basis of pixel data in said block area consisting of a plurality of pixels; and
b) judgement means for automatically judging whether an input image signal is a monochrome image signal or a color image signal on the basis of a plurality of the chromatic/achromatic judgement signals,
wherein said judgement signal generating means compares a number of chromatic pixels and a number of achromatic pixels in said block area to determine that the specific pixel in said block area is a chromatic pixel, and generates the judgement signal.

13. A color image processing apparatus comprising:
a) judgement signal generating means for generating a chromatic/achromatic judgement signal of a specific pixel in a block area on the basis of pixel data in said block area consisting of a plurality of pixels; and
b) judgement means for automatically judging whether an input image signal is a monochrome image signal or a color image signal on the basis of a plurality of the chromatic/achromatic judgement signals, wherein said judgement means comprises edge judgement means for judging whether or not the specific pixel in said block area is located at an edge portion of an image, and when said edge judgement means determines that the specific pixel is at the edge portion, the specific pixel is not processed as a chromatic pixel.

14. A color image processing apparatus comprising:
a) judgement signal generating means for generating a chromatic/achromatic judgement signal of a specific pixel in a block area on the basis of pixel data in said block area consisting of a plurality of pixels; and
b) judgement means for automatically judging whether an input image signal is a monochrome image signal or a color image signal on the basis of a plurality of the chromatic/achromatic judgement signals, wherein said judgement means performs monochrome/color judgement in accordance with a ratio of a number of block areas to a number of pixels subjected to chromatic pixel judgement by said judgement signal generating means.

15. A color image processing apparatus comprising:
a) judgement signal generating means for generating a chromatic/achromatic judgement signal of a specific pixel in a block area on the basis of pixel data in said block area consisting of a plurality of pixels; and
b) judgement means for automatically judging whether an input image signal is a monochrome image signal or a color image signal on the basis of a plurality of the chromatic/achromatic judgement signals, wherein said judgement means compares a number of pixels subjected to chromatic pixel judgement by said judgement signal generating means with a specific constant to perform monochrome/color judgement.

16. A color image processing apparatus comprising:
a) judgement signal generating means for generating a chromatic/achromatic judgement signal of a specific pixel in a block area on the basis of pixel data in said block area consisting of a plurality of pixels; and
b) judgement means for automatically judging whether an input image signal is a monochrome image signal or a color image signal on the basis of a plurality of the chromatic/achromatic judgement signals, wherein said judgement means linearly or non-linearly divides a two-dimensional judgement space defined by maximum and minimum values of color components of an input image signal to perform judgement of chromatic and achromatic pixels.

17. A color image processing comprising:
a) hue judgement means for judging a hue of a pixel to be judged on the basis of a plurality of input color component signals; and
b) saturation judgement means for judging a saturation by selecting a saturation judgement reference in accordance with an output from said hue judgement means,
wherein said hue judgement means comprises means for judging the hue by detecting a maximum value of said plurality of input color component signals.

18. A color image processing apparatus comprising:
a) hue judgement means for judging a hue of a pixel to be judged on the basis of a plurality of input color component signals; and
b) saturation judgement means for judging a saturation by selecting a saturation judgement reference in accordance with an output from said hue judgement means,
wherein said hue judgement means comprises means for judging the hue by detecting a minimum value of said plurality of input color component signals.

19. A color image processing apparatus comprising:
a) hue judgement means for judging a hue of a pixel to be judged on the basis of input color component signals; and
b) saturation judgement means for judging a saturation by selecting a saturation judgement reference in accordance with an output from said hue judgement means,
wherein said hue judgement means comprises means for calculating a chromaticity signal using said input color component signals, and judging the hue on the basis of the chromaticity signal.

20. A color image processing apparatus comprising:
a) hue judgement means for judging a hue of a pixel to be judged on the basis of a plurality of input color component signals; and
b) saturation judgement means for judging a saturation by selecting a saturation judgement reference in accordance with an output from said hue judgement means,
wherein said saturation judgement means extracts a plurality of parameters to obtain a plurality of selected parameters indicating saturation upon a combination of the extracted parameters on the basis of the color component signals, divides a space defined by said selected parameters into a plurality of areas including a chromatic area, an achromatic area, and an intermediate color area between chromatic and achromatic colors, and judges the saturation in accordance with an area to which a pixel to be judged belongs.

21. An apparatus according to claim 20, wherein said plurality of parameters include maximum and minimum values of the color component signals, and said plurality of areas are expressed by solution areas of simultaneous equations using the maximum and minimum values.

22. A color image processing apparatus comprising:
   a) hue judgement means for judging a hue of a pixel to be judged on the basis of input color component signals; and
   b) saturation judgement means for judging a saturation by selecting a saturation judgement reference in accordance with an output from said hue judgement means,
   wherein said saturation judgement means includes means for correcting a saturation judgement result of a pixel to be judged on the basis of saturation judgement results of pixels surrounding the pixel to be judged.

23. A color image processing apparatus comprising:
   a) image input means comprising three parallelly arranged line sensors, each of said line sensors generates a primary color component signal of a different portion of a color original on the basis of different spectral characteristics;
   b) means for detecting an achromatic area of the color original on the basis of the three primary color component signals input by said image input means; and
   c) means for processing the three primary color components and generating a reproduction signal for image forming by using the detection result of said detecting means,
   wherein said detecting means comprises means for correcting a spatial frequency characteristic of the three primary color components and detects the achromatic area of the color original by using the corrected three primary color components.

24. An apparatus according to claim 23, wherein said three line sensors comprise R (red), G (green), and B (blue) line sensors.

25. An apparatus according to claim 23, further comprising means for discriminating whether the original is a color image or a monochrome image, on the basis of the primary color component signals.

26. A color image processing apparatus comprising:
   a) judgement means for judging an achromatic area of an input image on the basis of component signals of an input color signal and outputting an achromatic area signal; and
   b) achromatic area correction means for correcting the achromatic area signal output from said judgement means, wherein said achromatic area correction means comprises means for expanding the achromatic area and wherein said achromatic area correction means comprises means for comparing a number of achromatic pixels and a number of chromatic pixels for a plurality of pixels near a target pixel to judge whether or not the target pixel belongs to the achromatic area.

27. A color image processing apparatus comprising:
   a) image input means comprising a plurality of parallelly arranged line sensors, each of said line sensors generating a color component signal of a different portion of an original based on different spectral characteristics, said image input means including optical means for conveying light from the original to said plurality of line sensors;
   b) judgement means for judging whether a specific pixel belongs to an achromatic area of the original based on the plural color component signals generated by said line sensors, and for outputting a judgement signal; and
   c) reproducing means for reproducing the achromatic area of the original without using a plurality of chromatic recording materials in accordance with the judgement result of said judgment means in order to correct color aberration which is caused by said optical means.

* * * * *

UNITED STATES PATENT AND TRADEMARK OFFICE
CERTIFICATE OF CORRECTION

PATENT NO. : 5,721,628

DATED : February 24, 1998

INVENTORS : Yoichi Takaragi, et al.

It is certified that error appears in the above-identified patent and that said Letters Patent is hereby corrected as shown below:

COLUMN 1

Line 10, "processing," should read --processing apparatus which is suitable for color image processing,--.

COLUMN 3

Line 20, "smooth" should read --smoothing--.

COLUMN 6

Line 28, "37th" should read --+37th--.

Line 29, "38th" should read --+38th--.

COLUMN 8

Line 43, "the first and mirror" should read --the first and second mirror--.

COLUMN 12

Line 49, "compares to determined" should read --determines--.

UNITED STATES PATENT AND TRADEMARK OFFICE
CERTIFICATE OF CORRECTION

PATENT NO. : 5,721,628

DATED : February 24, 1998

INVENTORS : Yoichi Takaragi, et al.

It is certified that error appears in the above-identified patent and that said Letters Patent is hereby corrected as shown below:

COLUMN 17

Line 17, "2511" should read --2111--.

Line 52, "$A > \alpha,$" should read --$A \leq \alpha,$--.

Signed and Sealed this

Fourth Day of August, 1998

Attest:

BRUCE LEHMAN

Attesting Officer

Commissioner of Patents and Trademarks